(12) United States Patent
Wein et al.

(10) Patent No.: US 12,492,402 B2
(45) Date of Patent: Dec. 9, 2025

(54) RECOMBINANT VIRUS PRODUCTS AND METHODS FOR INHIBITING EXPRESSION OF DYSTROPHIA MYOTONICA PROTEIN KINASE AND/OR INTERFERING WITH A TRINUCLEOTIDE REPEAT EXPANSION IN THE 3' UNTRANSLATED REGION OF THE DMPK GENE

(71) Applicant: RESEARCH INSTITUTE AT NATIONWIDE CHILDREN'S HOSPITAL, Columbus, OH (US)

(72) Inventors: Nicolas Sebastien Wein, Columbus, OH (US); Scott Quenton Harper, Powell, OH (US); Kelly Reed Clark, Columbus, OH (US)

(73) Assignee: RESEARCH INSTITUTE AT NATIONWIDE CHILDREN'S HOSPITAL, Columbus, OH (US)

( * ) Notice: Subject to any disclaimer, the term of this patent is extended or adjusted under 35 U.S.C. 154(b) by 1252 days.

(21) Appl. No.: 17/269,741

(22) PCT Filed: Aug. 22, 2019

(86) PCT No.: PCT/US2019/047779
§ 371 (c)(1),
(2) Date: Feb. 19, 2021

(87) PCT Pub. No.: WO2020/041634
PCT Pub. Date: Feb. 27, 2020

(65) Prior Publication Data
US 2022/0033823 A1    Feb. 3, 2022

Related U.S. Application Data

(60) Provisional application No. 62/721,105, filed on Aug. 22, 2018.

(51) Int. Cl.
*C07H 21/04* (2006.01)
*C12N 15/113* (2010.01)
*C12N 15/86* (2006.01)

(52) U.S. Cl.
CPC .......... *C12N 15/1137* (2013.01); *C12N 15/86* (2013.01); *C12N 2320/33* (2013.01); *C12N 2330/51* (2013.01)

(58) Field of Classification Search
None
See application file for complete search history.

(56) References Cited

U.S. PATENT DOCUMENTS

| | | |
|---|---|---|
| 5,173,414 A | 12/1992 | Lebkowski et al. |
| 5,658,776 A | 8/1997 | Flotte et al. |
| 5,786,211 A | 7/1998 | Johnson |
| 5,871,982 A | 2/1999 | Wilson et al. |
| 6,258,595 B1 | 7/2001 | Gao et al. |
| 6,566,118 B1 | 5/2003 | Atkinson et al. |
| 7,282,199 B2 | 10/2007 | Gao et al. |
| 7,790,449 B2 | 9/2010 | Gao et al. |
| 10,752,898 B2 * | 8/2020 | Pietri-Rouxel .......... A61P 21/00 |
| 2013/0045538 A1 | 2/2013 | Garcia et al. |
| 2014/0142288 A1 | 5/2014 | Davidson et al. |
| 2015/0064181 A1 | 3/2015 | Armstrong |
| 2018/0163209 A1 | 6/2018 | Bennett et al. |

FOREIGN PATENT DOCUMENTS

| | | | |
|---|---|---|---|
| FR | 2874384 A1 * | 2/2006 | ............. A61P 21/00 |
| WO | 1995/13365 A1 | 5/1995 | |
| WO | 1995/13392 A1 | 5/1995 | |
| WO | 1996/17947 A1 | 6/1996 | |
| WO | 1997/06243 A1 | 2/1997 | |
| WO | 1997/08298 A1 | 3/1997 | |
| WO | 1997/09441 A2 | 3/1997 | |
| WO | 1997/21825 A1 | 6/1997 | |
| WO | 1998/09657 A2 | 3/1998 | |
| WO | 1999/11764 A2 | 3/1999 | |
| WO | 2001/83692 A2 | 11/2001 | |
| WO | 2002/53703 A2 | 7/2002 | |
| WO | WO-2008103060 A1 * | 8/2008 | .......... C12N 15/113 |
| WO | WO-2011113889 A1 * | 9/2011 | .......... C12N 15/111 |
| WO | 2015/021457 A2 | 2/2015 | |
| WO | 2016/179112 A1 | 11/2016 | |
| WO | 2017/048732 A1 | 3/2017 | |
| WO | WO-2017/173411 A1 | 10/2017 | |

OTHER PUBLICATIONS

Davidson et al. BBB65068, disclosed in WO2014007858, alignment. (Year: 2014).*
Koo et al (Human Gene Therapy, 2011, vol. 22, pp. 1379-1388). (Year: 2011).*
Kornegay et al (Molecular Therapy, 2010, vol. 18, No. 8, pp. 1501-1508). (Year: 2010).*
Accession No. EU796986 Segelbacher et al., 2016 (Year: 2016).*
Accession No. BEM79650 Dion et al., 2017 (Year: 2017).*
Accession No. EU796978 Segelbacher et al., 2016 (Year: 2016).*
Sobczak et al., RNA interference targeting CUG repeats in a mouse model of myotonic dystrophy, Mol. Ther., 21(2):380-7 (2013).
Srivastava et al., Nucleotide Sequence and Organization of the Adeno-Associated Virus 2 Genome, J. Virol., 45:555-564 (1983).
Statland et al., Mexiletine for symptoms and signs of myotonia in nondystrophic myotonia: a randomized controlled trial, JAMA, 308(13):1357-65 (2012).

(Continued)

*Primary Examiner* — Celine X Qian
(74) *Attorney, Agent, or Firm* — MARSHALL, GERSTEIN & BORUN LLP

(57) ABSTRACT

The present disclosure relates to RNA interference-based methods for inhibiting the expression of the dystrophia myotonia protein kinase (DMPK) gene. Recombinant adeno-associated viruses of the disclosure deliver DNAs encoding inhibitory RNAs that knock down the expression of DMPK or interfere with the expression of the CTG repeat associated with myotonic dystrophy type-1 (DM1). The methods have application in the treatment of myotonic dystrophies, including DM1, and other disorders associated with aberrant DMPK expression.

12 Claims, 19 Drawing Sheets
Specification includes a Sequence Listing.

(56) References Cited

OTHER PUBLICATIONS

Tratschin et al., A human parvovirus, adeno-associated virus, as a eucaryotic vector: transient expression and encapsidation of the procaryotic gene for chloramphenicol acetyltransferase, Mol. Cell. Biol., 4(10):2072-2081 (1984).
Tratschin et al., Adeno-associated virus vector for high-frequency integration, expression, and rescue of genes in mammalian cells, Mol. Cell. Biol., 5(11):3251-3260 (1985).
Wang et al., Construction and analysis of compact muscle-specific promoters for AAV vectors, Gene. Therapy, 15(22):1489-1499 (2008).
Wein et al., Efficient bypass of mutations in dysferlin deficient patient cells by antisense-induced exon skipping, Hum. Mutat., 31(2):136-42 (2010).
Wein et al., Translation from a DMD exon 5 IRES results in a functional dystrophin isoform that attenuates dystrophinopathy in humans and mice, Nature Medicine, 20(9):992-1000 (2014).
Weintraub et al., The myoD gene family: nodal point during specification of the muscle cell lineage, Science, 251:761-766 (1991).
Wheeler et al., Correction of ClC-1 splicing eliminates chloride channelopathy and myotonia in mouse models of myotonic dystrophy, J. Clin. Invest., 117(12):3952-7 (2007).
Borel et al., Recombinant AAV as a platform for translating the therapeutic potential of RNA interference, Molecular Therapy, 22(4):692-701 (2014).
Carter, Adeno-associated virus vectors, Current Opinions in Biotechnology, 3(5):533-539 (1992).
Clark et al., A stable cell line carrying adenovirus-inducible rep and cap genes allows for infectivity titration of adeno-associated virus vectors, Gene. Therapy, 3(12):1124-1132 (1996).
Clark et al., Highly purified recombinant adeno-associated virus vectors are biologically active and free of detectable helper and wild-type viruses, Hum. Gene. Ther., 10(6):1031-1039 (1999).
Cserjesi et al., Myogenin induces the myocyte-specific enhancer binding factor MEF-2 independently of other muscle-specific gene products, Mol. Cell. Biol., 11(10):4854-4862 (1991).
Davidson et al., Current prospects for RNA interference-based therapies, Nat. Rev. Genet., 12(5):329-40 (2011).
Davidson et al., Viral delivery of recombinant short hairpin RNAs, Methods Enzymol., 392:145-73 (2005).
De et al., High levels of persistent expression of alpha1-antitrypsin mediated by the nonhuman primate serotype rh. 10 adeno-associated virus despite preexisting immunity to common human adeno-associated viruses, Mol. Ther., 13(1):67-76 (2006).
Desmet et al., Human Splicing Finder: an online bioinformatics tool to predict splicing signals, Nucleic Acids Res., 37(9):E67 (2009).
Die-Smulders et al., Age and causes of death in adult-onset myotonic dystrophy, Brain, 121:1557-1563 (1998).
Francois et al., Selective silencing of mutated mRNAs in DM1 by using modified hU7-snRNAs, Nat. Struct. Mol. Biol., 18(1):85-7 (2011).
Gao et al., Clades of Adeno-associated Viruses Are Widely Disseminated in Human Tissues, J. Virol., 78:6381-6388 (2004).
Goyenvalle et al., Rescue of dystrophic muscle through U7 snRNA-mediated exon skipping, Science, 306(5702):1796-9 (2004).
Harper, Progress and challenges in RNA interference therapy for Huntington disease, Arch. Neurol., 66(8):933-8 (2009).
He et al., A simplified system for generating recombinant adenoviruses, Proc. Natl. Acad. Sci. U.S.A., 95(5):2509-14 (1998).
Heatwole et al., Patient-reported impact of symptoms in myotonic dystrophy type 1 (PRISM-1), Neurology, 79(4):348-57 (2012).
Hermonat et al., Use of adeno-associated virus as a mammalian DNA cloning vector: transduction of neomycin resistance into mammalian tissue culture cells, Proc. Natl. Acad. Sci. U.S.A., 81(20):6466-6470 (1984).
Huguet et al., Molecular, physiological, and motor performance defects in DMSXL mice carrying >1,000 CTG repeats from the human DM1 locus, PLoS Genet., 8(11):e1003043 (2012).
International Application No. PCT/US19/47779, International Preliminary Report on Patentability, mailed Mar. 4, 2021.
International Application No. PCT/US19/47779, International Search Report and Written Opinion, mailed Dec. 27, 2019.
Johnson et al., Muscle creatine kinase sequence elements regulating skeletal and cardiac muscle expression in transgenic mice, Mol. Cell. Biol., 9(8):3393-3399 (1989).
Kanadia et al., A muscleblind knockout model for myotonic dystrophy, Science, 302(5652):1978-80 (2003).
Khvorova et al., Functional siRNAs and miRNAs exhibit strand bias, Cell, 115(2):209-16 (2003).
Kunkel et al., Analysis of deletions in DNA from patients with Becker and Duchenne muscular dystrophy, Nature, 322(6074):73-7 (1986).
Kunkel et al., Upstream elements required for efficient transcription of a human U6 RNA gene resemble those of U1 and U2 genes even though a different polymerase is used, Genes Dev., 2(2):196-204 (1988).
Lam et al., siRNA Versus miRNA as Therapeutics for Gene Silencing, Molecular Therapy—Nucleic Acids, 4(9):e252 (2015).
Laughlin et al., Cloning of infectious adeno-associated virus genomes in bacterial plasmids, Gene., 23(1):65-73 (1983).
Lebkowski et al., Adeno-associated virus: a vector system for efficient introduction and integration of DNA into a variety of mammalian cell types, Mol. Cell. Biol., 8:3988-3996 (1988).
Levy et al., Therapeutic exon 'switching' for dysferlinopathies?, Eur. J. Hum. Genet., 18(9):969-70 (2010).
Li et al., Defining the optimal parameters for hairpin-based knockdown constructs, RNA, 13(10):1765-74 (2007).
Logigian et al., Mexiletine is an effective antimyotonia treatment in myotonic dystrophy type 1, Neurology, 74(18): 1441-8 (2010).
Mader et al., A steroid-inducible promoter for the controlled overexpression of cloned genes in eukaryotic cells, Proc. Natl. Acad. Sci. U.S.A., 90(12):5603-5607 (1993).
Marsic et al., Vector Design Tour de Force: Integrating Combinatorial and Rational Approaches to Derive Novel Adeno-associated Virus Variants, Molecular Therapy, 22(11):1900-1909 (2014).
Mclaughlin et al., Adeno-associated virus general transduction vectors: analysis of proviral structures, J. Virol., 62(6):1963-73 (1988).
Muscat et al., Multiple 5'-flanking regions of the human alpha-skeletal actin gene synergistically modulate muscle-specific expression, Mol. Cell. Biol., 7(11):4089-4099 (1987).
Muzyczka, Use of Adeno-Associated Virus as a General Transduction Vector for Mammalian Cells, Current Topics in Microbiology and Immunology, 158:97-129 (1992).
Paddison et al., Stable suppression of gene expression by RNAi in mammalian cells, Proc. Natl. Acad. Sci. U.S.A., 99(3):1443-8 (2002).
Paul et al., Effective expression of small interfering RNA in human cells, Nat. Biotechnol., 20(5):505-8 (2002).
Paul et al., Increased Viral Titer Through Concentration of Viral Harvests from Retroviral Packaging Lines, Human Gene Therapy, 4(5):609-615 (1993).
Paule et al., Survey and summary: transcription by RNA polymerases I and III, Nucleic Acids Res., 28(6):1283-98 (2000).
Perrin et al., An experimental rabies vaccine produced with a new BHK-21 suspension cell culture process: use of serum-free medium and perfusion-reactor system, Vaccine, 13(13):1244-1250 (1995).
Rao et al., siRNA vs. shRNA: similarities and differences, Advanced Drug Delivery Reviews, 61(9):746-769 (2009).
Reynolds et al., Rational siRNA design for RNA interference, Nat. Biotechnol., 22(3):326-30 (2004).
Samulski et al., Cloning of adeno-associated virus into pBR322: rescue of intact virus from the recombinant plasmid in human cells, Proc. Natl. Acad. Sci. U.S.A., 79(6):2077-2081 (1982).
Samulski et al., Helper-free stocks of recombinant adeno-associated viruses: normal integration does not require viral gene expression, J. Virol., 63(9):3822-3828 (1989).

(56) References Cited

OTHER PUBLICATIONS

Schenpp et al., Highly purified recombinant adeno-associated virus vectors. Preparation and quantitation, Methods Mol. Med., 69:427-443 (2002).

Schwarz et al., Asymmetry in the assembly of the RNAi enzyme complex, Cell, 115(2):199-208 (2003).

Semenza et al., Hypoxia-inducible nuclear factors bind to an enhancer element located 3' to the human erythropoietin gene, Proc. Natl. Acad. Sci. U.S.A., 88(13):5680-5684 (1991).

Senapathy et al., Molecular cloning of adeno-associated virus variant genomes and generation of infectious virus by recombination in mammalian cells, J. Biol. Chem., 259:4661-4666 (1984).

European Application No. 19852799.6, European Search Report and Opinion, mailed Dec. 7, 2022.

Hussain, S. R., et al., AAV Mediated RNAi and Antisense Knockdown of Intranuclear DMPK Transcripts in DM1 Cells, Molecular Therapy, 20(S1):S171-S172 (2012).

Klein, A., et al., Therapeutic Approaches for Dominant Muscle Diseases: Highlight on Myotonic Dystrophy, Current Gene Therapy, 15(4):329-337 (2015).

Langlois, M. A., et al., Cytoplasmic and Nuclear Retained DMPK mRNAs Are Targets for RNA Interference in Myotonic Dystrophy Cells, Journal of Biological Chemistry, 280(17):16949-16954 (2005).

Seow, Y., et al., Artificial mirtron-mediated gene knockdown: Functional DMPK silencing in mammalian cells, RNA, 18(7):1328-1337 (2012).

Seow, Y., et al., Supplementary Information: Artificial mirtron-mediated gene knockdown: Functional DMPK silencing in mammalian cells, RNA, XP055954924, (2012).

GenBank Accession No. BC026328.1, *Homo sapiens* dystrophia myotonica-protein kinase, mRNA (cDNA clone MGC: 26320 IMAGE:4792104), complete cds, dated Mar. 19, 2009 (3 pages).

\* cited by examiner

>U6.sh2577
GACGCCGCCATCTCTAGGCCCGCGCCGGCCCCTCGCACAGACTTGTGGGAGAAGC
TCGGCTACTCCCCTGCCCCGTTAATTTGCATATATTCCTAGTAACTATAGAGG
CTTAATGTGCGATAAAAGACAGATAATCT GTTCTTTTTAATACTAGTACATTTTACA
TGATAGGCTTGGATTTCTATAAGAGATACAAAATACTAAATTATTATTTTAAAAAACA
GCACAAAAGGAAACTCACCCTAACTGTAAAGTAATTGTGTTTTGAGACTATAAAT
ATCCCTTGGAGAATGAGCCGTTAGTGAACCGTCAGATGGTACCGTTTAA
A[ctcgagtgagccgctgctactcggaaatttctgtaaagccacagatgggaaatttccgagtaagcaggctactaga]GC
GGCCGCCACAGAGATCCAGAGATCCAGACATGATAAGATACA[TTTTT] (SEQ ID NO: 20 )

mU6
sh2577
U6 terminator

Fig. 1A

>U6T6.sh4364-ex8
GACGCCGCCATCTCTAGGCCCGCGCCGGCCCCTCGCACAGACTTGTGGGAGAAGC
TCGGCTACTCCCCTGCCCCGTTAATTTGCATATATTCCTAGTAACTATAGAGG
CTTAATGTGCGATAAAAGACAGATAATCT GTTCTTTTTAATACTAGTACATTTTACA
TGATAGGCTTGGATTTCTATAAGAGATACAAAATACTAAATTATTATTTTAAAAAACA
GCACAAAAGGAAACTCACCCTAACTGTAAAGTAATTGTGTTTTGAGACTATAAAT
ATCCCTTGGAGAATGAGCCGTTAGTGAACCGTCAGATGGTACCGTTTAA
A[CTCGAGTGAGCCGAACCTGCCTTTTGTGGGCTACTCTGTAAAGCCACAGATGGGAGT
AGCCCACAAAAGGCAGGTGTGCCTAGC]CTAGAGGCGGGCCCACAGAGCGGGGAGAT
CCAGACATGATAAGATACA[TTTTT] (SEQ NO: 21)

mU6
sh4364-ex8
U6 terminator

GACGCCGCCATCTCTAGGCCCGGGCGCCCCTCGCACAGACTTGTGGGAGAAGC
TCGGCTACTCCCCTGCCCCCGGTTAATTTGCATATAATATTCCTAGTAACTATAGAGG
CTTAATGTGCGATAAAAGACAGATAATCGTTCTCTTTTAATACTAGTACATTTTACA
TGATAGGCTTGGATTTCTATAAGAGATACAAATACTAAATTATTATTTAAAAAACA
GCACAAAAGGAAACTCACCCTAACTGTAAAGTAATTGTGTTTGAGACTATAAAT
ATCCCTTGGAGAAAAGCCTTGTTTAGTGAACCGTCAGATGGTACCGTTTAA
ACTCGAGTGAGCGACGACTTCGGCTCTTGCCCTCAACTGTAAAGCCACAGATGGGTTG
AGGCAAGAGCCGAAGTCGGTGCCTACTAGCTAGAGCGGGCCCCACAGGGGGAGAT
CCAGACATGATAAGATACATTTTTT (SEQ ID NO: 22)

▢ mU6
▢ sh5475-ex5
⌐ ⌐ ⌐ U6 terminator ¬ ¬ ¬

Fig. 1C

>U6T6.shD6

GACGCCGCCATCTCTAGGCCCGGGCGCCCCTCGCACAGACTTGTGGGAGAAGC
TCGGCTACTCCCCTGCCCCCGGTTAATTTGCATATAATATTCCTAGTAACTATAGAGG
CTTAATGTGCGATAAAAGACAGATAATCGTTCTTTTTAATACTAGTACATTTTACAT
TGATAGGCTTGGATTTCTATAAGAGATACAAATACTAAATTATTATTTAAAAAACA
GCACAAAAGGAAACTCACCCTAACTGTAAAGTAATTGTGTTTGAGACTATAAAT
ATCCCTTGGAGAAAAGCCTTGTTTAGTGAACCGTCAGATGGTACCGTTTAA
ACTCGAGTGAGCGACGAGGACGACTTCGAGATTCTGTGTAAAGCCACAGATGGGCa
gaatctgaagtcgtcccgctaCTAGAGCGGCCGCCACAGCGGGAGATCCAGACATGATAA
GATACATTTTT (SEQ ID NO: 23)

▢ mU6
▢ shDH6
⌐ ⌐ ⌐ U6 terminator ¬ ¬ ¬

GACGCCGCCATCTCTAGGCCCGGCCGGCCCCTCGCACAGACTTGTGGGAGAAGC
TCGGCTACTCCCCTGCCCCGGTTAATTTGCATATAATATTTCCTAGTAACTATAGAGG
CTTAATGTGCGATAAAAGACAGATAATCTGTTCTTTTAATACTAGTACATTTTACA
TGATAGGCTTGGATTTCTATAGAGATACAAATACTAAATTATTATTTTAAAAACA
GCACAAAGGAGAAACTCACCCTAACTGTAAAGTAATTGTGTGTTTGAGACTATAAAT
ATCCCTTGGAGAAAAGCCTTGTTGTTGGATATTTATCTGTAAAGCCACAGATGGGATAAATATCCAAACCGCGAAGCGCCTACTAGA
GCGGCCGCCACAGGCGGGAGATCCAGACATGATAAGATACA TTTTT (SEQ ID NO: 24)

mU6 sh2683

U6 terminator

Fig. 1E

1 39bp: -2_37
Sequence to target: agGGACATCAAACCCGACAACATCCTGCTGGACCGCTGT
Reverse complement: ACAGCGGTCCAGCAGGATGTTGTCGGGTTTGATGTCCct GGGTCTAGAtaacaacataggagctgtgattggctgttttcagccaatcagcactgActcattgcatagcctttacaagcggtcacaaa
ctcaagaaacgagcggtttaatagtctttagaaatattgtttatcgaacgaataaggaactgtgctttgtgattcacatatcagtggaggggtg
tggaaatggcacctgatctcacctcagaagtgagttgatgtcctTccctggctcgtcagacgcacttccgcagACAGCG
GTCCAGCAGGATGTTGTCGGGTTTGATGTCCctAATTTTTGGAGcaggttttctgacttcggtcggaai
aaccccTcccaafttcactggtctacaatgaaagcaaaacagtfctcttcccccgtcgtgagaggggtttgatcttctttctctggttt
cctaggaaacgctatgtgctagcaaa (SEQ ID NO: 25)

Loop
*Italicized = loop sticker sequence*
Sm binding (OPT: AATTTTGGAG)
U7 promoter and 3'UTR
Antisense sequences
XbaI- -NheI

Fig. 2A

2 49bp: 70_+24
Sequence to target: CCTCAAGCTGCGGGCAGATGGAACGgtgagccagtgcctggccacaga
Reverse complement: tctgtggccaggcactgctcacCGTTCCATCTGCCCGCAGCTTGAGG GGGTCTAGAtaacaacatagaagagctgtgattggctgtttcagccaatcagcactgActcatttgcatagccttttacaagcgtcacaaa
ctcaagaaacgagcggttttaatagtctttagaatattgtttatgaaccgaataagaaactgtgtcttgtgattcacatatcagtggagggtg
tgaaatggcacctgatctcaccctcacgaaagtgagttgatgtcctTccctggctcgtcacagacgcacttcgc##tctgtggccag
ggcactgctgctcacCGTTCCATCTGCCCGCAGCTTGAGGAATTTTTGGACcagttttctgacttcggtcgg
aaaaccccctccaattcactgtctacaatgaaagcaaaacagttctttcccgctcccggtgtgagagggggcttgatcctctctggt
ttcctaggaaacgctatgtgctagcaaa (SEQ ID NO: 26)

Fig. 2B

3 35bp: 62_+2
Sequence to target: GGCTCTTGCCTCAAGCTGCGGGCAGATGGAACGgt
Reverse complement: acCGTTCCATCTGCCCGCAGCTTGAGGCAAGAGCC GGGTCTAGAtaacaacatagaagagctgtgattggctgtttcagccaatcagcactgActcatttgcatagccttttacaagcgtcacaaa
ctcaagaaacgagcggttttaatagtctttagaatattgtttatgaaccgaataagaaactgtgtcttgtgattcacatatcagtggagggtg
tgaaatggcacctgatctcaccctcacgaaagtgagttgatgtcctTccctggctcgtcacagacgcacttcgc##acCGTTCC
ATCTGCCCGCAGCTTGAGGCAAGAGCCcagttttctgacttcggtcgaaaacccct
cccaattcactgtctacaatgaaagcaaaacagttctttcccgctcccggtgtgagagggggcttgatcctctctggtttcctagga
aacgctatgtgctagcaaa (SEQ ID NO: 27)

Sequence to target: gcctgtgggaccacagaaggaggttcatt
Reverse complement: aatgaacctccttctgtggtcccaccaggc;

GGGTCTAGAtaacaacataagagctgtgattggctgtttcagccaatcagcactgActcatttgcatagcttacaagcggtcacaaa
ctcaagaaacgagcggttaatgtctttagaatattgtttatcgaaccgaataagaaactgtgcttttgattcacatatcagtggagggtg
tggaaatggcacctgatctcaccctcatcgaaagtggagttgatgtcctTccctgctcgtacagacgcactccgcaaatgaacctcc;
cttctgtggtcccaccaggcAATTTTTGGAGcaggttttctgacttcggtcggaaaac
gcaaaacagttctcttcccgtcccgtgtgagaggggcttgatccttctctggtttcctaggaaacgctacaacgctactagcaaa
(SEQ ID NO: 28)

Sequence to target: cgcagGAGACACTGTGTCCGACATTCGGGAAGGTGCGCGC.
Reverse complement: GCGGGCACCTTCCCGAATGTCCGACAGTGTCTCctgcg;

GGGTCTAGAtaacaacataagagctgtgattggctgtttcagccaatcagcactgActcatttgcatagcttacaagcggtcacaaa
ctcaagaaacgagcggttaatgtctttagaatattgtttatcgaaccgaataagaaactgtgcttttgattcacatatcagtggagggtg
tggaaatggcacctgatctcaccctcatcgaaagtggagttgatgtcctTccctgctcgtacagacgcactccgcaaGCGGCGC;
ACCTTCCCGAATGTCCGACAGTGTCTCctgcgAATTTTTGGAGcaggttttctgacttcggtcggaaaac
ccctcccacagttctcttcccgtcccgtgtgagaggggcttgatccttctctggtttccta
ggaaacgctatgtgctagcaaa (SEQ ID NO: 29)

Fig. 2E

2 39bp: 27_66
Sequence to target: TGCGCCGCTAGGGGTCCACCTGCCTTTTGTGGGCTACTCC
Reverse complement: GGAGTAGCCCACAAAAGGCAGGTGGACCCCTAGCGGGCA GGGTCTAGAtaacaacatagaagagctgtgattggctgtttcagccaatcagcactgActcattgcatagctttacaagcgtcacaaa
ctcaagaaacgagcggtttaatagtctttagaatattgttatcgaaccgaataagaaactgtcttgtgattcacatatcagtggaggggtg
tggaaatggcacctgatctcaccctcatcgaaagtggagttgatgtccTccctggctcgtacagacgcacttccgca*a*acGGAGTA:
GCCCACAAAAGGCAGGTGGACCCCTAGCGGGCCA AATTTTTGGAG caggttttctgacttcggtc
ggaaaaccctpccaatttcactgtctacaatgaaagcaaaacagttctcttcccgctcccggtgtgagaggggctttgatccttctct
ggtttcctaggaaacgcgtatgtggctagcaaa (SEQ ID NO: 30)

Fig. 2F

3 29bp: 60_+2 :
Sequence to target: CTACTCCTACTCCTGCATGGCCCTCAGgt
Reverse complement: acCTGAGGGCCATGCAGGAGTAGGAGTAG;

GGGTCTAGAtaacaacatagaagactgattggctgtttcagccaatcagcactgActcattgcatagctttacaagcgtcacaaa
ctcaagaaacgagcggtttaatagtctttagaatattgttatcgaaccgaataagaaactgtcttgtgattcacatatcagtggaggggtg
tggaaatggcacctgatctcaccctcatcgaaagtggagttgatgtccTccctggctcgtacagacgcacttccgca*a*acCTGAG:
GGCCATGCAGGAGTAGGAGTAG caggttttctgacttcggtcggaaaaccctpccaatttc
actgtctacaatgaaagcaaaacagttctcttcccgctctcgatcccttgatccttgatccttctctctggtttcctaggaaaaccgtat
gtggctagcaaa (SEQ ID NO: 31)

Fig. 2G

4 39bp: -35_4
Sequence to target: gacgactgctgctcacatctgtgtcttgcgcagGAGA
Reverse complement: TCTCctgcgcaagacacagatgtgagcagcagtcgtc GGTCTAGAtaacaacataggagctgtgattggctgtttcagccaatcagcactgActcattgcatagctttacaagcggtcacaaa
ctcaagaaacgagcggttttaatagtcttttagaatattgtttatcgaaccgaataagaaactgtgcttttgattcacatcagtggaggggtg
tggaaatggcacctgatctcaccctcgaaagtggagttgatgtcctTcctggctgctacagacgcactccgcaaTCTCctgcg
caagacacagatgtgagcagcagtcgtcAATTTTTGGAGcaggtttctgacttcggtcggaaaccctccaattcactgg
tctacaatgaaagcaaaacagttctcttcccccggtgtgagagggggcttgatcctctcgtttcctaggaaaacgctgtttcctaggaaa
ctagcaaa (SEQ ID NO: 32)

Fig. 2H

>U7-15CTG
Sequence to target: CTGCTGCTGCTGCTGCTGCTGCTGCTGCTGCTG
Reverse complement: CAGCAGCAGCAGCAGCAGCAGCAGCAGCAGCAG GGTCTAGAtaacaacataggagctgtgattggctgtttcagccaatcagcactgActcattgcatagctttacaagcggtcacaaa
ctcaagaaacgagcggttttaatagtcttttagaatattgtttatcgaaccgaataagaaactgtgcttttgattcacatcagtggaggggtg
tggaaatggcacctgatctcaccctcgaaagtggagttgatgtcctTcctggctgctacagacgcactccgcaaCAGCAGCAG
CAGCAGCAGCAGCAGCAGCAGCAGCAGCAGCAGAATTTTTGGAGcaggtttctgacttcggtcggaaaccctcc
caattcactgtctacaatgaaagcaaaacagttctcttcccccggtgtgagagggggcttgatcctctcgtttcctaggaaa
cgcgtatgtggctagcaaa (SEQ ID NO: 33)

Fig. 2I

```
>U7-20CTG
Sequence to target:
CTGCTGCTGCTGCTGCTGCTGCTGCTGCTGCTGCTGCTGCTGCTGCTGCTG
CAGCAGCAGCAGCAGCAGCAGCAGCAGCAGCAGCAG
Reverse complement GGGTCTAGAtaacaacataggagctgtgattgctgtttcagccaatcagcactgActcatttgcatagcctttacaagcggtcacaaa
ctcaagaaacgagcggtttaatagtctttagaatatgtttatcgaaacgaatgatgtcctTccctggctcgtacagacgcactccgcaaCAGCAGCAG
tgaaatggcacctgatctcacctgaaagtgagttgatgtcctTccctggctcgtacagacgcactccgcaaCAGCAGCAG
CAGCAGCAGCAGCAGCAGCAGCAGCAGCAGCAGCAGCAGAATTTTTGGAGcaggttttgactt
cggtcggaaaaccccctcccaatttcactgtcaatgaaagcaaaacagttcttcccccgctccccggtgtgagagggcttgatcc
ttctctgtttcctaggaaacgcgtatggctagcaaa (SEQ ID NO: 34)
```

Fig. 2J

```
>U7-5'CTG
Sequence to target: GGTCCTTGTAGCCGGGAATGCTGCTGCTGCTGCTG
Reverse complement: CAGCAGCAGCAGCAGCATTCCCGGCTACAAGGACC GGGTCTAGAtaacaacataggagctgtgattgctgtttcagccaatcagcactgActcatttgcatagcctttacaagcggtcacaaa
ctcaagaaacgagcggtttaatagtctttagaatatgtttatcgaaacgaatgatgtcctTccctggctcgtacagacgcactccgcaa
tgaaatggcacctgatctcacctgaaagtgagttgatgtcctTccctggctacaagacgcactccgcaaAATTTTTGGAGCAGCAG
AGCAGCAGCAGCAGCATTCCCGGCTACAAGGACcagtctcttcccccgctccccggtgtgagagggcttgatcctctct
ggaaaaccccctcccaatttcactgtctacaatgaaagcaaaacagttcttcccccgctccccggtgtgagagggcttgatcctctct
ggtttcctaggaaacgcgtatggctagcaaa (SEQ ID NO: 35)
```

Fig. 2K

```
>U7-3'CTG
Sequence to target: CTGCTGCTGCTGCTGCTGCTGCTGGGGGGATCACAGACCATTTC
Reverse complement: GAAATGGTCTGTGATCCCCCAGCAGCAGCAGCAGCAG GGGTCTAGAtaacaacataggagctgtgattgctgtttcagccaatcagcactgActcatttgcatagcctttacaagcggtcacaaa
ctcaagaaacgagcggtttaatagtctttagaatatgtttatcgaaacgaatgatgtcctTccctggctcgtacagacgcactccgcaaGAAATG
GTCTGTGATCCCCCAGCAGCAGCAGCAGAATTTTTGGAGcaggttttgactcggt
cggaaaaccccctcccaatttcactgtctacaatgaaagcaaaacagttcttcccccgctccccggtgtgagagggcttgatccttctc
tggtttcctaggaaacgcgtatggctagcaaa (SEQ ID NO: 36)
```

Fig. 2L

I/ Antisense sequences targeting CUG repeats

The 4 antisense sequences that will be used in this study. (1) and (2) target the CUG repeats and can bind several times. (3) and (4) are junctionals and bind with either 5' or 3' sequence and CUG repeats.

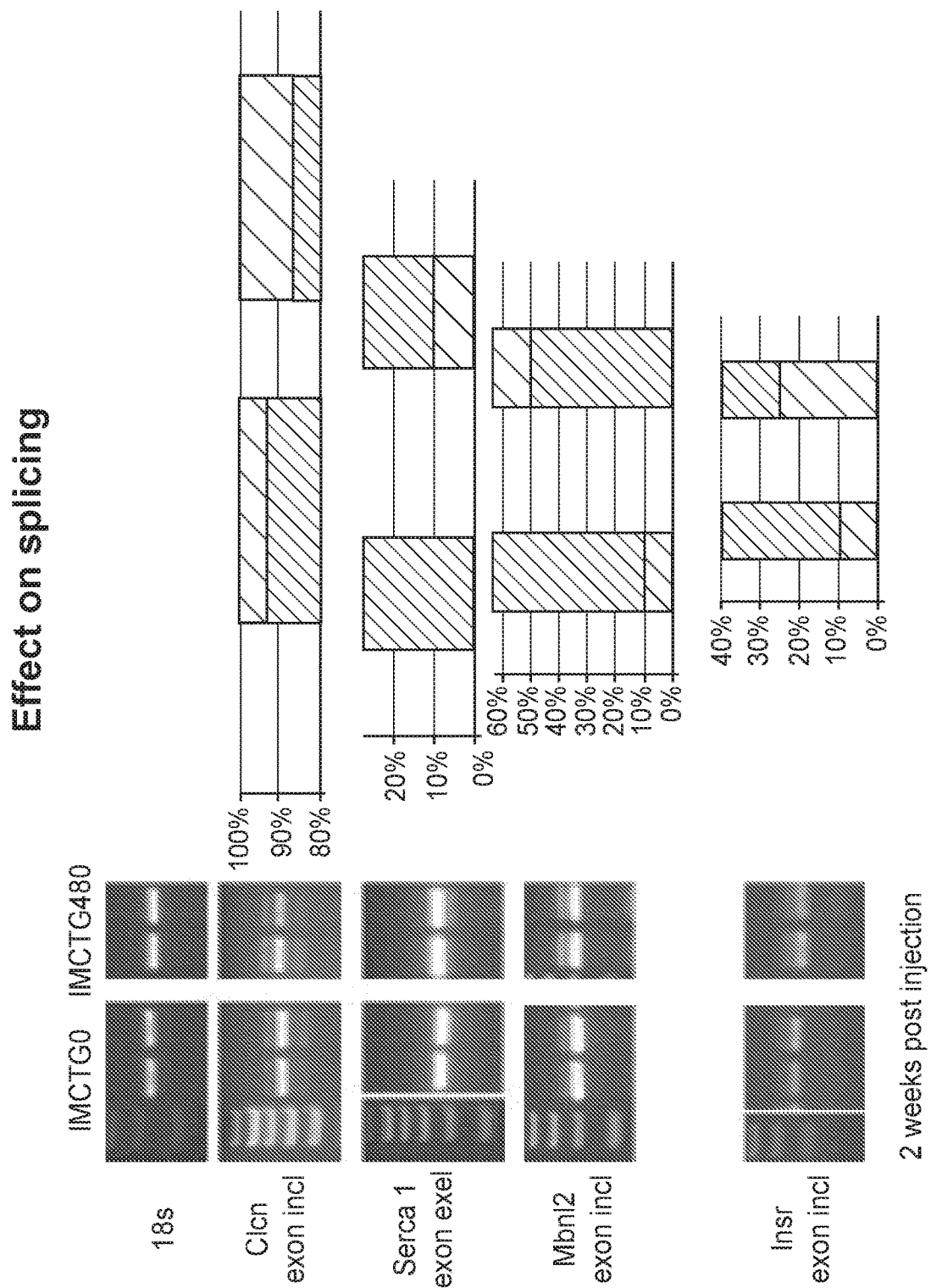

| DMPK Exon 7-8 Expression Normalized to Housekeeping Genes | | |
|---|---|---|
| Construct | 20190213 | 20190211 |
| Pla 1 (scAAV comprising U6T6.sh2577 (i.e., SEQ ID NO: 20)) | -50% | -53% |
| Pla 2 (scAAV comprising U6T6.sh2683 (i.e., SEQ ID NO: 24)) | -44% | -40% |

RECOMBINANT VIRUS PRODUCTS AND METHODS FOR INHIBITING EXPRESSION OF DYSTROPHIA MYOTONICA PROTEIN KINASE AND/OR INTERFERING WITH A TRINUCLEOTIDE REPEAT EXPANSION IN THE 3' UNTRANSLATED REGION OF THE DMPK GENE

FIELD

The disclosure relates to RNA interference-based products and methods for inhibiting the expression and/or interfering with the repeat expansion of the CTG trinucleotide repeat in the 3' untranslated region of the dystrophia myotonica protein kinase (DMPK) gene. Recombinant adeno-associated viruses of the disclosure deliver DNAs encoding non-coding RNAs that knock down the expression of DMPK or interfere with CTG repeat expansion. The methods have application in the treatment of muscular dystrophies, particularly myotonic dystrophy.

INCORPORATION BY REFERENCE OF THE SEQUENCE LISTING

This application contains, as a separate part of disclosure, a Sequence Listing in computer-readable form (filename: 53317A_Seqlisting.txt; 48,018 bytes—ASCII text file created Aug. 21, 2019) which is incorporated by reference herein in its entirety.

BACKGROUND

Myotonic dystrophy (DM) is characterized by myotonia, muscle dysfunction and less commonly by cardiac conduction defects. There are two main types: type-1 (DM1) which are caused by mutations in the dystrophia myotonica protein kinase (DMPK) gene and type 2 (DM2) caused by mutations in the CCHC-type zinc finger nucleic acid binding protein (CNBP) gene. Patients and families are severely impacted by these diseases that affect muscles, the heart, and the nervous system causing cognitive defects. Currently, no therapeutic treatment is available for both of these severe disorders, leaving patients with only the choice of symptom management.

DM1 is one of the most common forms of adult-onset muscular dystrophy. DM1 affects skeletal muscle, heart, brain, skin, eye and the endocrine system. The prevalence of myotonic dystrophy is estimated to be 1:8,000 but a higher prevalence has been reported in Finland and other European countries.

DM1, at least in some instances, is caused by the presence of CTG nucleotide repeats in the 3' untranslated region of the DMPK gene. These toxic repeats are processed and accumulate in the nucleus where they trap other proteins which are not able to perform their regular job causing the observed disease symptoms. There remains a need in the art for a treatment for DM, including DM1, and products and methods to test new means for treatment.

Only few mouse models for DM1 are available and they do not recapitulate all features of the DM1 disease, which is a burden in the DM1 research field since it complicates the testing of promising therapeutic new drugs. There remains a need in the art for a treatment for DM1 and a model to test new methods for treating DM1.

SUMMARY

Provided herein are products and methods for treating myotonic dystrophy type-1 (DM1) in a subject in need thereof. The disclosure provides RNA interference (RNAi)-based products and methods for preventing or inhibiting the expression of the dystrophia myotonica protein kinase (DMPK) gene, including the CTG nucleotide repeats, also known as toxic repeats, in the 3' untranslated region of the DMPK gene. The methods involve delivering inhibitory RNAs specific for the DMPK gene to cells of the subject. In some aspects, the methods use adeno-associated virus (AAV) to deliver inhibitory RNAs which target the DMPK mRNA or the CUG repeats in the 3' untranslated region of the DMPK gene. The DMPK inhibitory RNAs of the disclosure include, but are not limited to, antisense RNAs, small inhibitory RNAs (siRNAs), short hairpin RNAs (shRNAs), small nuclear RNAs (snRNAs or U-RNAs), or artificial microRNAs (DMPK miRNAs) that inhibit expression of DMPK.

In some aspects, the disclosure includes nucleic acids containing an inhibitory RNA that reduces expression of a DMPK gene (e.g., a DMPK gene containing a CTG repeat expansion in the 3' untranslated region) operably linked to a U6 snRNA promoter (hereinafter a "DMPK U6shRNA nucleotide") or to a U7 snRNA promoter (hereinafter a "DMPK U7snRNA nucleotide"). In some embodiments of these aspects, the inhibitory RNA that reduces expression of a DMPK gene is an siRNA, shRNA, snRNA, or miRNA, among others.

In some aspects, the disclosure includes nucleic acids comprising RNA-encoding nucleotide sequences comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 3-19.

In some aspects, the disclosure includes the nucleic acids comprising RNA-encoding nucleotide sequences comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 3-7 or their complementary sequence under the control of a U6 promoter. In some aspects, the disclosure includes the nucleic acids comprising RNA-encoding nucleotide sequences comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 8-19 or their complementary sequence under the control of a U7 promoter.

The disclosure provides a nucleic acid comprising (a) a DMPK RNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 3-19 or their complementary sequence; (b) a DMPK U6shRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 20-24 or their complementary sequence; (c) a DMPK U7snRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 25-36 or their complementary sequence; (d) a DMPK RNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 37-48 or their complementary sequence; (e) a DMPK RNA-encoding nucleotide sequence that binds to the sequence set forth in any one of SEQ ID NOs: 37-48; (f) a DMPK RNA reverse complementary sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 49-60; (g) an RNA-encoding reverse complementary sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 61-72; and/or (h) a combination of any one or more of (a), (b), (c), (d), (e), (f), and/or (g).

The disclosure provides a nucleic acid comprising a DMPK U6shRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 20-24; a DMPK U7snRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 25-36 and 61-72; or a combination of a DMPK U6shRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 20-24 and/or a DMPK U7snRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 25-36 and 61-72.

The disclosure additionally provides viral vectors comprising any of the nucleic acids described herein. In some embodiments, the viral vector is an adeno-associated virus (AAV), adenovirus, lentivirus, retrovirus, poxvirus, baculovirus, herpes simplex virus, vaccinia virus, or a synthetic virus (e.g., a chimeric virus, mosaic virus, or pseudotyped virus, and/or a virus that contains a foreign protein, synthetic polymer, nanoparticle, or small molecule).

In some embodiments, the viral vector is an AAV, such as an AAV1 (i.e., an AAV containing AAV1 inverted terminal repeats (ITRs) and AAV1 capsid proteins), AAV2 (i.e., an AAV containing AAV2 ITRs and AAV2 capsid proteins), AAV3 (i.e., an AAV containing AAV3 ITRs and AAV3 capsid proteins), AAV4 (i.e., an AAV containing AAV4 ITRs and AAV4 capsid proteins), AAV5 (i.e., an AAV containing AAV5 ITRs and AAV5 capsid proteins), AAV6 (i.e., an AAV containing AAV6 ITRs and AAV6 capsid proteins), AAV7 (i.e., an AAV containing AAV7 ITRs and AAV7 capsid proteins), AAV8 (i.e., an AAV containing AAV8 ITRs and AAV8 capsid proteins), AAV9 (i.e., an AAV containing AAV9 ITRs and AAV9 capsid proteins), AAV10 (i.e., an AAV containing AAV10 ITRs and AAV10 capsid proteins), AAV11 (i.e., an AAV containing AAV11 ITRs and AAV11 capsid proteins), AAV12 (i.e., an AAV containing AAV12 ITRs and AAV12 capsid proteins), AAV13 (i.e., an AAV containing AAV13 ITRs and AAV13 capsid proteins), AAVrh74 (i.e., an AAV containing AAVrh74 ITRs and AAVrh74 capsid proteins), AAVrh.8 (i.e., an AAV containing AAVrh.8 ITRs and AAVrh.8 capsid proteins), or AAVrh.10 (i.e., an AAV containing AAVrh.10 ITRs and AAVrh.10 capsid proteins).

In some aspects, the viral vector is a recombinant AAV (rAAV) or a self-complementary recombinant AAV (scAAV). In some aspects, the AAV, rAAV, or scAAV is AAV-1, AAV-2, AAV-3, AAV-4, AAV-5, AAV-6, AAV-7, AAV-8, AAV-9, AAV-10, AAV-11, AAV-12, AAV-13, AAV-anc80, AAV rh.74, AAVrh.8, or AAVrh.10.

In some embodiments, the viral vector is a pseudotyped AAV, containing ITRs from one AAV serotype and capsid proteins from a different AAV serotype. In some embodiments, the pseudotyped AAV is AAV2/9 (i.e., an AAV containing AAV2 ITRs and AAV9 capsid proteins). In some embodiments, the pseudotyped AAV is AAV2/8 (i.e., an AAV containing AAV2 ITRs and AAV8 capsid proteins). In some embodiments, the pseudotyped AAV is AAV2/1 (i.e., an AAV containing AAV2 ITRs and AAV1 capsid proteins).

In some embodiments, the AAV contains a recombinant capsid protein, such as a capsid protein containing a chimera of one or more of capsid proteins from AAV1, AAV2, AAV3, AAV4, AAV5, AAV6, AAV7, AAV8, AAV9, AAV10, AAV11, AAV12, AAV13, AAV-anc80, AAVrh74, AAVrh.8, or AAVrh.10.

In some embodiments, the AAV lacks rep and cap genes. In some embodiments, the AAV is a recombinant linear AAV (rAAV) or a recombinant self-complementary AAV (scAAV).

In some embodiments, the disclosure provides a viral vector (e.g., a viral vector described herein, such as an AAV) comprising the nucleic acids comprising inhibitory RNA-encoding nucleotide sequences comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 3-7 under the control of a U6 promoter and/or the nucleic acids comprising RNA-encoding nucleotide sequences comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 8-19 under the control of a U7 promoter.

In some embodiments, the disclosure provides a viral vector (e.g., a viral vector described herein, such as an AAV) comprising a nucleic acid comprising a DMPK U6shRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 20-24; a DMPK U7snRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 25-36 and 61-72; or a combination of a DMPK U6shRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 20-24 and/or a DMPK U7snRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 25-36 and 61-72.

In some embodiments, the disclosure provides a composition comprising any adeno-associated virus as described herein and a pharmaceutically acceptable carrier.

The disclosure also provides a method of inhibiting and/or interfering with expression of a DMPK gene or interfering with the CUG triplet repeat expansion ($CTG^{exp}$) in the 3' untranslated region of the DMPK gene in a cell comprising contacting the cell with a viral vector, such as an AAV vector described herein, comprising any of the nucleic acids as described herein. In some aspects, the viral vector (e.g., AAV, such as a linear AAV or scAAV) comprises a nucleic acid comprising a DMPK U6shRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 20-24; a DMPK U7snRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 25-36 and 61-72; or a combination of a DMPK U6shRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 20-24 and/or a DMPK U7snRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 25-36 and 61-72. In some aspects, the viral vector (e.g., AAV, such as a linear AAV or scAAV) comprises one or more nucleic acids comprising inhibitory RNA-encoding nucleotide sequences comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 3-7 under the control of a U6 promoter and/or one or more nucleic acids comprising RNA-encoding nucleotide sequences comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 8-19 under the control of a U7 promoter.

The disclosure provides a method of treating a subject suffering from a myotonic dystrophy comprising administering to the subject an effective amount of a viral vector (e.g., AAV, such as a linear AAV or scAAV) containing a nucleic acid encoding a DMPK-targeting interfering RNA as described herein. In some aspects, the viral vector (e.g., AAV, such as a linear AAV or scAAV) comprises a nucleic acid comprising a DMPK U6shRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 20-24; a DMPK U7snRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 25-36 and 61-72; or a combination of a DMPK U6shRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 20-24 and/or a DMPK U7snRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 25-36 and 61-72. In some aspects, the viral vector (e.g., AAV, such as a linear AAV or scAAV) comprises one or more nucleic acids comprising inhibitory RNA-encoding nucleotide sequences comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 3-7 under the control of a U6 promoter and/or one or more nucleic acids comprising RNA-encoding nucleotide sequences comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 8-19 under the control of a U7 promoter.

In some embodiments, the disclosure provides a method of treating a myotonic dystrophy in a subject in need thereof comprising the step of administering an effective amount of a viral vector (e.g., AAV, such as a linear AAV or scAAV) containing a nucleic acid encoding a DMPK-targeting interfering RNA described herein to the subject, wherein the genome of the viral vector (e.g., AAV) comprises at least one U6shRNA and/or at least one U7snRNA polynucleotide, or a combination thereof, targeted to (1) inhibit expression of exon 5 of a DMPK gene; (2) inhibit expression of exon 8 of the DMPK gene; and/or (3) interfere with the CUG triplet repeat expansion ($CTG^{exp}$) in the 3' untranslated region or untranslated exon 15 of the DMPK gene. In some aspects, the U6shRNA-encoding polynucleotide is comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 20-24. In some aspects, the U7sRNA-encoding polynucleotide is comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 25-36 and 61-72. In some aspects, the viral vector (e.g., AAV, such as a linear AAV or scAAV) comprises one or more nucleic acids comprising inhibitory RNA-encoding nucleotide sequences comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 3-7 under the control of a U6 promoter and/or one or more nucleic acids comprising RNA-encoding nucleotide sequences comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 8-19 under the control of a U7 promoter.

The disclosure provides a method of treating a myotonic dystrophy in a subject in need thereof comprising the step of administering an effective amount of a viral vector (e.g., AAV, such as a linear AAV or scAAV) to the subject, wherein the genome of the viral vector (e.g., AAV, such as a linear AAV or scAAV) comprises at least one U6shRNA polynucleotide targeted to inhibit expression of exon 5 of a DMPK gene, at least one U6shRNA polynucleotide targeted to inhibit expression of exon 8 of the DMPK gene, or at least one U6shRNA polynucleotide targeted to inhibit expression of the CUG triplet repeat expansion ($CTG^{exp}$) in the 3' untranslated region or untranslated exon 15 of the DMPK gene. In some aspects, the U6shRNA-encoding polynucleotide is comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 20-24.

The disclosure provides a method of treating a myotonic dystrophy in a subject in need thereof comprising the step of administering an effective amount of a viral vector (e.g., AAV, such as a linear AAV or scAAV) to the subject, wherein the genome of the viral vector (e.g., AAV, such as a linear AAV or scAAV) comprises at least one U7snRNA polynucleotide targeted to inhibit expression of exon 5 of a DMPK gene, at least one U7shRNA polynucleotide targeted to inhibit expression of exon 8 of the DMPK gene, or at least one U7shRNA polynucleotide targeted to inhibit expression of the CUG triplet repeat expansion (CTGexp) in the 3' untranslated region or untranslated exon 15 of the DMPK gene. In some aspects, the U7snRNA-encoding polynucleotide is comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 25-36 and 61-72.

The disclosure provides a method of treating a myotonic dystrophy in a subject in need thereof comprising the step of administering an effective amount of a viral vector (e.g., AAV, such as a linear AAV or scAAV) to the subject, wherein the genome of the viral vector (e.g., AAV, such as a linear AAV or scAAV) comprises at least one nucleic acid encoding a U6shRNA polynucleotide targeted to inhibit expression of exon 5 of a DMPK gene, at least one nucleic acid encoding a U6shRNA polynucleotide targeted to inhibit expression of exon 8 of the DMPK gene, and/or at least one nucleic acid encoding a U6shRNA polynucleotide targeted to inhibit expression of the CUG triplet repeat expansion (CTGexp) in the 3' untranslated region or untranslated exon 15 of the DMPK gene in combination with at least one nucleic acid encoding a U7snRNA polynucleotide targeted to inhibit expression of exon 5 of a DMPK gene, at least one nucleic acid encoding a U7snRNA polynucleotide targeted to inhibit expression of exon 8 of the DMPK gene, and/or at least one nucleic acid encoding a U7snRNA polynucleotide targeted to inhibit expression of the CUG triplet repeat expansion (CTGexp) in the 3' untranslated region or untranslated exon 15 of the DMPK gene. In some aspects, a U6shRNA-encoding polynucleotide is comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 20-24 and/or a U7snRNA-encoding polynucleotide is comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 25-36 and 61-72.

The disclosure provides uses of at least one nucleic acid comprising (a) a DMPK RNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 3-19; (b) a DMPK U6shRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 20-24; (c) a DMPK U7snRNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 25-36; (d) a DMPK RNA-encoding nucleotide sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 37-48; (e) a DMPK RNA-encoding nucleotide sequence that binds to the sequence set forth in any one of SEQ ID NOs: 37-48; (f) a DMPK RNA reverse complementary sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 49-60; (g) a DMPK U7RNA-encoding reverse complementary sequence comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identity to the sequence set forth in any one of SEQ ID NOs: 61-72; and/or (h) a combination of any one or more of (a), (b), (c), (d), (e), (f), and/or (g), or a composition comprising said nucleic acid(s) in treating, ameliorating, and/or preventing a myotonic dystrophy in a subject in need thereof.

The disclosure provides uses of at least one viral vector (e.g., AAV, such as a linear AAV or scAAV) as described herein in treating, ameliorating, and/or preventing a myotonic dystrophy in a subject in need thereof.

In some embodiments, the myotonic dystrophy being treated by the methods of the disclosure is DM1. This disclosure also provides a new viral vector (e.g., AAV, such as a linear AAV or scAAV) inducible and multisystemic mouse model of DM1 (iDM1), as described herein. This model is valuable in the testing of new therapeutics for DM, including DM1.

Other features and advantages of the disclosure will become apparent from the following description of the drawing and the detailed description. It should be understood, however, that the drawing, detailed description, and the examples, while indicating embodiments of the disclosed subject matter, are given by way of illustration only, because various changes and modifications within the spirit and scope of the disclosure will become apparent from the drawing, detailed description, and the examples.

Definitions

The terms used in this specification generally have their ordinary meanings in the art, within the context of this invention and the specific context where each term is used. Certain terms are discussed below, or elsewhere in the specification, to provide additional guidance to the practitioner in describing the methods of the invention and how to use them.

As used herein, the term "about" refers to a value that is within 10% above or below the value being described. For example, the phrase "about 100 nucleic acid residues" refers to a value of from 90 to 110 nucleic acid residues.

As used herein, the terms "dystrophia myotonica protein kinase" and its abbreviation, "DMPK," refer to a serine/threonine kinase protein involved in the regulation of skeletal muscle structure and function, for example, in human subjects. The terms "dystrophia myotonica protein kinase" and "DMPK" are used interchangeably herein and refer not only to wild-type forms of the DMPK gene, but also to variants of wild-type DMPK proteins and nucleic acids encoding the same. The nucleic acid sequences of two isoforms of human DMPK mRNA are GenBank Accession Nos. BC026328.1 and BC062553.1, respectively (3' UTRs not included).

As used herein, the term "interfering RNA" refers to a RNA, such as a short interfering RNA (siRNA), micro RNA (miRNA), or short hairpin RNA (shRNA) that suppresses the expression of a target RNA transcript by way of (i) annealing to the target RNA transcript, thereby forming a nucleic acid duplex; and (ii) promoting the nuclease-mediated degradation of the RNA transcript and/or (iii) slowing, inhibiting, or preventing the translation of the RNA transcript, such as by sterically precluding the formation of a functional ribosome-RNA transcript complex or otherwise attenuating formation of a functional protein product from the target RNA transcript. Interfering RNAs as described herein may be provided to a patient, such as a human patient having myotonic dystrophy, in the form of, for example, a single- or double-stranded oligonucleotide, or in the form of a vector (e.g., a viral vector, such as an adeno-associated viral vector described herein) containing a transgene encoding the interfering RNA. Exemplary interfering RNA platforms are described, for example, in Lam et al., Molecular Therapy—Nucleic Acids 4:e252 (2015); Rao et al., Advanced Drug Delivery Reviews 61:746-769 (2009); and Borel et al., Molecular Therapy 22:692-701 (2014), the disclosures of each of which are incorporated herein by reference in their entirety.

As used herein, the term "myotonic dystrophy" refers to an inherited muscle wasting disorder characterized by the nuclear retention of RNA transcripts encoding DMPK and containing an expanded CUG trinucleotide repeat region in the 3' untranslated region (UTR), such as an expanded CUG trinucleotide repeat region having from 50 to 4,000 CUG repeats. Wild-type RMPK RNA transcripts, by comparison, typically contain from 5 to 37 CUG repeats in the 3' UTR. In patients having myotonic dystrophy, the expanded CUG repeat region interacts with RNA-binding splicing factors, such as muscleblind-like protein. This interaction causes the mutant transcript to be retained in nuclear foci and leads to sequestration of RNA-binding proteins away from other pre-mRNA substrates, which, in turn, promotes spliceopathy of proteins involved in modulating muscle structure and function. In type I myotonic dystrophy (DM1), skeletal muscle is often the most severely affected tissue, but the disease also imparts toxic effects on cardiac and smooth muscle, the ocular lens, and the brain. The cranial, distal limb, and diaphragm muscles are preferentially affected. Manual dexterity is compromised early, which causes several decades of severe disability. The median age at death of myotonic dystrophy patients is 55 years, which is usually caused by respiratory failure (de Die-Smulders C E, et al., Brain 121:1557-1563 (1998)).

As used herein, the term "operably linked" refers to a first molecule (e.g., a first nucleic acid) joined to a second molecule (e.g., a second nucleic acid), wherein the molecules are so arranged that the first molecule affects the function of the second molecule. The two molecules may or may not be part of a single contiguous molecule and may or may not be adjacent to one another. For example, a promoter is operably linked to a transcribable polynucleotide molecule if the promoter modulates transcription of the transcribable polynucleotide molecule of interest in a cell. Additionally, two portions of a transcription regulatory element are operably linked to one another if they are joined such that the transcription-activating functionality of one portion is not adversely affected by the presence of the other portion. Two transcription regulatory elements may be operably linked to one another by way of a linker nucleic acid (e.g., an intervening non-coding nucleic acid) or may be operably linked to one another with no intervening nucleotides present.

As used herein, the terms "subject" and "patient" refer to an organism that receives treatment for a particular disease or condition as described herein (such as a heritable muscle-wasting disorder, e.g., myotonic dystrophy). Examples of subjects and patients include mammals, such as humans, receiving treatment for a disease or condition described herein.

As used herein, the terms "treat" or "treatment" refer to therapeutic treatment, in which the object is to prevent or slow down (lessen) an undesired physiological change or disorder, such as the progression of a heritable muscle-wasting disorder, for example, myotonic dystrophy, and particularly, type I myotonic dystrophy. In the context of myotonic dystrophy treatment, beneficial or desired clinical results that are indicative of successful treatment include, but are not limited to, alleviation of symptoms, diminishment of extent of disease, stabilized (i.e., not worsening) state of disease, delay or slowing of disease progression, amelioration or palliation of the disease state, and remission (whether partial or total), whether detectable or undetectable.

BRIEF DESCRIPTION OF THE DRAWINGS

FIGS. 1A-E show U6 shRNA construct sequences. FIG. 1A is U6.sh2577. FIG. 1B is U6T6.sh4364-ex8. FIG. 1C is U6T6.sh5475-ex5. FIG. 1D is U6T6.shD6. FIG. 1E is U6T6.sh2683.

FIGS. 2A-L show U7 snRNA constructs. FIGS. 2A-D target exon 5. FIGS. 2E-H target exon 8. FIGS. 2 I-L target the CTG repeats in the 3' UTR. Each of these sequences was designed to break the reading frame of DMPK and/or interfere with the repeat expansion of the CTG trinucleotide repeat in the 3' untranslated region of the DMPK gene. Nucleotides highlighted in green represent the snRNA loop. Nucleotides highlighted in green and italicized represent the loop sticker sequence. Nucleotides highlighted in purple represent Sm binding. Nucleotides highlighted in yellow represent the U7 promoter and the 3'UTR. Sequences highlighted in gray represent antisense sequence. Sequences highlighted in red in FIG. 2A show XbaI and NheI cleavage sites.

FIG. 3A shows RT-qPCR of DMPK expression in total mRNA isolated from DM1 myoblasts treated with recombinant AAV short hairpin RNAs (rAAV.shRNAs) (i.e., 2577, 2685, and DH6.5). shRNA 2577 and 2683 target the 3' untranslated region of the DMPK gene and shRNA DH6.5 targets the DMPK coding region. FIG. 3B shows Northern blot analysis of total RNA following infection with indicated AAV.shRNAs showing reduction in expanded DMPK transcript "[CTG]2000". Lane 1 label "-ve" represents untreated control cells.

FIG. 4A shows where antisense sequences were designed in exon 5 for disruption in the DMPK sequence (SEQ ID NO: 1 (nucleotide); SEQ ID NO: 2 (amino acid)) for targeting by shRNAs and snRNAs. FIG. 4B shows where antisense sequences were designed in exon 8 for disruption in the DMPK sequence (SEQ ID NO: 1 (nucleotide); SEQ ID NO:

2 (amino acid)) for targeting by shRNAs and snRNAs. FIG. 4C shows where antisense sequences were designed to target CUG repeats in the 3'untranslated region of the DMPK sequence (SEQ ID NO: 1 (nucleotide); SEQ ID NO: 2 (amino acid)) for targeting by shRNAs and snRNAs.

FIG. 5B shows that the expression of AAV.CTG480 results in massive inflammation two weeks post injection and the appearance of centronucleation four weeks post injection, one of the major pathological changes commonly observed in dystrophic muscles, in mouse skeletal muscle compared to control FIG. 5A shows that AAV.CTG0 injection results in no centronucleation compared to injection of AAV.480CTG (FIG. 5B). FIG. 5C shows the splicing alteration of different mRNAs in mouse muscle following administration of AAV.CTG480 compared to controls. RT-PCR on RNA isolated from injected tibialis anterior (TA) muscle at two weeks post-injection with AAV.480CTG or AAV.00TG showed alternatively spliced exons for chloride voltage-gated channel 1 (CLCN1), sarcoendoplasmic reticulum calcium transport ATPase (SERCA) 1 (SERCA1), muscleblind-like protein 2 (MBNL2) and insulin receptor (IR or INSR) genes only in AAV.CTG480 injected muscle. These results demonstrate the ability of the AAV.GFP-CTG480 approach to induce DM1 features in muscle in vivo.

FIG. 9A shows the study design. The three constructs listed in the table (PLA1 (SEQ ID NO: 20), PLA3 (SEQ ID NO: 34), PLA4 (SEQ ID NO: 31)) were each injected $1.25 \times 10^{11}$ vg/animal via intramuscular (IM) injection into the left side of the tibialis anterior (TA) muscle of hemizygous DMSXL mice (Hemi) at four (4) weeks of age. The contralateral leg was the untreated control. Mice were sacrificed at four weeks post dosing and tissues were harvested for RNA expression analysis by RNA sequencing (RNAseq). FIG. 9B shows that PLA1 reduced hDMPK RNA expression in the treated leg compared to the untreated contralateral leg, as evaluated by RNAseq. FIG. 9C shows that there was a 22% reduction in hDMPK levels in PLA1-treated TA muscle mouse legs.

DETAILED DESCRIPTION

Figure 3A:
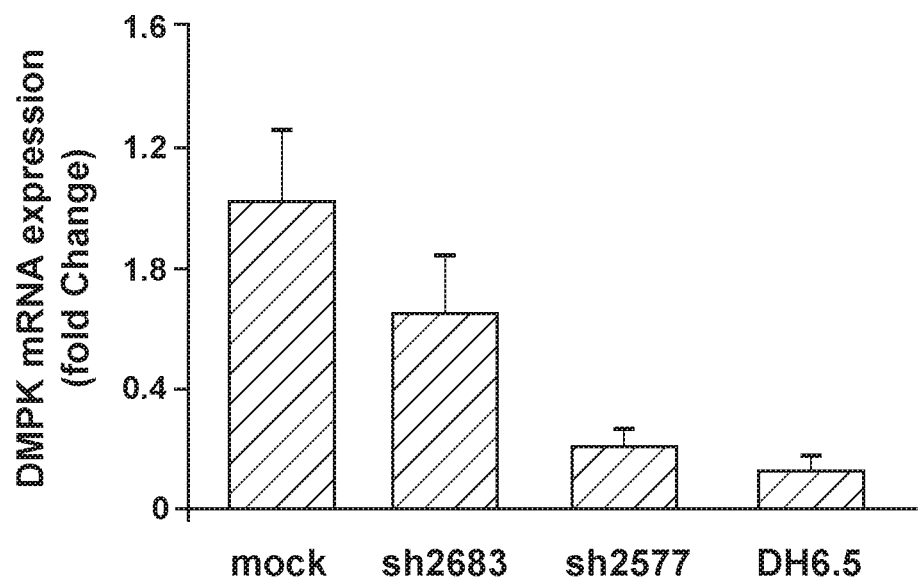
FIG. 3A-B show RT-qPCR and Northern blot results.

In some embodiments, the methods and products described herein are used in the treatment of myotonic dystrophies (DM), the most common muscular dystrophies in adults. The disclosure includes methods and products for treating both DM1 and DM2. Both types 1 (DM1) and 2 (DM2) are autosomal dominant multisystemic disorders with similarities in their clinical manifestation. Clinical symptoms in DM1 and DM2 include progressive muscle weakness, myotonia, elevated CK-levels, cardiac conducting disturbances and cataracts. Symptoms are more inconsistent and extremely diverse in DM2. DM1, at least in some instances, is caused by an expanded (CTG)n repeat sequence (also called a CTG expansion ($CTG^{exp}$) in the 3' untranslated region of a protein kinase (dystrophia myotonia protein kinase (DMPK) gene in exon 15 on chromosome 19q13.3. The $CTG^{exp}$ results in a CUG triplet repeat expansion producing a toxic RNA that forms nuclear foci.

In some aspects, the disclosure includes products and methods in the treatment of DM1. DM1 is the most common form of adult-onset muscular dystrophy and affects skeletal muscle, heart, brain, skin, eye and the endocrine system. The prevalence of myotonic dystrophy is estimated to be 1:8,000 but a higher prevalence has been reported in Finland and other European countries.

The DMPK gene encodes an approximately 69.4 kDa protein (also called myotonin-protein kinase, DM-kinase, DM1 protein kinase, and myotonic dystrophy protein kinase; see UniProtKB—Q09013 (DMPK_HUMAN)), necessary for the maintenance of skeletal muscle structure and function. DMPK is a serine-threonine kinase that is closely related to other kinases that interact with members of the Rho family of small GTPases. Substrates for this enzyme include myogenin, the beta-subunit of the L-type calcium channels, and phospholemman. The 3' untranslated region of this gene contains about 5-38 copies of a CTG trinucleotide repeat. Expansion of this unstable motif to 50-5,000 copies causes myotonic dystrophy type I (DM1), which increases in severity with increasing repeat element copy number. Repeat expansion is associated with condensation of local chromatin structure that disrupts the expression of genes in this region.

DMPK also is critical to the modulation of cardiac contractility and to the maintenance of proper cardiac conduction activity. In some aspects, the nucleic acid encoding human DMPK is set forth in the nucleotide sequence set forth in SEQ ID NO: 1. In some aspects, the amino acid sequence of human DMPK is set forth in the amino acid sequence set forth in SEQ ID NO: 2. In some aspects, mouse DMPK (UniProtKB-P54265) or the nucleic acid sequence which encodes mouse DMPK are also used. In various aspects, the methods of the disclosure also target isoforms and variants of the nucleotide sequence set forth in SEQ ID NO: 1. In some aspects, the variants comprise 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, and 70% identity to the nucleotide sequence set forth in SEQ ID NO: 1. In some aspects, the methods of the disclosure target isoforms and variants of nucleic acids comprising nucleotide sequences encoding the amino acid sequence set forth in SEQ ID NO: 2. In some aspects, the variants comprise 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, and 70% identity to a nucleotide sequence that encodes the amino acid sequence set forth in SEQ ID NO: 2.

In most people, the number of CTG repeats in this gene ranges from about 5 to 34. People with DM1 have from about 50 to 5,000 CTG repeats in most cells. The number of repeats may be even greater in certain types of cells, such as muscle cells. The size of the trinucleotide repeat expansion is associated with the severity of signs and symptoms. People with the classic features of DM1, including muscle weakness and wasting beginning in adulthood, usually have between 100 and 1,000 CTG repeats. People born with the more severe congenital form of DM1 tend to have a larger number of CTG repeats, often more than 2,000. This form of the condition is apparent in infancy and may involve life-threatening health problems. The disclosure includes methods of treating DM1.

As set out above, the mutated DMPK gene produces an altered version of mRNA. The altered mRNA traps proteins to form clumps within the cell. The clumps interfere with the production of many other proteins. For example, the secondary RNA structure sequesters the splicing factor Muscle-blind-like protein 1 (MBNL1; UniProtKB—Q9NR56 (MBNL1_HUMAN)) in these foci and upregulates CUG-binding protein/Elav-like family proteins (CUGBP/CELF1; UniProtKB—Q92879 (CELF1_HUMAN)). As a consequence, adult DM1 patients demonstrate an increased presence of fetal protein isoforms generated by aberrant splicing, such as Sarcoplasmic/endoplasmic reticulum calcium ATPase 1 (SERCA1; UniProtKB—O14983 (AT2A1_HUMAN), chloride voltage-gated channel 1 (CLCN1; UniProtKB—P35523 (CLCN1_HUMAN)), and bridging integrator 1 (BIN1; UniProtKB—O00499 (BIN1_HUMAN)). These changes prevent muscle cells and cells in other tissues from functioning properly, leading to muscle weakness and wasting, and other features of DM1, including cataracts, hypogonadism, defective endocrine functions, male baldness, and cardiac arrhythmias.

In patients with DM1, muscle myotonia/stiffness results in impaired motor control and mobility. Myotonia is one of the most prevalent symptoms of DM1 patients. Myotonia, in various aspects, is quantified electrophysiologically by testing for muscle hyper-excitability using electromyography (EMG) [Kanadia et al., Science 302(5652): 1978-80 (2003); Wheeler et al., J. Clin. Invest. 117(12): 3952-7 (2007); Statland et al., JAMA 308(13): 1357-65 (2012)].

Disease severity varies with the number of repeats. Mildly affected persons have 50 to 150 repeats, patients with classic DM have 100 to 1,000 repeats, and those with congenital onset can have more than 2,000 repeats. As the altered DMPK gene is passed from one generation to the next, the size of the CTG repeat expansion often increases in size. People with about 35 to 49 CTG repeats have not been reported to develop type 1 myotonic dystrophy, but their children are at risk of having the disorder if the number of CTG repeats increases. Repeat lengths from about 35 to 49 are called premutations.

There are currently no therapeutic treatments other than the management of symptoms for patients suffering from this disease. Additionally, up to now, there has been an absence of animal models that adequately recapitulate a DM1 phenotype, including its multi-systemic aspects. A therapeutic approach of the disclosure is the use of viral vectors, such as AAV, to deliver the antisense sequence (via inhibitory RNAs, including non-coding RNAs) to knock-down/interfere with the expression of the DMPK gene and/or the CUG triplet repeat expansion ($CTG^{exp}$) in the 3' untranslated region or untranslated exon 15, since this repeat alone causes the formation of foci that sequester muscle-blind-like protein 1 (MBLN1), which mediates pre-mRNA alternative splicing regulation, and consequently induces the over-expression of CUG-BP, Elav-like family member 1 (CELF1), a highly conserved RNA binding protein that regulates pre-mRNA alternative splicing, mRNA translation, and stability. The disclosure includes such therapeutic approaches to treat DM1.

The disclosure includes the use of RNA interference to downregulate DMPK expression and/or downregulate or interfere with the expression of the CTG repeats to ameliorate and/or treat subjects with DM1 or other disorders resulting from the mutated DMPK gene and the resultant altered version of mRNA. RNA interference (RNAi) is a mechanism of gene regulation in eukaryotic cells that has been considered for the treatment of various diseases. RNAi refers to post-transcriptional control of gene expression mediated by inhibitory RNAs.

Figure 6:
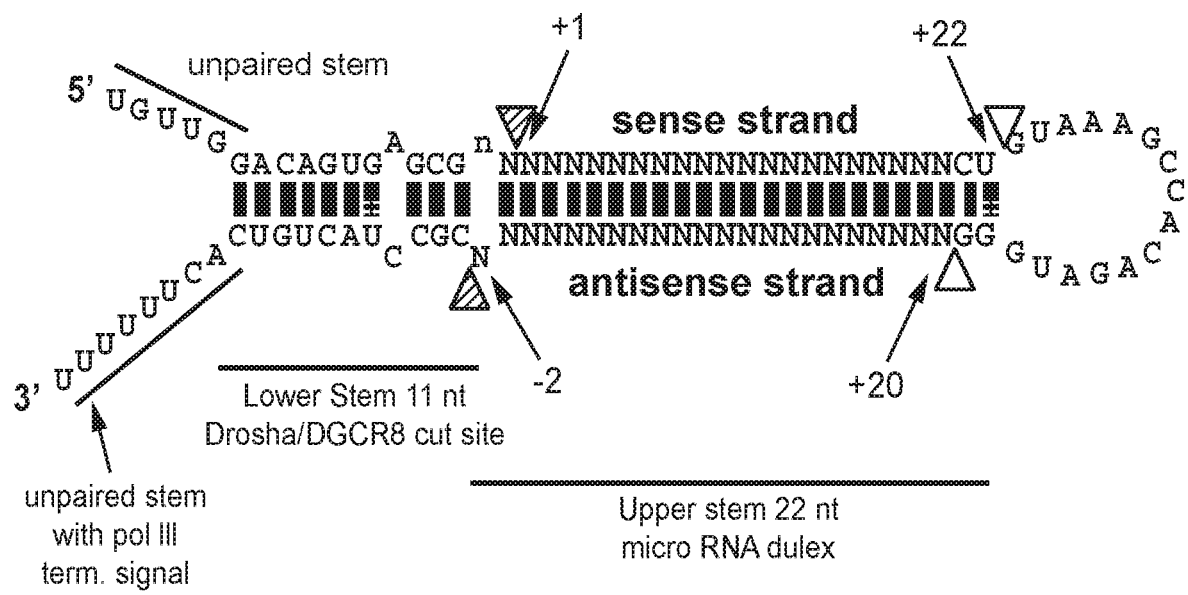
FIG. 6 represents a natural mi/shRNA hsa-miR-30a sequence and structure and shows how inhibitory mRNAs are designed. The natural mir-30a mature sequences are replaced by unique sense (blue text) and antisense (red text) sequences that target the region of interest. The orange nucleotides are derived from human miR-30a, except the 3' terminal poly U, which is added for use as a termination signal for the pol III-dependent U6 promoter. The natural mir-30 Drosha and Dicer cut sites are maintained and indicated by blue and yellow arrowheads, respectively. The mismatch located just upstream of the Drosha cut site (at position −2) is maintained for proper processing.

As an understanding of natural RNAi pathways has developed, researchers have designed artificial shRNAs and snRNAs for use in regulating expression of target genes for treating disease. Several classes of small RNAs are known to trigger RNAi processes in mammalian cells, including short (or small) interfering RNA (siRNA), and short (or small) hairpin RNA (shRNA) and microRNA (miRNA), which constitute a similar class of vector-expressed triggers [Davidson et al., Nat. Rev. Genet. 12:329-40, 2011; Harper, Arch. Neurol. 66:933-8, 2009]. shRNA and miRNA are expressed in vivo from plasmid- or virus-based vectors and may thus achieve long term gene silencing with a single administration, for as long as the vector is present within target cell nuclei and the driving promoter is active (Davidson et al., Methods Enzymol. 392:145-73, 2005). Importantly, this vector-expressed approach leverages the decades-long advancements already made in the muscle gene therapy field, but instead of expressing protein coding genes, the vector cargo in RNAi therapy strategies are artificial shRNA or miRNA cassettes targeting disease genes-of-interest. This strategy is used to express a natural miRNA. Each shRNA/miRNA is based on hsa-miR-30a sequences and structure. The natural mir-30a mature sequences are replaced by unique sense (FIG. 6, blue text) and antisense (FIG. 6, red text) sequences derived from the target gene. The orange nucleotides are derived from human miR-30a, except the 3' terminal poly U, which is added for use as a termination signal for the pol III-dependent U6 promoter. The natural mir-30 Drosha and Dicer cut sites are maintained and indicated by blue and yellow arrowheads, respectively. The mismatch located just upstream of the Drosha cut site (at position −2) should be maintained for proper processing.

In some embodiments, the products and methods of the disclosure comprise short hairpin RNA or small hairpin RNA (shRNA) to affect DMPK expression (e.g., knockdown or inhibit expression) or interfere with the CUG repeat expansion in the 3' untranslated region of the DMPK gene. A short hairpin RNA (shRNA/Hairpin Vector) is an artificial RNA molecule with a tight hairpin turn that can be used to silence target gene expression via RNA interference (RNAi). shRNA is an advantageous mediator of RNAi in that it has a relatively low rate of degradation and turnover, but it requires use of an expression vector. Once the vector has transduced the host genome, the shRNA is then transcribed in the nucleus by polymerase II or polymerase III, depending on the promoter choice. The product mimics pri-microRNA (pri-miRNA) and is processed by Drosha. The resulting pre-shRNA is exported from the nucleus by Exportin 5. This product is then processed by Dicer and loaded into the RNA-induced silencing complex (RISC). The sense (passenger) strand is degraded. The antisense (guide) strand directs RISC to mRNA that has a complementary sequence. In the case of perfect complementarity, RISC cleaves the mRNA. In the case of imperfect complementarity, RISC represses translation of the mRNA. In both of these cases, the shRNA leads to target gene silencing. In some aspects, the disclosure includes the production and administration of an AAV vector expressing DMPK antisense sequences via shRNA. The expression of shRNAs is regulated by the use of various promoters. The promoter choice is essential to achieve robust shRNA expression. In various aspects, polymerase II promoters, such as U6 and H1, and polymerase III promoters are used. In some aspects, U6 shRNAs are used.

In some aspects, the disclosure uses U6 shRNA molecules to inhibit, knockdown, or interfere with gene expression. Traditional small/short hairpin RNA (shRNA) sequences are usually transcribed inside the cell nucleus from a vector containing a Pol III promoter such as U6. The endogenous U6 promoter normally controls expression of the U6 RNA, a small nuclear RNA (snRNA) involved in splicing, and has been well-characterized [Kunkel et al., Nature. 322(6074): 73-7 (1986); Kunkel et al., Genes Dev. 2(2):196-204 (1988); Paule et al., Nucleic Acids Res. 28(6):1283-98 (2000)]. In some aspects, the U6 promoter is used to control vector-based expression of shRNA molecules in mammalian cells [Paddison et al., Proc. Natl. Acad. Sci. USA 99(3):1443-8 (2002); Paul et al., Nat. Biotechnol. 20(5):505-8 (2002)] because (1) the promoter is recognized by RNA polymerase III (poly III) and controls high-level, constitutive expression of shRNA; and (2) the promoter is active in most mammalian cell types. In some aspects, the promoter is a type III Pol III promoter in that all elements required to control expression of the shRNA are located upstream of the transcription start site (Paule et al., Nucleic Acids Res. 28(6):1283-98 (2000)). The disclosure includes both murine and human U6 promoters. The shRNA containing the sense and antisense sequences from a target gene connected by a loop is transported from the nucleus into the cytoplasm where Dicer processes it into small/short interfering RNAs (siRNAs).

In some embodiments, the products and methods of the disclosure comprise small nuclear ribonucleic acids (snRNAs), also commonly referred to as U-RNAs, to affect DMPK expression. snRNAs are a class of small RNA molecules that are found within the splicing speckles and Cajal bodies of the cell nucleus in eukaryotic cells. Small nuclear RNAs are associated with a set of specific proteins, and the complexes are referred to as small nuclear ribonucleoproteins (snRNP, often pronounced "snurps"). Each snRNP particle is composed of a snRNA component and several snRNP-specific proteins (including Sm proteins, a family of nuclear proteins). The snRNAs, along with their associated proteins, form ribonucleoprotein complexes (snRNPs), which bind to specific sequences on the pre-mRNA substrate. They are transcribed by either RNA polymerase II or RNA polymerase III. snRNAs are often divided into two classes based upon both common sequence features and associated protein factors, such as the RNA-binding LSm proteins. The first class, known as Sm-class snRNA, consists of U1, U2, U4, U4atac, U5, U7, U11, and U12. Sm-class snRNA are transcribed by RNA polymerase II. The second class, known as Lsm-class snRNA, consists of U6 and U6atac. Lsm-class snRNAs are transcribed by RNA polymerase III and never leave the nucleus, in contrast to Sm-class snRNA. In some aspects, the disclosure includes the production and administration of an AAV vector comprising U7 snRNA for the delivery of DMPK antisense sequences.

Figure 7:
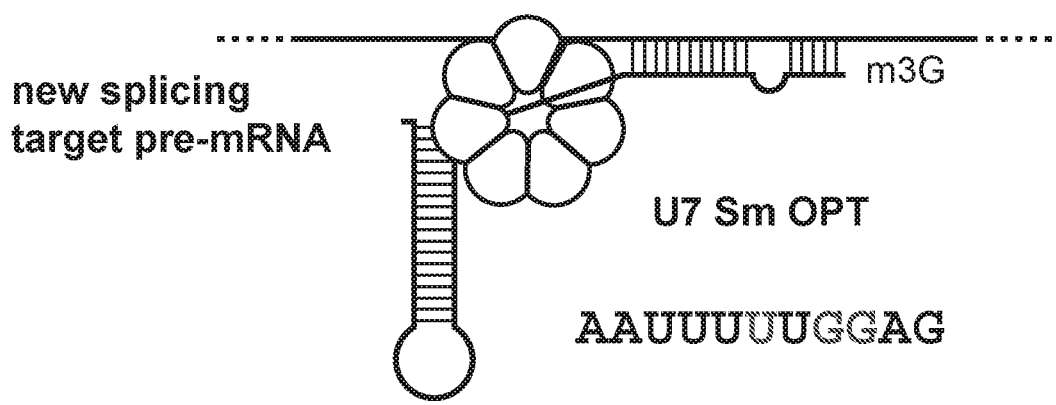
FIG. 7 shows the modified U7snRNA targeting region of interest. By replacing the wild-type U7 Sm binding site with a consensus sequence derived from spliceosomal snRNAs (U7smOPT; the red letter corresponds to nucleotide change between wt sm and smOPT), the resulting RNA assembles with the seven Sm proteins found in spliceosomal snRNAs. The blue donut corresponds to the Lsm protein that binds the modified U7 which are important to recruit splicing factor, thus allowing for the modulation of specific splicing events.

In some aspects, the disclosure uses U7 snRNA molecules to inhibit, knockdown, or interfere with gene expression. U7 snRNA is normally involved in histone pre-mRNA 3' end processing but, in some aspects, is converted into a versatile tool for splicing modulation or as antisense RNA that is continuously expressed in cells [Goyenvalle et al., Science 306(5702): 1796-9 (2004)]. By replacing the wild-type U7 Sm binding site with a consensus sequence derived from spliceosomal snRNAs, the resulting RNA assembles with the seven Sm proteins found in spliceosomal snRNAs (FIG. 7). As a result, this U7 Sm OPT RNA accumulates more efficiently in the nucleoplasm and will no longer mediate histone pre-mRNA cleavage, although it can still bind to histone pre-mRNA and act as a competitive inhibitor for wild-type U7 snRNPs. By further replacing the sequence binding to the histone downstream element with one complementary to a particular target in a splicing substrate, it is possible to create U7 snRNAs capable of modulating specific splicing events. The advantage of using U7 derivatives is that the antisense sequence is embedded into a small nuclear ribonucleoprotein (snRNP) complex. Moreover, when embedded into a gene therapy vector, these small RNAs can be permanently expressed inside the target cell after a single injection [Levy et al., Eur. J. Hum. Genet. 18(9): 969-70 (2010); Wein et al., Hum. Mutat. 31(2): 136-42, (2010); Wein et al., Nat. Med. 20(9): 992-1000 (2014)]. Use of U7 for altering the expression of the CUG repeat has been tested in vitro in a DM1 patient cell line [Francois et al., Nat. Struct. Mol. Biol. 18(1): 85-7 (2011)] where it has been shown that a U7 RNA targeting the CUG repeat results in decreased amounts of DMPK related foci and correction of the aberrant splicing pattern; however, this approach was based on lentivirus and was never pursued further in vivo. The potential of U7snRNA systems in neuromuscular disorders using an AAV approach has been investigated in vivo (AAV.U7) [Levy et al., Eur. J. Hum. Genet. 18(9): 969-70 (2010); Wein et al., Hum. Mutat. 31(2): 136-42 (2010); Wein et al., Nat. Med. 20(9): 992-1000 (2014)]. A single injection of this AAV9.U7, targeting the defective RNA of a mouse model of Duchenne muscular dystrophy, results in long term correction of the disease in every muscle, including heart and diaphragm. The ability to target the heart is really important since DM1 patients display cardiac abnormalities.

U7 snRNA is normally involved in histone pre-mRNA 3' end processing, but also is used as a versatile tool for splicing modulation or as antisense RNA that is continuously expressed in cells. One advantage of using U7 derivatives is that the antisense sequence is embedded into a small nuclear ribonucleoprotein (snRNP) complex. Moreover, when embedded into a gene therapy vector, these small RNAs can be permanently expressed inside the target cell after a single injection.

In some aspects, the disclosure includes sequences encoding inhibitory RNAs to prevent and inhibit the expression of the DMPK gene, including the CTG nucleotide repeats, also known as toxic repeats, in the 3' untranslated region of the DMPK gene. The inhibitory RNAs comprise antisense sequences, which inhibit the expression of exon 5 and/or exon 8 of the DMPK gene and/or interfere with the trinucleotide repeat expansion in the 3' untranslated region of the DMPK gene. In some aspects, the antisense sequences are any of the sequences set forth in any of SEQ ID NOs: 3-19, or variant sequences comprising at least about 90%, 91%, 92%, 93%, 94%, 95%, 96%, 97%, 98%, or 99% identity to the sequences set forth in any of SEQ ID NOs: 3-19. In some aspects, the disclosure includes the antisense sequence set forth in any of SEQ ID NOs: 3-7, or variant sequences thereof comprising at least about 90%, 91%, 92%, 93%, 94%, 95%, 96%, 97%, 98%, or 99% identity to any one of the sequences set forth in SEQ ID NOs: 3-7, under the control of a U6 promoter. In some aspects, the disclosure includes the antisense sequence set forth in any of SEQ ID NOs: 8-19, or variant sequences thereof comprising at least about 90%, 91%, 92%, 93%, 94%, 95%, 96%, 97%, 98%, or 99% identity to any one of the sequences set forth in SEQ ID NOs: 8-19, under the control of a U7 promoter.

Exemplary antisense sequences used in shRNA for targeting DMPK or the CUG triplet repeat expansion include, but are not limited to:

```
U6.sh2577 Antisense sequence targeting DMPK:
                                          (SEQ ID NO: 3)
CTCGAGTGAGCGAGCCTGCTTACTCGGGAAATTTCTGTAAAGCCACAGAT

GGGAAATTTCCCGAGTAAGCAGGCACGCCTACTAGA;

U6T6.sh4364-ex8 Antisense sequence targeting DMPK:
                                          (SEQ ID NO: 4)
CTCGAGTGAGCGAACCTGCCTTTTGTGGGCTACTCTGTAAAGCCACAGAT

GGGAGTAGCCCACAAAAGGCAGGTGTGCCTACTAG;

U6T6.sh5475-ex5 Antisense sequence targeting DMPK:
                                          (SEQ ID NO: 5)
CTCGAGTGAGCGACGACTTCGGCTCTTGCCTCAACTGTAAAGCCACAGAT

GGGTTGAGGCAAGAGCCGAAGTCGGTGCCTACTAG;

U6T6.shD6 Antisense sequence targeting DMPK:
                                          (SEQ ID NO: 6)
CTCGAGTGAGCGAAGGGACGACTTCGAGATTCTGCTGTAAAGCCACAGAT GGGCAGAATCTCGAAGTCGTCCCTCCGCCTA;
and U6T6.sh2683 Antisense sequence targeting DMPK:
                                          (SEQ ID NO: 7)
CTCGAGTGAGCGATTCGGCGGTTTGGATATTTATCTGTAAAGCCACAGAT

GGGATAAATATCCAAACCGCCGAAGCGCCTA.
```

The DNA sequences set out above encode the RNA antisense sequence for targeting DMPK.

Exemplary antisense sequences used in snRNA for targeting DMPK or the CUG triplet repeat expansion include, but are not limited to:

```
#1 39 bp: -2_37 Antisense sequence targeting DMPK:
                                          (SEQ ID NO: 8)
ACAGCGGTCCAGCAGGATGTTGTCGGGTTTGATGTCCCT;

#2 49 bp: 70_+24 Antisense sequence targeting
DMPK:
                                          (SEQ ID NO: 9)
TCTGTGGCCAGGGCACTGGCTCACCGTTCCATCTGCCCGCAGCTTGAGG;

#3 35 bp: 62_+2 Antisense sequence targeting DMPK:
                                          (SEQ ID NO: 10)
ACCGTTCCATCTGCCCGCAGCTTGAGGCAAGAGCC;

#4 31 bp: -61_-31 Antisense sequence targeting
DMPK:
                                          (SEQ ID NO: 11)
AATGAACCTCCCTTCTGTGGTCCCACCAGGC;

#1 39 bp: -5_34 Antisense sequence targeting DMPK:
                                          (SEQ ID NO: 12)
GCGGCGCACCTTCCCGAATGTCCGACAGTGTCTCCTGCG;

#2 39 bp: 27_66 Antisense sequence targeting DMPK:
                                          (SEQ ID NO: 13)
GGAGTAGCCCACAAAAGGCAGGTGGACCCCTAGCGGCGCA;

#3 29 bp: 60_+2 Antisense sequence targeting DMPK:
                                          (SEQ ID NO: 14)
ACCTGAGGGCCATGCAGGAGTAGGAGTAG;

#4 39 bp: -35_4 Antisense sequence targeting DMPK:
                                          (SEQ ID NO: 15)
TCTCCTGCGCAAGACACACAGATGTGAGCAGCAGTCGTC;

U7-15CTG Antisense sequence targeting DMPK:
                                          (SEQ ID NO: 16)
CAGCAGCAGCAGCAGCAGCAGCAGCAGCAGCAGCAGCAG;

U7-20CTG Antisense sequence targeting DMPK:
                                          (SEQ ID NO: 17)
CAGCAGCAGCAGCAGCAGCAGCAGCAGCAGCAGCAGCAGCAGCAGCA

GCAGCAGCAG;

U7-5'CTG Antisense sequence targeting DMPK:
                                          (SEQ ID NO: 18)
CAGCAGCAGCAGCAGCAGCAGCATTCCCGGCTACAAGGACC;
and U7-3'CTG Antisense sequence targeting DMPK:
                                          (SEQ ID NO: 19)
GAAATGGTCTGTGATCCCCCCAGCAGCAGCAGCAGCAG.
```

The DNA sequences set out above encode the RNA antisense sequence for targeting DMPK.

In some aspects, the disclosure provides DMPK shRNAs and snRNAs or U-RNAs which inhibit or interfere with the expression of the DMPK gene and/or interfere with the trinucleotide repeat expansion in the 3' untranslated region of the DMPK gene. In some aspects, the shRNAs are driven by or under the control of a human or a murine U6 promoter, i.e., U6shRNAs. In some aspects, the snRNAs are driven by or under the control of a human or a murine U7 promoter, i.e., U7snRNAs.

In some aspects, the disclosure includes complete constructs (referred to herein as DMPK U6shRNA polynucleotides or polynucleotide constructs and/or DMPK U7snRNA polynucleotides or polynucleotide constructs), which inhibit the expression of exon 5 and/or exon 8 of the DMPK gene and/or interfere with the trinucleotide repeat expansion in the 3' untranslated region of the DMPK gene. Thus, the disclosure provides DMPK U6shRNA-encoding polynucleotides and DMPK U7snRNA-encoding polynucleotides. Exemplary sequences encoding the inhibitory RNAs that are responsible for sequence-specific gene silencing include, but are not limited to SEQ ID NOs: 20-36, or variant sequences thereof comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, or 99% identity to the sequence set forth in any one of SEQ ID NOs: 20-36. In some aspects, these constructs are combined into a single vector and referred to as combinations of DMPK U6shRNA-encoding polynucleotides and DMPK U7snRNA-encoding polynucleotides.

Exemplary sequences used for targeting DMPK or the CUG triplet repeat expansion include, but are not limited to:

U6.sh2577:
(SEQ ID NO: 20)
GACGCCGCCATCTCTAGGCCCGCGCCGGCCCCCTCGCACAGACTTGTGGGAGAA

GCTCGGCTACTCCCCTGCCCCGGTTAATTTGCATATAATATTTCCTAGTAACTATA

GAGGCTTAATGTGCGATAAAAGACAGATAATCTGTTCTTTTTAATACTAGCTACA

TTTTACATGATAGGCTTGGATTTCTATAAGAGATACAAATACTAAATTATTATTTT

AAAAAACAGCACAAAAGGAAACTCACCCTAACTGTAAAGTAATTGTGTGTTTTG

AGACTATAAATATCCCTTGGAGAAAAGCCTTGTTTGCGTTTAGTGAACCGTCAGA

TGGTACCGTTTAAACTCGAGTGAGCGAGCCTGCTTACTCGGGAAATTTCTGTAAA

GCCACAGATGGGAAATTTCCCGAGTAAGCAGGCACGCCTACTAGAGCGGCCGCC

ACAGCGGGGAGATCCAGACATGATAAGATACATTTTTT;

U6T6.sh4364-ex8:
(SEQ ID NO: 21)
GACGCCGCCATCTCTAGGCCCGCGCCGGCCCCCTCGCACAGACTTGTGGGAGAA

GCTCGGCTACTCCCCTGCCCCGGTTAATTTGCATATAATATTTCCTAGTAACTATA

GAGGCTTAATGTGCGATAAAAGACAGATAATCTGTTCTTTTTAATACTAGCTACA

TTTTACATGATAGGCTTGGATTTCTATAAGAGATACAAATACTAAATTATTATTTT

AAAAAACAGCACAAAAGGAAACTCACCCTAACTGTAAAGTAATTGTGTGTTTTG

AGACTATAAATATCCCTTGGAGAAAAGCCTTGTTTGCGTTTAGTGAACCGTCAGA

TGGTACCGTTTAAACTCGAGTGAGCGAACCTGCCTTTTGTGGGCTACTCTGTAAA

GCCACAGATGGGAGTAGCCCACAAAAGGCAGGTGTGCCTACTAGCTAGAGCGGC

CGCCACAGCGGGGAGATCCAGACATGATAAGATACATTTTTT;

U6T6.sh5475-ex5:
(SEQ ID NO: 22)
GACGCCGCCATCTCTAGGCCCGCGCCGGCCCCCTCGCACAGACTTGTGGGAGAA

GCTCGGCTACTCCCCTGCCCCGGTTAATTTGCATATAATATTTCCTAGTAACTATA

GAGGCTTAATGTGCGATAAAAGACAGATAATCTGTTCTTTTTAATACTAGCTACA

TTTTACATGATAGGCTTGGATTTCTATAAGAGATACAAATACTAAATTATTATTTT

AAAAAACAGCACAAAAGGAAACTCACCCTAACTGTAAAGTAATTGTGTGTTTTG

AGACTATAAATATCCCTTGGAGAAAAGCCTTGTTTGCGTTTAGTGAACCGTCAGA

TGGTACCGTTTAAACTCGAGTGAGCGACGACTTCGGCTCTTGCCTCAACTGTAAA

GCCACAGATGGGTTGAGGCAAGAGCCGAAGTCGGTGCCTACTAGCTAGAGCGGC

CGCCACAGCGGGGAGATCCAGACATGATAAGATACATTTTTT;

U6T6.shD6:
(SEQ ID NO: 23)
GACGCCGCCATCTCTAGGCCCGCGCCGGCCCCCTCGCACAGACTTGTGGGAGAA

GCTCGGCTACTCCCCTGCCCCGGTTAATTTGCATATAATATTTCCTAGTAACTATA

GAGGCTTAATGTGCGATAAAAGACAGATAATCTGTTCTTTTTAATACTAGCTACA

TTTTACATGATAGGCTTGGATTTCTATAAGAGATACAAATACTAAATTATTATTTT

AAAAAACAGCACAAAAGGAAACTCACCCTAACTGTAAAGTAATTGTGTGTTTTG

AGACTATAAATATCCCTTGGAGAAAAGCCTTGTTTGCGTTTAGTGAACCGTCAGA

TGGTACCGTTTAAACCTCGAGTGAGCGAAGGGACGACTTCGAGATTCTGCTGTAA

AGCCACAGATGGGCAGAATCTCGAAGTCGTCCCTCCGCCTACTAGAGCGGCCGC

CACAGCGGGGAGATCCAGACATGATAAGATACATTTTTT;

U6T6.sh2683:

(SEQ ID NO: 24)

GACGCCGCCATCTCTAGGCCCGCGCCGGCCCCCTCGCACAGACTTGTGGGAGAA

GCTCGGCTACTCCCCTGCCCCGGTTAATTTGCATATAATATTTCCTAGTAACTATA

GAGGCTTAATGTGCGATAAAAGACAGATAATCTGTTCTTTTTAATACTAGCTACA

TTTTACATGATAGGCTTGGATTTCTATAAGAGATACAAATACTAAATTATTATTTT

AAAAAACAGCACAAAAGGAAACTCACCCTAACTGTAAAGTAATTGTGTGTTTTG

AGACTATAAATATCCCTTGGAGAAAAGCCTTGTTTGCGTTTAGTGAACCGTCAGA

TGGTACCGTTTAAACCTCGAGTGAGCGATTCGGCGGTTTGGATATTTATCTGTAA

AGCCACAGATGGGATAAATATCCAAACCGCCGAAGCGCCTACTAGAGCGGCCGC

CACAGCGGGGAGATCCAGACATGATAAGATACATTTTTT;

U7EX5#1:

(SEQ ID NO: 25)

GGGTCTAGATAACAACATAGGAGCTGTGATTGGCTGTTTTCAGCCAATCAGCACT

GACTCATTTGCATAGCCTTTACAAGCGGTCACAAACTCAAGAAACGAGCGGTTTT

AATAGTCTTTTAGAATATTGTTTATCGAACCGAATAAGGAACTGTGCTTTGTGAT

TCACATATCAGTGGAGGGGTGTGGAAATGGCACCTTGATCTCACCCTCATCGAAA

GTGGAGTTGATGTCCTTCCCTGGCTCGCTACAGACGCACTTCCGCAAACAGCGGT

CCAGCAGGATGTTGTCGGGTTTGATGTCCCTAATTTTTGGAGCAGGTTTTCTGACT

TCGGTCGGAAAACCCCTCCCAATTTCACTGGTCTACAATGAAAGCAAAACAGTTC

TCTTCCCCGCTCCCCGGTGTGTGAGAGGGGCTTTGATCCTTCTCTGGTTTCCTAGG

AAACGCGTATGTGGCTAGCAAA;

U7EX5#2:

(SEQ ID NO: 26)

GGGTCTAGATAACAACATAGGAGCTGTGATTGGCTGTTTTCAGCCAATCAGCACT

GACTCATTTGCATAGCCTTTACAAGCGGTCACAAACTCAAGAAACGAGCGGTTTT

AATAGTCTTTTAGAATATTGTTTATCGAACCGAATAAGGAACTGTGCTTTGTGAT

TCACATATCAGTGGAGGGGTGTGGAAATGGCACCTTGATCTCACCCTCATCGAAA

GTGGAGTTGATGTCCTTCCCTGGCTCGCTACAGACGCACTTCCGCAATCTGTGGC

CAGGGCACTGGCTCACCGTTCCATCTGCCCGCAGCTTGAGGAATTTTTGGAGCAG

GTTTTCTGACTTCGGTCGGAAAACCCCTCCCAATTTCACTGGTCTACAATGAAAG

CAAAACAGTTCTCTTCCCCGCTCCCCGGTGTGTGAGAGGGGCTTTGATCCTTCTCT

GGTTTCCTAGGAAACGCGTATGTGGCTAGCAAA;

U7EX5#3:

(SEQ ID NO: 27)

GGGTCTAGATAACAACATAGGAGCTGTGATTGGCTGTTTTCAGCCAATCAGCACT

GACTCATTTGCATAGCCTTTACAAGCGGTCACAAACTCAAGAAACGAGCGGTTTT

AATAGTCTTTTAGAATATTGTTTATCGAACCGAATAAGGAACTGTGCTTTGTGAT

TCACATATCAGTGGAGGGGTGTGGAAATGGCACCTTGATCTCACCCTCATCGAAA

GTGGAGTTGATGTCCTTCCCTGGCTCGCTACAGACGCACTTCCGCAAACCGTTCC

ATCTGCCCGCAGCTTGAGGCAAGAGCCAATTTTTGGAGCAGGTTTTCTGACTTCG

GTCGGAAAACCCCTCCCAATTTCACTGGTCTACAATGAAAGCAAAACAGTTCTCT

-continued

TCCCCGCTCCCCGGTGTGTGAGAGGGGCTTTGATCCTTCTCTGGTTTCCTAGGAA

ACGCGTATGTGGCTAGCAAA;

U7EX5#4:
(SEQ ID NO: 28)
GGGTCTAGATAACAACATAGGAGCTGTGATTGGCTGTTTTCAGCCAATCAGCACT

GACTCATTTGCATAGCCTTTACAAGCGGTCACAAACTCAAGAAACGAGCGGTTTT

AATAGTCTTTTAGAATATTGTTTATCGAACCGAATAAGGAACTGTGCTTTGTGAT

TCACATATCAGTGGAGGGGTGTGGAAATGGCACCTTGATCTCACCCTCATCGAAA

GTGGAGTTGATGTCCTTCCCTGGCTCGCTACAGACGCACTTCCGCAAAATGAACC

TCCCTTCTGTGGTCCCACCAGGCAATTTTTGGAGCAGGTTTTCTGACTTCGGTCGG

AAAACCCCTCCCAATTTCACTGGTCTACAATGAAAGCAAAACAGTTCTCTTCCCC

GCTCCCCGGTGTGTGAGAGGGGCTTTGATCCTTCTCTGGTTTCCTAGGAAACGCG

TATGTGGCTAGCAAA;

U7EX8#1:
(SEQ ID NO: 29)
GGGTCTAGATAACAACATAGGAGCTGTGATTGGCTGTTTTCAGCCAATCAGCACT

GACTCATTTGCATAGCCTTTACAAGCGGTCACAAACTCAAGAAACGAGCGGTTTT

AATAGTCTTTTAGAATATTGTTTATCGAACCGAATAAGGAACTGTGCTTTGTGAT

TCACATATCAGTGGAGGGGTGTGGAAATGGCACCTTGATCTCACCCTCATCGAAA

GTGGAGTTGATGTCCTTCCCTGGCTCGCTACAGACGCACTTCCGCAAGCGGCGCA

CCTTCCCGAATGTCCGACAGTGTCTCCTGCGAATTTTTGGAGCAGGTTTTCTGACT

TCGGTCGGAAAACCCCTCCCAATTTCACTGGTCTACAATGAAAGCAAAACAGTTC

TCTTCCCCGCTCCCCGGTGTGTGAGAGGGGCTTTGATCCTTCTCTGGTTTCCTAGG

AAACGCGTATGTGGCTAGCAAA;

U7EX8#2:
(SEQ ID NO: 30)
GGGTCTAGATAACAACATAGGAGCTGTGATTGGCTGTTTTCAGCCAATCAGCACT

GACTCATTTGCATAGCCTTTACAAGCGGTCACAAACTCAAGAAACGAGCGGTTTT

AATAGTCTTTTAGAATATTGTTTATCGAACCGAATAAGGAACTGTGCTTTGTGAT

TCACATATCAGTGGAGGGGTGTGGAAATGGCACCTTGATCTCACCCTCATCGAAA

GTGGAGTTGATGTCCTTCCCTGGCTCGCTACAGACGCACTTCCGCAAGGAGTAGC

CCACAAAAGGCAGGTGGACCCCTAGCGGCGCAAATTTTTGGAGCAGGTTTTCTG

ACTTCGGTCGGAAAACCCCTCCCAATTTCACTGGTCTACAATGAAAGCAAAACAG

TTCTCTTCCCCGCTCCCCGGTGTGTGAGAGGGGCTTTGATCCTTCTCTGGTTTCCT

AGGAAACGCGTATGTGGCTAGCAAA;

U7EX8#3
(SEQ ID NO: 31)
GGGTCTAGATAACAACATAGGAGCTGTGATTGGCTGTTTTCAGCCAATCAGCACT

GACTCATTTGCATAGCCTTTACAAGCGGTCACAAACTCAAGAAACGAGCGGTTTT

AATAGTCTTTTAGAATATTGTTTATCGAACCGAATAAGGAACTGTGCTTTGTGAT

TCACATATCAGTGGAGGGGTGTGGAAATGGCACCTTGATCTCACCCTCATCGAAA

GTGGAGTTGATGTCCTTCCCTGGCTCGCTACAGACGCACTTCCGCAAACCTGAGG

GCCATGCAGGAGTAGGAGTAGAATTTTTGGAGCAGGTTTTCTGACTTCGGTCGGA

AAACCCCTCCCAATTTCACTGGTCTACAATGAAAGCAAAACAGTTCTCTTCCCCG

-continued

CTCCCCGGTGTGTGAGAGGGGCTTTGATCCTTCTCTGGTTTCCTAGGAAACGCGT

ATGTGGCTAGCAAA;

U7EX8#4:
(SEQ ID NO: 32)
GGGTCTAGATAACAACATAGGAGCTGTGATTGGCTGTTTTCAGCCAATCAGCACT

GACTCATTTGCATAGCCTTTACAAGCGGTCACAAACTCAAGAAACGAGCGGTTTT

AATAGTCTTTTAGAATATTGTTTATCGAACCGAATAAGGAACTGTGCTTTGTGAT

TCACATATCAGTGGAGGGGTGTGGAAATGGCACCTTGATCTCACCCTCATCGAAA

GTGGAGTTGATGTCCTTCCCTGGCTCGCTACAGACGCACTTCCGCAATCTCCTGC

GCAAGACACACAGATGTGAGCAGCAGTCGTCAATTTTTGGAGCAGGTTTTCTGAC

TTCGGTCGGAAAACCCCTCCCAATTTCACTGGTCTACAATGAAAGCAAAACAGTT

CTCTTCCCCGCTCCCCGGTGTGTGAGAGGGGCTTTGATCCTTCTCTGGTTTCCTAG

GAAACGCGTATGTGGCTAGCAAA;

U7-15CTG:
(SEQ ID NO: 33)
GGGTCTAGATAACAACATAGGAGCTGTGATTGGCTGTTTTCAGCCAATCAGCACT

GACTCATTTGCATAGCCTTTACAAGCGGTCACAAACTCAAGAAACGAGCGGTTTT

AATAGTCTTTTAGAATATTGTTTATCGAACCGAATAAGGAACTGTGCTTTGTGAT

TCACATATCAGTGGAGGGGTGTGGAAATGGCACCTTGATCTCACCCTCATCGAAA

GTGGAGTTGATGTCCTTCCCTGGCTCGCTACAGACGCACTTCCGCAACAGCAGCA

GCAGCAGCAGCAGCAGCAGCAGCAGCAGCAGCAGCAGAATTTTTGGAGCAGGTT

TTCTGACTTCGGTCGGAAAACCCCTCCCAATTTCACTGGTCTACAATGAAAGCAA

AACAGTTCTCTTCCCCGCTCCCCGGTGTGTGAGAGGGGCTTTGATCCTTCTCTGGT

TTCCTAGGAAACGCGTATGTGGCTAGCAAA;

U7-20CTG:
(SEQ ID NO: 34)
GGGTCTAGATAACAACATAGGAGCTGTGATTGGCTGTTTTCAGCCAATCAGCACT

GACTCATTTGCATAGCCTTTACAAGCGGTCACAAACTCAAGAAACGAGCGGTTTT

AATAGTCTTTTAGAATATTGTTTATCGAACCGAATAAGGAACTGTGCTTTGTGAT

TCACATATCAGTGGAGGGGTGTGGAAATGGCACCTTGATCTCACCCTCATCGAAA

GTGGAGTTGATGTCCTTCCCTGGCTCGCTACAGACGCACTTCCGCAACAGCAGCA

GCAGCAGCAGCAGCAGCAGCAGCAGCAGCAGCAGCAGCAGCAGCAGCAGCAGA

ATTTTTGGAGCAGGTTTTCTGACTTCGGTCGGAAAACCCCTCCCAATTTCACTGGT

CTACAATGAAAGCAAAACAGTTCTCTTCCCCGCTCCCCGGTGTGTGAGAGGGGCT

TTGATCCTTCTCTGGTTTCCTAGGAAACGCGTATGTGGCTAGCAAA;

U7-5'CTG:
(SEQ ID NO: 35)
GGGTCTAGATAACAACATAGGAGCTGTGATTGGCTGTTTTCAGCCAATCAGCACT

GACTCATTTGCATAGCCTTTACAAGCGGTCACAAACTCAAGAAACGAGCGGTTTT

AATAGTCTTTTAGAATATTGTTTATCGAACCGAATAAGGAACTGTGCTTTGTGAT

TCACATATCAGTGGAGGGGTGTGGAAATGGCACCTTGATCTCACCCTCATCGAAA

GTGGAGTTGATGTCCTTCCCTGGCTCGCTACAGACGCACTTCCGCAACAGCAGCA

GCAGCAGCAGCAGCATTCCGGCTACAAGGACCAATTTTGGAGCAGGTTTTCTG

ACTTCGGTCGGAAAACCCCTCCCAATTTCACTGGTCTACAATGAAAGCAAAACAG

```
-continued
TTCTCTTCCCCGCTCCCCGGTGTGTGAGAGGGGCTTTGATCCTTCTCTGGTTTCCT

AGGAAACGCGTATGTGGCTAGCAAA;
and

U7-3'CTG:
                                                     (SEQ ID NO: 36)
GGGTCTAGATAACAACATAGGAGCTGTGATTGGCTGTTTTCAGCCAATCAGCACT

GACTCATTTGCATAGCCTTTACAAGCGGTCACAAACTCAAGAAACGAGCGGTTTT

AATAGTCTTTTAGAATATTGTTTATCGAACCGAATAAGGAACTGTGCTTTGTGAT

TCACATATCAGTGGAGGGGTGTGGAAATGGCACCTTGATCTCACCCTCATCGAAA

GTGGAGTTGATGTCCTTCCCTGGCTCGCTACAGACGCACTTCCGCAAGAAATGGT

CTGTGATCCCCCAGCAGCAGCAGCAGCAGCAGAATTTTTGGAGCAGGTTTTCTG

ACTTCGGTCGGAAAACCCCTCCCAATTTCACTGGTCTACAATGAAAGCAAAACAG

TTCTCTTCCCCGCTCCCCGGTGTGTGAGAGGGGCTTTGATCCTTCTCTGGTTTCCT

AGGAAACGCGTATGTGGCTAGCAAA.
```

The DNA sequences set out above encode the U6 shRNA or the U7 snRNA sequence for targeting DMPK.

In some aspects, these constructs are called 5#1 (or #1 39 bp: −2_37), 5#2 (or #2 49 bp: 70_+24), 5#3 (or #3 35 bp: 62_+2), 5#4 (#4 31 bp: −61_-31), 8#1 (or #1 39 bp: −5_34), 8#2 (or #2 39 bp: 27_66), 8#3 (#3 29 bp: 60_+2), 8#4 (#4 39 bp: −35_4), 15CAG (or U7-15CTG), 20CAG (U7-20CTG), 5'CAG (U7-5'CTG), 3'CAG (U7-3'CTG), U6.sh2577, U6T6.sh4364-ex8, U6T6.sh5475-ex5, U6T6.shD6, and U6T6.sh2683. The four antisense sequences targeting the CUG repeats can bind several times.

Exemplified DMPK shRNA constructs (i.e., U6shRNA constructs) are those encoded by the nucleic acids comprising the nucleotide sequences set out in SEQ ID NOs: 20-24. Exemplified DMPK snRNA constructs (i.e., U7snRNAs) are those encoded by the nucleic acids comprising the nucleotide sequences set out in SEQ ID NOs: 25-36.

In some aspects, the disclosure includes target sequences to which the U6 shRNAs and U7 snRNAs are designed to bind. Exemplary target sequences include, but are not limited to, the nucleotide sequences set out in SEQ ID NOs: 37-48, as set out below:

```
Targeting exon '5'
#1 39 bp: -2_37
Sequence to target:
                                             (SEQ ID NO: 37)
AGGGACATCAAACCCGACAACATCCTGCTGGACCGCTGT

#2 49 bp: 70_+24
Sequence to target:
                                             (SEQ ID NO: 38)
CCTCAAGCTGCGGGCAGATGGAACGGTGAGCCAGTGCCC

TGGCCACAGA

#3 35 bp: 62_+2
Sequence to target:
                                             (SEQ ID NO: 39)
GGCTCTTGCCTCAAGCTGCGGGCAGATGGAACGGT

#4 31 bp: -61_-31
Sequence to target:
                                             (SEQ ID NO: 40)
GCCTGGTGGGACCACAGAAGGGAGGTTCATT Targeting exon '8'
1 39 bp: -5_34
Sequence to target:
                                             (SEQ ID NO: 41)
CGCAGGAGACACTGTCGGACATTCGGGAAGGTGCGCCGC

#2 39 bp: 27_66
Sequence to target:
                                             (SEQ ID NO: 42)
TGCGCCGCTAGGGGTCCACCTGCCTTTTGTGGGCTACTC

C

#3 29 bp: 60_+2:
Sequence to target:
                                             (SEQ ID NO: 43)
CTACTCCTACTCCTGCATGGCCCTCAGGT

#4 39 bp: -35_4
Sequence to target:
                                             (SEQ ID NO: 44)
GACGACTGCTGCTCACATCTGTGTGTCTTGCGCAGGAGA Targeting CTG repeats
U7-15CTG
Sequence to target:
                                             (SEQ ID NO: 45)
CTGCTGCTGCTGCTGCTGCTGCTGCTGCTGCTGCTGCTG

CTGCTG

U7-20CTG
Sequence to target:
                                             (SEQ ID NO: 46)
CTGCTGCTGCTGCTGCTGCTGCTGCTGCTGCTGCTGCTG

CTGCTGCTGCTGCTGCTG

U7-5'CTG
Sequence to target:
                                             (SEQ ID NO: 47)
GGTCCTTGTAGCCGGGAATGCTGCTGCTGCTGCTGCTGC TG;
and U7-3'CTG
Sequence to target:
                                             (SEQ ID NO: 48)
CTGCTGCTGCTGCTGCTGGGGGGATCACAGACCATT

TC
```

In some aspects, the disclosure includes reverse complementary sequences which inhibit the expression of exon 5 and/or exon 8 of the DMPK gene and/or interfere with the trinucleotide repeat expansion in the 3' untranslated region of the DMPK gene. Thus, the disclosure provides DNA sequences encoding reverse complements and RNA sequences of the reverse complements. Exemplary sequences include, but are not limited to SEQ ID NOs: 8-19, 49-60, and 61-72, or variant sequences thereof comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, or 99% identity to the sequence set forth in any one of SEQ ID NOs: 8-19, 49-60, and 61-72. In some aspects, these sequences are under the control of a U6 or U7 promoter, i.e., see, for example, SEQ ID NOs: 61-72. In some aspects, one or more copies of these sequences are combined into a single vector.

In some aspects, exemplary DNA sequences encoding reverse complement sequences and RNA reverse complement sequences used for targeting DMPK or the CUG triplet repeat expansion. Such exemplary sequences include, but are not limited to sequences as set out below:

```
Targeting exon '5'
#1 39 bp: -2_37:
Reverse complement:
                                    (SEQ ID NO: 8)
ACAGCGGTCCAGCAGGATGTTGTCGGGTTTGATGTCCCT RNA Reverse complement:
                                    (SEQ ID NO: 49)
ACAGCGGUCCAGCAGGAUGUUGUCGGGUUUGAUGUCCCU REVERSE COMPLEMENT U7EX5#1:
                                    (SEQ ID NO: 61)
TTTGCTAGCCACATACGCGTTTCCTAGGAAACCAGAGAAG

GATCAAAGCCCCTCTCACACACCGGGGAGCGGGGAAGAGA

ACTGTTTTGCTTTCATTGTAGACCAGTGAAATTGGGAGGG

GTTTTCCGACCGAAGTCAGAAAACCTGCTCCAAAAATTAG

GGACATCAAACCCGACAACATCCTGCTGGACCGCTGTTTG

CGGAAGTGCGTCTGTAGCGAGCCAGGGAAGGACATCAACT

CCACTTTCGATGAGGGTGAGATCAAGGTGCCATTTCCACA

CCCCTCCACTGATATGTGAATCACAAAGCACAGTTCCTTA

TTCGGTTCGATAAACAATATTCTAAAAGACTATTAAAACC

GCTCGTTTCTTGAGTTTGTGACCGCTTGTAAAGGCTATGC

AAATGAGTCAGTGCTGATTGGCTGAAAACAGCCAATCACA

GCTCCTATGTTGTTATCTAGACCC;

#2 49 bp: 70_+24:
Reverse complement:
                                    (SEQ ID NO: 9)
TCTGTGGCCAGGGCACTGGCTCACCGTTCCATCTGCCCGC

AGCTTGAGG

RNA Reverse complement:
                                    (SEQ ID NO: 50)
UCUGUGGCCAGGGCACUGGCUCACCGUUCCAUCUGCCCGC

AGCUUGAGG

REVERSE COMPLEMENT U7EX5#2:
                                    (SEQ ID NO: 62)
TTTGCTAGCCACATACGCGTTTCCTAGGAAACCAGAGAAG

GATCAAAGCCCCTCTCACACACCGGGGAGCGGGGAAGAGA

ACTGTTTTGCTTTCATTGTAGACCAGTGAAATTGGGAGGG

GTTTTCCGACCGAAGTCAGAAAACCTGCTCCAAAAATTCC

TCAAGCTGCGGGCAGATGGAACGGTGAGCCAGTGCCCTGG

CCACAGATTGCGGAAGTGCGTCTGTAGCGAGCCAGGGAAG

GACATCAACTCCACTTTCGATGAGGGTGAGATCAAGGTGC

CATTTCCACACCCCTCCACTGATATGTGAATCACAAAGCA

CAGTTCCTTATTCGGTTCGATAAACAATATTCTAAAAGAC

TATTAAAACCGCTCGTTTCTTGAGTTTGTGACCGCTTGTA

AAGGCTATGCAAATGAGTCAGTGCTGATTGGCTGAAAACA

GCCAATCACAGCTCCTATGTTGTTATCTAGACCC;

#3 35 bp: 62_+2:
Reverse complement:
                                    (SEQ ID NO: 10)
acCGTTCCATCTGCCCGCAGCTTGAGGCAAGAGCC RNA Reverse complement:
                                    (SEQ ID NO: 51)
ACCGUUCCAUCUGCCCGCAGCUUGAGGCAAGAGCC REVERSE COMPLEMENT U7EX5#3:
                                    (SEQ ID NO: 63)
TTTGCTAGCCACATACGCGTTTCCTAGGAAACCAGAGAAG

GATCAAAGCCCCTCTCACACACCGGGGAGCGGGGAAGAGA

ACTGTTTTGCTTTCATTGTAGACCAGTGAAATTGGGAGGG

GTTTTCCGACCGAAGTCAGAAAACCTGCTCCAAAAATTGG

CTCTTGCCTCAAGCTGCGGGCAGATGGAACGGTTTGCGGA

AGTGCGTCTGTAGCGAGCCAGGGAAGGACATCAACTCCAC

TTTCGATGAGGGTGAGATCAAGGTGCCATTTCCACACCCC

TCCACTGATATGTGAATCACAAAGCACAGTTCCTTATTCG

GTTCGATAAACAATATTCTAAAAGACTATTAAAACCGCTC

GTTTCTTGAGTTTGTGACCGCTTGTAAAGGCTATGCAAAT

GAGTCAGTGCTGATTGGCTGAAAACAGCCAATCACAGCTC

CTATGTTGTTATCTAGACCC_;

#4 31 bp: -61_-31:
Reverse complement:
                                    (SEQ ID NO: 11)
AATGAACCTCCCTTCTGTGGTCCCACCAGGC RNA Reverse complement:
                                    (SEQ ID NO: 52)
AAUGAACCUCCCUUCUGUGGUCCCACCAGGC REVERSE COMPLEMENT U7EX5#4:
                                    (SEQ ID NO: 64)
TTTGCTAGCCACATACGCGTTTCCTAGGAAACCAGAGAAG

GATCAAAGCCCCTCTCACACACCGGGGAGCGGGGAAGAGA

ACTGTTTTGCTTTCATTGTAGACCAGTGAAATTGGGAGGG

GTTTTCCGACCGAAGTCAGAAAACCTGCTCCAAAAATTGC

CTGGTGGGACCACAGAAGGGAGGTTCATTTTGCGGAAGTG

CGTCTGTAGCGAGCCAGGGAAGGACATCAACTCCACTTTC

GATGAGGGTGAGATCAAGGTGCCATTTCCACACCCCTCCA

CTGATATGTGAATCACAAAGCACAGTTCCTTATTCGGTTC
```

-continued

GATAAACAATATTCTAAAAGACTATTAAAACCGCTCGTTT

CTTGAGTTTGTGACCGCTTGTAAAGGCTATGCAAATGAGT

CAGTGCTGATTGGCTGAAAACAGCCAATCACAGCTCCTAT

GTTGTTATCTAGACCC;

Targeting exon '8'
1 39 bp: -5_34:
Reverse complement:
(SEQ ID NO: 12)
GCGGCGCACCTTCCCGAATGTCCGACAGTGTCTCCTGCG RNA Reverse complement:
(SEQ ID NO: 53)
GCGGCGCACCUUCCCGAAUGUCCGACAGUGUCUCCUGCG REVERSE COMPLEMENT U7EX8#1:
(SEQ ID NO: 65)
TTTGCTAGCCACATACGCGTTTCCTAGGAAACCAGAGAAG

GATCAAAGCCCCTCTCACACACCGGGGAGCGGGGAAGAGA

ACTGTTTTGCTTTCATTGTAGACCAGTGAAATTGGGAGGG

GTTTTCCGACCGAAGTCAGAAAACCTGCTCCAAAAATTCG

CAGGAGACACTGTCGGACATTCGGGAAGGTGCGCCGCTTG

CGGAAGTGCGTCTGTAGCGAGCCAGGGAAGGACATCAACT

CCACTTTCGATGAGGGTGAGATCAAGGTGCCATTTCCACA

CCCCTCCACTGATATGTGAATCACAAAGCACAGTTCCTTA

TTCGGTTCGATAAACAATATTCTAAAAGACTATTAAAACC

GCTCGTTTCTTGAGTTTGTGACCGCTTGTAAAGGCTATGC

AAATGAGTCAGTGCTGATTGGCTGAAAACAGCCAATCACA

GCTCCTATGTTGTTATCTAGACCC;

2 39 bp: 27_66:
Reverse complement:
(SEQ ID NO: 13)
GGAGTAGCCCACAAAAGGCAGGTGGACCCCTAGCGGCGCA RNA Reverse complement:
(SEQ ID NO: 54)
GGAGUAGCCCACAAAAGGCAGGUGGACCCCUAGCGGCGCA REVERSE COMPLEMENT U7EX8#2:
(SEQ ID NO: 66)
TTTGCTAGCCACATACGCGTTTCCTAGGAAACCAGAGAAG

GATCAAAGCCCCTCTCACACACCGGGGAGCGGGGAAGAGA

ACTGTTTTGCTTTCATTGTAGACCAGTGAAATTGGGAGGG

GTTTTCCGACCGAAGTCAGAAAACCTGCTCCAAAAATTTG

CGCCGCTAGGGGTCCACCTGCCTTTTGTGGGCTACTCCTT

GCGGAAGTGCGTCTGTAGCGAGCCAGGGAAGGACATCAAC

TCCACTTTCGATGAGGGTGAGATCAAGGTGCCATTTCCAC

ACCCCTCCACTGATATGTGAATCACAAAGCACAGTTCCTT

ATTCGGTTCGATAAACAATATTCTAAAAGACTATTAAAAC

CGCTCGTTTCTTGAGTTTGTGACCGCTTGTAAAGGCTATG

CAAATGAGTCAGTGCTGATTGGCTGAAAACAGCCAATCAC

AGCTCCTATGTTGTTATCTAGACCC;

-continued

3 29 bp: 60_+2:
Reverse complement:
(SEQ ID NO: 14)
ACCTGAGGGCCATGCAGGAGTAGGAGTAG RNA Reverse complement:
(SEQ ID NO: 55)
ACCUGAGGGCCAUGCAGGAGUAGGAGUAG REVERSE COMPLEMENT U7EX8#3
(SEQ ID NO: 67)
TTTGCTAGCCACATACGCGTTTCCTAGGAAACCAGAGAAG

GATCAAAGCCCCTCTCACACACCGGGGAGCGGGGAAGAGA

ACTGTTTTGCTTTCATTGTAGACCAGTGAAATTGGGAGGG

GTTTTCCGACCGAAGTCAGAAAACCTGCTCCAAAAATTCT

ACTCCTACTCCTGCATGGCCCTCAGGTTTGCGGAAGTGCG

TCTGTAGCGAGCCAGGGAAGGACATCAACTCCACTTTCGA

TGAGGGTGAGATCAAGGTGCCATTTCCACACCCCTCCACT

GATATGTGAATCACAAAGCACAGTTCCTTATTCGGTTCGA

TAAACAATATTCTAAAAGACTATTAAAACCGCTCGTTTCT

TGAGTTTGTGACCGCTTGTAAAGGCTATGCAAATGAGTCA

GTGCTGATTGGCTGAAAACAGCCAATCACAGCTCCTATGT

TGTTATCTAGACCC;

4 39 bp: -35_4:
Reverse complement:
(SEQ ID NO: 15)
TCTCCTGCGCAAGACACACAGATGTGAGCAGCAGTCGTC RNA Reverse complement:
(SEQ ID NO: 56)
UCUCCUGCGCAAGACACACAGAUGUGAGCAGCAGUCGUC REVERSE COMPLEMENT U7EX8#4:
(SEQ ID NO: 68)
TTTGCTAGCCACATACGCGTTTCCTAGGAAACCAGAGAAG

GATCAAAGCCCCTCTCACACACCGGGGAGCGGGGAAGAGA

ACTGTTTTGCTTTCATTGTAGACCAGTGAAATTGGGAGGG

GTTTTCCGACCGAAGTCAGAAAACCTGCTCCAAAAATTGA

CGACTGCTGCTCACATCTGTGTGTCTTGCGCAGGAGATTG

CGGAAGTGCGTCTGTAGCGAGCCAGGGAAGGACATCAACT

CCACTTTCGATGAGGGTGAGATCAAGGTGCCATTTCCACA

CCCCTCCACTGATATGTGAATCACAAAGCACAGTTCCTTA

TTCGGTTCGATAAACAATATTCTAAAAGACTATTAAAACC

GCTCGTTTCTTGAGTTTGTGACCGCTTGTAAAGGCTATGC

AAATGAGTCAGTGCTGATTGGCTGAAAACAGCCAATCACA

GCTCCTATGTTGTTATCTAGACCC;

Targeting CTG repeats
U7-15CTG:
Reverse complement:
(SEQ ID NO: 16)
CAGCAGCAGCAGCAGCAGCAGCAGCAGCAGCAGCAGCAGC

AGCAG

RNA Reverse complement:
(SEQ ID NO: 57)
CAGCAGCAGCAGCAGCAGCAGCAGCAGCAGCAGCAGC

AGCAG

REVERSE COMPLEMENT U7-15CTG
(SEQ ID NO: 69)
TTTGCTAGCCACATACGCGTTTCCTAGGAAACCAGAGAAG

GATCAAAGCCCTCTCACACACCGGGGAGCGGGGAAGAGA

ACTGTTTTGCTTTCATTGTAGACCAGTGAAATTGGGAGGG

GTTTTCCGACCGAAGTCAGAAAACCTGCTCCAAAAATTCT

GCTGCTGCTGCTGCTGCTGCTGCTGCTGCTGCTGCTG

CTGTTGCGGAAGTGCGTCTGTAGCGAGCCAGGGAAGGACA

TCAACTCCACTTTCGATGAGGGTGAGATCAAGGTGCCATT

TCCACACCCCTCCACTGATATGTGAATCACAAAGCACAGT

TCCTTATTCGGTTCGATAAACAATATTCTAAAAGACTATT

AAAACCGCTCGTTTCTTGAGTTTGTGACCGCTTGTAAAGG

CTATGCAAATGAGTCAGTGCTGATTGGCTGAAAACAGCCA

ATCACAGCTCCTATGTTGTTATCTAGACCC;

U7-20CTG:
Reverse complement:
(SEQ ID NO: 17)
CAGCAGCAGCAGCAGCAGCAGCAGCAGCAGCAGCAGCAGC

AGCAGCAGCAGCAGCAG

RNA Reverse complement:
(SEQ ID NO: 58)
CAGCAGCAGCAGCAGCAGCAGCAGCAGCAGCAGCAGCAGC

AGCAGCAGCAGCAGCAG

REVERSE COMPLEMENT U7-20CTG:
(SEQ ID NO: 70)
TTTGCTAGCCACATACGCGTTTCCTAGGAAACCAGAGAAG

GATCAAAGCCCTCTCACACACCGGGGAGCGGGGAAGAGA

ACTGTTTTGCTTTCATTGTAGACCAGTGAAATTGGGAGGG

GTTTTCCGACCGAAGTCAGAAAACCTGCTCCAAAAATTCT

GCTGCTGCTGCTGCTGCTGCTGCTGCTGCTGCTGCTG

CTGCTGCTGCTGCTGTTGCGGAAGTGCGTCTGTAGCG

AGCCAGGGAAGGACATCAACTCCACTTTCGATGAGGGTGA

GATCAAGGTGCCATTTCCACACCCCTCCACTGATATGTGA

ATCACAAAGCACAGTTCCTTATTCGGTTCGATAAACAATA

TTCTAAAAGACTATTAAAACCGCTCGTTTCTTGAGTTTGT

GACCGCTTGTAAAGGCTATGCAAATGAGTCAGTGCTGATT

GGCTGAAAACAGCCAATCACAGCTCCTATGTTGTTATCTA

GACCC;

U7-5'CTG:
Reverse complement:
(SEQ ID NO: 18)
CAGCAGCAGCAGCAGCAGCAGCATTCCCGGCTACAAGGAC

C

RNA Reverse complement:
(SEQ ID NO: 59)
CAGCAGCAGCAGCAGCAGCAGCAUUCCCGGCUACAAGGACC REVERSE COMPLEMENT U7-5'ctg:
(SEQ ID NO: 71)
TTTGCTAGCCACATACGCGTTTCCTAGGAAACCAGAGAAG

GATCAAAGCCCTCTCACACACCGGGGAGCGGGGAAGAGA

ACTGTTTTGCTTTCATTGTAGACCAGTGAAATTGGGAGGG

GTTTTCCGACCGAAGTCAGAAAACCTGCTCCAAAAATTGG

TCCTTGTAGCCGGGAATGCTGCTGCTGCTGCTGCTGCTGT

TGCGGAAGTGCGTCTGTAGCGAGCCAGGGAAGGACATCAA

CTCCACTTTCGATGAGGGTGAGATCAAGGTGCCATTTCCA

CACCCCTCCACTGATATGTGAATCACAAAGCACAGTTCCT

TATTCGGTTCGATAAACAATATTCTAAAAGACTATTAAAA

CCGCTCGTTTCTTGAGTTTGTGACCGCTTGTAAAGGCTAT

GCAAATGAGTCAGTGCTGATTGGCTGAAAACAGCCAATCA

CAGCTCCTATGTTGTTATCTAGACCC;
and

U7-3'CTG:
Reverse complement:
(SEQ ID NO: 19)
GAAATGGTCTGTGATCCCCCCAGCAGCAGCAGCAGCAGCAG RNA Reverse complement:
(SEQ ID NO: 60)
GAAAUGGUCUGUGAUCCCCCCAGCAGCAGCAGCAGCAGCAG REVERSE COMPLEMENT U7-3'CTG:
(SEQ ID NO: 72)
TTTGCTAGCCACATACGCGTTTCCTAGGAAACCAGAGAAG

GATCAAAGCCCTCTCACACACCGGGGAGCGGGGAAGAGA

ACTGTTTTGCTTTCATTGTAGACCAGTGAAATTGGGAGGG

GTTTTCCGACCGAAGTCAGAAAACCTGCTCCAAAAATTCT

GCTGCTGCTGCTGCTGGGGGGATCACAGACCATTTCT

TGCGGAAGTGCGTCTGTAGCGAGCCAGGGAAGGACATCAA

CTCCACTTTCGATGAGGGTGAGATCAAGGTGCCATTTCCA

CACCCCTCCACTGATATGTGAATCACAAAGCACAGTTCCT

TATTCGGTTCGATAAACAATATTCTAAAAGACTATTAAAA

CCGCTCGTTTCTTGAGTTTGTGACCGCTTGTAAAGGCTAT

GCAAATGAGTCAGTGCTGATTGGCTGAAAACAGCCAATCA

CAGCTCCTATGTTGTTATCTAGACCC.

In some aspects, the disclosure includes vectors comprising one or more of the nucleotide sequences set out in any one or more SEQ ID NOs: 3-72, or variant sequences thereof comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, or 99% identity to the sequences set forth in any of SEQ ID NOs: 3-72. In some aspects, the disclosure includes vectors comprising combinations or multiple copies of one or more of the nucleotide sequences set out in any one or more of SEQ ID NOs: 3-72, or variant sequences thereof comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, or 99% identity to the sequences set forth in any of SEQ ID NOs: 3-72. In some aspects, the vectors are AAV vectors. In some aspects the AAV is recombinant AAV (rAAV). In some aspects, the rAAV lack rep and cap genes. In some embodiments, rAAV are self-complementary (sc) AAV.

Embodiments of the disclosure utilize vectors (for example, viral vectors, such as adeno-associated virus (AAV), adenovirus, retrovirus, lentivirus, equine-associated virus, alphavirus, pox virus, herpes virus, herpes simplex virus, polio virus, sindbis virus, vaccinia virus or a synthetic virus, e.g., a chimeric virus, mosaic virus, or pseudotyped virus, and/or a virus that contains a foreign protein, synthetic polymer, nanoparticle, or small molecule) to deliver the nucleic acids disclosed herein.

In some embodiments, the viral vector is an AAV, such as an AAV1 (i.e., an AAV containing AAV1 inverted terminal repeats (ITRs) and AAV1 capsid proteins), AAV2 (i.e., an AAV containing AAV2 ITRs and AAV2 capsid proteins), AAV3 (i.e., an AAV containing AAV3 ITRs and AAV3 capsid proteins), AAV4 (i.e., an AAV containing AAV4 ITRs and AAV4 capsid proteins), AAV5 (i.e., an AAV containing AAV5 ITRs and AAV5 capsid proteins), AAV6 (i.e., an AAV containing AAV6 ITRs and AAV6 capsid proteins), AAV7 (i.e., an AAV containing AAV7 ITRs and AAV7 capsid proteins), AAV8 (i.e., an AAV containing AAV8 ITRs and AAV8 capsid proteins), AAV9 (i.e., an AAV containing AAV9 ITRs and AAV9 capsid proteins), AAVrh74 (i.e., an AAV containing AAVrh74 ITRs and AAVrh74 capsid proteins), AAVrh.8 (i.e., an AAV containing AAVrh.8 ITRs and AAVrh.8 capsid proteins), AAVrh.10 (i.e., an AAV containing AAVrh.10 ITRs and AAVrh.10 capsid proteins), AAV11 (i.e., an AAV containing AAV11 ITRs and AAV11 capsid proteins), AAV12 (i.e., an AAV containing AAV12 ITRs and AAV12 capsid proteins), or AAV13 (i.e., an AAV containing AAV13 ITRs and AAV13 capsid proteins).

In some embodiments, the disclosure utilizes adeno-associated virus (AAV) to deliver inhibitory RNAs which target the DMPK mRNA or the CUG repeats to knock down DMPK and/or knock down toxic RNA that forms nuclear foci. AAV is a replication-deficient parvovirus, the single-stranded DNA genome of which is about 4.7 kb in length including 145 nucleotide inverted terminal repeat (ITRs). There are multiple serotypes of AAV. The nucleotide sequences of the genomes of the AAV serotypes are known. For example, the complete genome of AAV-1 is provided in GenBank Accession No. NC_002077; the complete genome of AAV-2 is provided in GenBank Accession No. NC_001401 and Srivastava et al., *J. Virol.*, 45: 555-564 11983); the complete genome of AAV-3 is provided in GenBank Accession No. NC_1829; the complete genome of AAV-4 is provided in GenBank Accession No. NC_001829; the AAV-5 genome is provided in GenBank Accession No. AF085716; the complete genome of AAV-6 is provided in GenBank Accession No. NC_00 1862; at least portions of AAV-7 and AAV-8 genomes are provided in GenBank Accession Nos. AX753246 and AX753249, respectively (see also U.S. Pat. Nos. 7,282,199 and 7,790,449 relating to AAV-8); the AAV-9 genome is provided in Gao et al., *J. Virol.*, 78: 6381-6388 (2004); the AAV-10 genome is provided in *Mol. Ther.*, 13(1): 67-76 (2006); and the AAV-11 genome is provided in Virology, 330(2): 375-383 (2004). Cis-acting sequences directing viral DNA replication (rep), encapsidation/packaging and host cell chromosome integration are contained within the AAV ITRs. Three AAV promoters (named p5, p19, and p40 for their relative map locations) drive the expression of the two AAV internal open reading frames encoding rep and cap genes. The two rep promoters (p5 and p19), coupled with the differential splicing of the single AAV intron (at nucleotides 2107 and 2227), result in the production of four rep proteins (rep 78, rep 68, rep 52, and rep 40) from the rep gene. Rep proteins possess multiple enzymatic properties that are ultimately responsible for replicating the viral genome. The cap gene is expressed from the p40 promoter and it encodes the three capsid proteins VP1, VP2, and VP3. Alternative splicing and non-consensus translational start sites are responsible for the production of the three related capsid proteins. A single consensus polyadenylation site is located at map position 95 of the AAV genome. The life cycle and genetics of AAV are reviewed in Muzyczka, *Current Topics in Microbiology and Immunology*, 158: 97-129 (1992).

AAV possesses unique features that make it attractive as a vector for delivering foreign DNA to cells, for example, in gene therapy. AAV infection of cells in culture is noncytopathic, and natural infection of humans and other animals is silent and asymptomatic. Moreover, AAV infects many mammalian cells allowing the possibility of targeting many different tissues in vivo. Moreover, AAV transduces slowly dividing and non-dividing cells, and can persist essentially for the lifetime of those cells as a transcriptionally active nuclear episome (extrachromosomal element). The AAV proviral genome is infectious as cloned DNA in plasmids which makes construction of recombinant genomes feasible. Furthermore, because the signals directing AAV replication, genome encapsidation and integration are contained within the ITRs of the AAV genome, some or all of the internal approximately 4.3 kb of the genome (encoding replication and structural capsid proteins, rep-cap) may be replaced with foreign DNA. The rep and cap proteins may be provided in trans. Another significant feature of AAV is that it is an extremely stable and hearty virus. It easily withstands the conditions used to inactivate adenovirus (56° to 65° C. for several hours), making cold preservation of AAV less critical. AAV may be lyophilized and AAV-infected cells are not resistant to superinfection. In some aspects, AAV is used to deliver shRNA under the control of a U6 promoter. In some aspects, AAV is used to deliver snRNA under the control of a U7 promoter. In some aspects, AAV is used to deliver both snRNA and shRNA under the control of U7 and U6 promoters. In some aspects, AAV is used to deliver both shRNA under the control of a U6 promoter and snRNA under the control of a U7 promoter.

Recombinant AAV genomes of the disclosure comprise one or more AAV ITRs flanking at least one exon 2-targeted U7 snRNA polynucleotide construct. In some embodiments, including the exemplified embodiments, the U7 snRNA polynucleotide includes its own promoter. AAV DNA in the rAAV genomes may be from any AAV serotype for which a recombinant virus can be derived including, but not limited to, AAV serotypes AAV-anc80, AAV-1, AAV-2, AAV-3, AAV-4, AAV-5, AAV-6, AAV-7, AAV-rh74, AAV-8, AAV-9, AAV-10, AAV-11, AAV-12, and AAV-13. As set out herein above, the nucleotide sequences of the genomes of various AAV serotypes are known in the art.

DNA plasmids of the disclosure comprise rAAV genomes of the disclosure. The DNA plasmids are transferred to cells permissible for infection with a helper virus of AAV (e.g., adenovirus, E1-deleted adenovirus or herpes virus) for assembly of the rAAV genome into infectious viral particles. Techniques to produce rAAV particles, in which an AAV genome to be packaged, rep and cap genes, and helper virus functions are provided to a cell are standard in the art. Production of rAAV requires that the following components are present within a single cell (denoted herein as a packaging cell): a rAAV genome, AAV rep and cap genes separate from (i.e., not in) the rAAV genome, and helper virus functions. The AAV rep genes may be from any AAV serotype for which recombinant virus can be derived and may be from a different AAV serotype than the rAAV genome ITRs, including, but not limited to, AAV serotypes AAV-1, AAV-2, AAV-3, AAV-4, AAV-5, AAV-6, AAV-7, AAV-8, AAV-9, AAV-10, AAV-11, AAV-12, AAV-13, AAV-anc80, and AAV rh.74. In some aspects, AAV DNA in the rAAV genomes is from any AAV serotype for which a recombinant virus can be derived including, but not limited to, AAV serotypes AAV-1, AAV-2, AAV-3, AAV-4, AAV-5, AAV-6, AAV-7, AAV-8, AAV-9, AAV-10, AAV-11, AAV-12, AAV-13, AAV-anc80, and AAV rh.74. Other types of rAAV variants, for example rAAV with capsid mutations, are also included in the disclosure. See, for example, Marsic et al., Molecular Therapy 22(11): 1900-1909 (2014). As noted above, the nucleotide sequences of the genomes of various AAV serotypes are known in the art. Use of cognate components is specifically contemplated. Production of pseudotyped rAAV is disclosed in, for example, WO 01/83692 which is incorporated by reference herein in its entirety.

In some embodiments, the viral vector is a pseudotyped AAV, containing ITRs from one AAV serotype and capsid proteins from a different AAV serotype. In some embodiments, the pseudotyped AAV is AAV2/9 (i.e., an AAV containing AAV2 ITRs and AAV9 capsid proteins). In some embodiments, the pseudotyped AAV is AAV2/8 (i.e., an AAV containing AAV2 ITRs and AAV8 capsid proteins). In some embodiments, the pseudotyped AAV is AAV2/1 (i.e., an AAV containing AAV2 ITRs and AAV1 capsid proteins).

In some embodiments, the AAV contains a recombinant capsid protein, such as a capsid protein containing a chimera of one or more of capsid proteins from AAV1, AAV2, AAV3, AAV4, AAV5, AAV6, AAV7, AAV8, AAV9, AAVrh74, AAVrh.8, or AAVrh.10.

In some embodiments, the AAV lacks rep and cap genes. In some embodiments, the AAV is a recombinant linear AAV (rAAV), a single-stranded AAV, or a recombinant self-complementary AAV (scAAV).

Recombinant AAV genomes of the disclosure comprise one or more AAV ITRs flanking a polynucleotide encoding, for example, one or more dystrophia myotonica protein kinase (DMPK) inhibitory RNAs. Commercial providers such as Ambion Inc. (Austin, Tex.), Darmacon Inc. (Lafayette, Colo.), InvivoGen (San Diego, Calif.), and Molecular Research Laboratories, LLC (Herndon, Va.) generate custom inhibitory RNA molecules. In addition, commercial kits are available to produce custom siRNA molecules, such as SILENCER™ siRNA Construction Kit (Ambion Inc., Austin, Tex.) or psiRNA System (InvivoGen, San Diego, Calif.). Embodiments include a rAAV genome comprising a nucleic acid comprising a nucleotide sequence set out in any of SEQ ID NOs: 25-36.

A method of generating a packaging cell is to create a cell line that stably expresses all the necessary components for AAV particle production. For example, a plasmid (or multiple plasmids) comprising a rAAV genome lacking AAV rep and cap genes, AAV rep and cap genes separate from the rAAV genome, and a selectable marker, such as a neomycin resistance gene, are integrated into the genome of a cell. AAV genomes have been introduced into bacterial plasmids by procedures such as GC tailing (Samulski et al., 1982, Proc. Natl. Acad. S6. USA, 79:2077-2081), addition of synthetic linkers containing restriction endonuclease cleavage sites (Laughlin et al., 1983, Gene, 23:65-73) or by direct, blunt-end ligation (Senapathy & Carter, 1984, J. Biol. Chem., 259:4661-4666). The packaging cell line is then infected with a helper virus such as adenovirus. The advantages of this method are that the cells are selectable and are suitable for large-scale production of rAAV. Other examples of suitable methods employ adenovirus or baculovirus rather than plasmids to introduce rAAV genomes and/or rep and cap genes into packaging cells.

General principles of rAAV production are reviewed in, for example, Carter, 1992, Current Opinions in Biotechnology, 1533-539; and Muzyczka, 1992, Curr. Topics in Microbial. and Immunol., 158:97-129). Various approaches are described in Ratschin et al., Mol. Cell. Biol. 4:2072 (1984); Hermonat et al., Proc. Natl. Acad. Sci. USA, 81:6466 (1984); Tratschin et al., Mol. Cell. Biol. 5:3251 (1985); McLaughlin et al., J. Virol., 62:1963 (1988); and Lebkowski et al., 1988 Mol. Cell. Biol., 7:349 (1988). Samulski et al. (1989, J. Virol., 63:3822-3828); U.S. Pat. No. 5,173,414; WO 95/13365 and corresponding U.S. Pat. No. 5,658,776; WO 95/13392; WO 96/17947; PCT/US98/18600; WO 97/09441 (PCT/US96/14423); WO 97/08298 (PCT/US96/13872); WO 97/21825 (PCT/US96/20777); WO 97/06243 (PCT/FR96/01064); WO 99/11764; Perrin et al. (1995) Vaccine 13:1244-1250; Paul et al. (1993) Human Gene Therapy 4:609-615; Clark et al. (1996) Gene Therapy 3:1124-1132; U.S. Pat. Nos. 5,786,211; 5,871,982; and 6,258,595. The foregoing documents are hereby incorporated by reference in their entirety herein, with particular emphasis on those sections of the documents relating to rAAV production.

The disclosure thus provides packaging cells that produce infectious rAAV. In one embodiment, packaging cells are stably transformed cancer cells, such as HeLa cells, 293 cells and PerC.6 cells (a cognate 293 line). In another embodiment, packaging cells are cells that are not transformed cancer cells, such as low passage 293 cells (human fetal kidney cells transformed with E1 of adenovirus), MRC-5 cells (human fetal fibroblasts), WI-38 cells (human fetal fibroblasts), Vero cells (monkey kidney cells) and FRhL-2 cells (rhesus fetal lung cells).

The rAAV may be purified by methods standard in the art such as by column chromatography or cesium chloride gradients. Methods for purifying rAAV vectors from helper virus are known in the art and include methods disclosed in, for example, Clark et al., Hum. Gene Ther., 10(6): 1031-1039 (1999); Schenpp and Clark, Methods Mol. Med., 69 427-443 (2002); U.S. Pat. No. 6,566,118 and WO 98/09657.

In another embodiment, the disclosure includes a composition comprising rAAV comprising any of the constructs described herein. In one aspect, the disclosure includes a composition comprising the rAAV for delivering the shRNAs and snRNAs described herein. Compositions of the disclosure comprise rAAV and a pharmaceutically acceptable carrier. The compositions may also comprise other ingredients such as diluents. Acceptable carriers and diluents are nontoxic to recipients and are preferably inert at the dosages and concentrations employed, and include buffers such as phosphate, citrate, or other organic acids; antioxidants such as ascorbic acid; low molecular weight polypeptides; proteins, such as serum albumin, gelatin, or immunoglobulins; hydrophilic polymers such as polyvinylpyrrolidone; amino acids such as glycine, glutamine, asparagine, arginine or lysine; monosaccharides, disaccharides, and other carbohydrates including glucose, mannose, or dextrins; chelating agents such as EDTA; sugar alcohols such as mannitol or sorbitol; salt-forming counterions such as sodium; and/or nonionic surfactants such as Tween, pluronics or polyethylene glycol (PEG).

Sterile injectable solutions are prepared by incorporating rAAV in the required amount in the appropriate solvent with various other ingredients enumerated above, as required, followed by filter sterilization. Generally, dispersions are prepared by incorporating the sterilized active ingredient into a sterile vehicle which contains the basic dispersion medium and the required other ingredients from those enumerated above. In the case of sterile powders for the preparation of sterile injectable solutions, the preferred methods of preparation are vacuum drying and the freeze drying technique that yield a powder of the active ingredient plus any additional desired ingredient from the previously sterile-filtered solution thereof.

Titers of rAAV to be administered in methods of the disclosure will vary depending, for example, on the particular rAAV, the mode of administration, the treatment goal, the individual, and the cell type(s) being targeted, and may be determined by methods standard in the art. Titers of rAAV may range from about $1\times10^6$, about $1\times10^7$, about $1\times10^8$, about $1\times10^9$, about $1\times10^{10}$, about $1\times10^{11}$, about $1\times10^{12}$, about $1\times10^{13}$ to about $1\times10^{14}$ or more DNase resistant particles (DRP) per ml. Dosages may also be expressed in units of viral genomes (vg) (e.g., $1\times10^7$ vg, $1\times10^8$ vg, $1\times10^9$ vg, $1\times10^{10}$ vg, $1\times10^{11}$ vg, $1\times10^{12}$ vg, $1\times10^{13}$ vg, and $1\times10^{14}$ vg, respectively).

In some aspects, the disclosure provides a method of delivering DNA encoding the DMPK inhibitor RNA set out in any of SEQ ID NO: 20-36 to a subject in need thereof, comprising administering to the subject an AAV encoding the DMPK shRNA and snRNA.

In some aspects, the disclosure provides AAV transducing cells for the delivery of the DMPK shRNAs and snRNAs.

Methods of transducing a target cell with rAAV, in vivo or in vitro, are included in the disclosure. The methods comprise the step of administering an effective dose, or effective multiple doses, of a composition comprising a rAAV of the disclosure to a subject, including an animal (such as a human being) in need thereof. If the dose is administered prior to development of DM-1, the administration is prophylactic. If the dose is administered after the development of DM-1, the administration is therapeutic. In embodiments of the disclosure, an effective dose is a dose that alleviates (eliminates or reduces) at least one symptom associated with DM-1 being treated, that slows or prevents progression to DM-1, that slows or prevents progression of a disorder/disease state, that diminishes the extent of disease, that results in remission (partial or total) of disease, and/or that prolongs survival.

Administration of an effective dose of the AAV, rAAV, or one or more compositions comprising the AAV, rAAV, or nucleic acids of the disclosure may be by routes standard in the art including, but not limited to, intramuscular, parenteral, intravascular, intravenous, oral, buccal, nasal, pulmonary, intracranial, intracerebroventricular, intrathecal, intraosseous, intraocular, rectal, or vaginal. In various aspects, an effective dose is delivered by a combination of routes. For example, in various aspects, an effective dose is delivered intravenously and intramuscularly or intravenously and intracerebroventricularly, and the like. In some aspects, an effective dose is delivered in sequence or sequentially. In some aspects, an effective dose is delivered simultaneously. Route(s) of administration and serotype(s) of AAV components of rAAV (in particular, the AAV ITRs and capsid protein) of the disclosure may be chosen and/or matched by those skilled in the art taking into account the infection and/or disease state being treated and the target cells/tissue(s), such as cells that express DMPK. In some embodiments, the route of administration is intramuscular. In some embodiments, the route of administration is intravenous.

In particular, actual administration of rAAV of the present disclosure may be accomplished by using any physical method that will transport the rAAV recombinant vector into the target tissue of an animal. Administration according to the disclosure includes, but is not limited to, injection into muscle, the bloodstream, the central nervous system, and/or directly into the brain or other organ. Simply resuspending a rAAV in phosphate buffered saline has been demonstrated to be sufficient to provide a vehicle useful for muscle tissue expression, and there are no known restrictions on the carriers or other components that can be co-administered with the rAAV (although compositions that degrade DNA should be avoided in the normal manner with rAAV). Capsid proteins of a rAAV may be modified so that the rAAV is targeted to a particular target tissue of interest such as muscle. See, for example, WO 02/053703, the disclosure of which is incorporated by reference herein. Pharmaceutical compositions can be prepared as injectable formulations or as topical formulations to be delivered to the muscles by transdermal transport. Numerous formulations for both intramuscular injection and transdermal transport have been previously developed and can be used in the practice of the disclosure. The rAAV can be used with any pharmaceutically acceptable carrier for ease of administration and handling.

For purposes of intramuscular injection, solutions in an adjuvant such as sesame or peanut oil or in aqueous propylene glycol can be employed, as well as sterile aqueous solutions. Such aqueous solutions can be buffered, if desired, and the liquid diluent first rendered isotonic with saline or glucose. Solutions of rAAV as a free acid (DNA contains acidic phosphate groups) or a pharmacologically acceptable salt can be prepared in water suitably mixed with a surfactant such as hydroxypropylcellulose. A dispersion of rAAV can also be prepared in glycerol, liquid polyethylene glycols and mixtures thereof and in oils. Under ordinary conditions of storage and use, these preparations contain a preservative to prevent the growth of microorganisms. In this connection, the sterile aqueous media employed are all readily obtainable by standard techniques well-known to those skilled in the art.

The pharmaceutical forms suitable for injectable use include sterile aqueous solutions or dispersions and sterile powders for the extemporaneous preparation of sterile injectable solutions or dispersions. In all cases the form must be sterile and must be fluid to the extent that easy syringability exists. It must be stable under the conditions of manufacture and storage and must be preserved against the contaminating actions of microorganisms such as bacteria and fungi. The carrier can be a solvent or dispersion medium containing, for example, water, ethanol, polyol (for example, glycerol, propylene glycol, liquid polyethylene glycol and the like), suitable mixtures thereof, and vegetable oils. In some aspects, proper fluidity is maintained, for example, by the use of a coating such as lecithin, by the maintenance of the required particle size in the case of a dispersion and by the use of surfactants. The prevention of the action of microorganisms can be brought about by various antibacterial and antifungal agents, for example, parabens, chlorobutanol, phenol, sorbic acid, thimerosal and the like. In many cases it will be preferable to include isotonic agents, for example, sugars or sodium chloride. Prolonged absorption of the injectable compositions can be brought about by use of agents delaying absorption, for example, aluminum monostearate and gelatin.

Sterile injectable solutions are prepared by incorporating rAAV in the required amount in the appropriate solvent with various other ingredients enumerated above, as required, followed by filter sterilization. Generally, dispersions are prepared by incorporating the sterilized active ingredient into a sterile vehicle which contains the basic dispersion medium and the required other ingredients from those enumerated above. In the case of sterile powders for the preparation of sterile injectable solutions, the preferred methods of preparation are vacuum drying and the freeze drying technique that yield a powder of the active ingredient plus any additional desired ingredient from the previously sterile-filtered solution thereof.

The term "transduction" is used to refer to the administration/delivery of DMPK inhibitory RNAs to a recipient cell either in vivo or in vitro, via a replication-deficient rAAV of the disclosure resulting in expression of DMPK inhibitory RNAs by the recipient cell.

In one aspect, transduction with rAAV is carried out in vitro. In one embodiment, desired target cells are removed from the subject, transduced with rAAV and reintroduced into the subject. Alternatively, syngeneic or xenogeneic cells can be used where those cells will not generate an inappropriate immune response in the subject.

Suitable methods for the transduction and reintroduction of transduced cells into a subject are known in the art. In one embodiment, cells are transduced in vitro by combining rAAV with cells, e.g., in appropriate media, and screening for those cells harboring the DNA of interest using conventional techniques such as Southern blots and/or PCR, or by using selectable markers. Transduced cells can then be formulated into pharmaceutical compositions, and the composition introduced into the subject by various techniques, such as by intramuscular, intravenous, subcutaneous and intraperitoneal injection, or by injection into smooth and cardiac muscle, using e.g., a catheter.

The disclosure provides methods of administering an effective dose (or doses, administered essentially simultaneously or doses given at intervals) of rAAV that encode inhibitory RNAs and rAAV that encode combinations of inhibitory RNAs, including shRNAs and/or snRNAs, that target DMPK to a subject in need thereof.

Transduction of cells with rAAV of the disclosure results in sustained expression of the inhibitory RNAs targeting DMPK expression. The present disclosure thus provides methods of administering/delivering rAAV which express inhibitory RNAs to a subject. Such subject is an animal subject, and in some aspects, the subject is human.

These methods include transducing the blood and vascular system, the central nervous system, and tissues (including, but not limited to, muscle cells and neurons, tissues, such as muscle, including skeletal muscle, organs, such as heart, brain, skin, eye, and the endocrine system, and glands, such as endocrine glands and salivary glands) with one or more rAAV of the present disclosure. In some aspects, transduction is carried out with gene cassettes comprising tissue specific control elements. For example, one embodiment of the disclosure provides methods of transducing muscle cells and muscle tissues directed by muscle specific control elements, including, but not limited to, those derived from the actin and myosin gene families, such as from the myoD gene family [See Weintraub et al., Science, 251: 761-766 (1991)], the myocyte-specific enhancer binding factor MEF-2 [Cserjesi and Olson, Mol Cell Biol 11: 4854-4862 (1991)], control elements derived from the human skeletal actin gene [Muscat et al., Mol Cell Biol, 7: 4089-4099 (1987)], the cardiac actin gene, muscle creatine kinase sequence elements [See Johnson et al., Mol Cell Biol, 9:3393-3399 (1989)] and the murine creatine kinase enhancer (mCK) element, control elements derived from the skeletal fast-twitch troponin C gene, the slow-twitch cardiac troponin C gene and the slow-twitch troponin I gene: hypozia-inducible nuclear factors [Semenza et al., Proc. Natl. Acad. Sci. USA, 88: 5680-5684 (1991)], steroid-inducible elements and promoters including the glucocorticoid response element (GRE) [See Mader and White, Proc. Natl. Acad. Sci. USA, 90: 5603-5607 (1993)], the tMCK promoter [see Wang et al., Gene Therapy, 15: 1489-1499 (2008)], the CK6 promoter [see Wang et al., supra] and other control elements.

Because AAV targets every DM1 affected organ, the disclosure includes the delivery of DNAs encoding the inhibitory RNAs to all cells, tissues, and organs of a subject. In some aspects, the blood and vascular system, the central nervous system, muscle tissue, the heart, and the brain are attractive targets for in vivo DNA delivery. The disclosure includes the sustained expression of shRNA and/or snRNA from transduced cells to affect DMPK expression (e.g., knockdown or inhibit expression) or interfere with the CUG repeat expansion in the 3' untranslated region of the DMPK gene. In some aspects, the disclosure includes sustained expression of shRNA and/or snRNA from transduced myofibers. By "muscle cell" or "muscle tissue" is meant a cell or group of cells derived from muscle of any kind (for example, skeletal muscle and smooth muscle, e.g. from the digestive tract, urinary bladder, blood vessels or cardiac tissue). Such muscle cells, in some aspects, are differentiated or undifferentiated, such as myoblasts, myocytes, myotubes, cardiomyocytes and cardiomyoblasts.

In yet another aspect, the disclosure provides a method of preventing or inhibiting expression of the DMPK gene in a cell comprising contacting the cell with a rAAV encoding a DMPK shRNA and snRNA, wherein the RNA is encoded by the DNA set out in SEQ ID NOs: 20-36. In some aspects, expression of DMPK is inhibited by at least about 5, about 10, about 15, about 20, about 25, about 30, about 35, about 40, about 45, about 50, about 55, about 60, about 65, about 70, about 75, about 80, about 85, about 90, about 95, about 96, about 97, about 98, about 99, or 100 percent. In some aspects, expression of the number of CTG repeats is inhibited by at least about 5, about 10, about 15, about 20, about 25, about 30, about 35, about 40, about 45, about 50, about 55, about 60, about 65, about 70, about 75, about 80, about 85, about 90, about 95, about 96, about 97, about 98, about 99, or 100 percent.

In yet another aspect, the disclosure provides a method of preventing or treating a myotonic dystrophy (including, but not limited to, DM1 and/or DM2) comprising administering to a subject an AAV encoding DMPK shRNA and snRNA, wherein the DMPK shRNA and snRNA are encoded by any one of the polynucleotides set out in SEQ ID NOs: 20-36. In some aspects the AAV is recombinant AAV (rAAV). In some aspects, the rAAV lack rep and cap genes. In some embodiments, rAAV are self-complementary (sc) AAV.

"Treating" includes ameliorating or inhibiting one or more symptoms of a myotonic dystrophy (including, but not limited to, muscle wasting, muscle weakness, myotonia, skeletal muscle problems, heart function abnormalities, breathing difficulties, cataracts, issues with speech and swallowing (dysarthria and dysphagia), cognitive impairment, excessive daytime sleepiness, or diabetic symptoms.

Molecular, biochemical, histological, and functional endpoints demonstrate the therapeutic efficacy of DMPK shRNAs and snRNAs. Endpoints contemplated by the disclosure include one or more of: the reduction or elimination of DMPK protein expression, the reduction or elimination of the CTG repeats, i.e., toxic repeats, which interfere with protein function in the nucleus, and/or a reduction or elimination of myotonic dystrophy symptoms including, but not limited to, restoration of normal gene splicing patterns, e.g., in genes including, but not limited to, CLCN (and CLCN1, 2, 3, 4, 5, 6, etc.), BIN1, SERCA-1, MLBN1, MLBN2, and IR; and/or a reduction of expression of CELF1 and MBLN1, and/or the reduction of the number of nuclear foci or CUG foci (including foci that sequester genes, like MBLN1) or the reduction of centronucleatoin; and the amelioration of muscle hyper-excitability, such as that measured using electromyography.

The disclosure also provides a new adeno-associated viral (AAV) inducible mouse model of DM1. An inducible and multisystemic mouse model of DM1 (iDM1) was created by delivering the toxic $CTG^{exp}$ (within the context of the human DMPK exon 15) using an AAV viral vector. The rationale was that AAV targets every DM1-affected organ and, thus, having an inducible model prevents the need for complicated and inefficient breeding of mice. Since the toxic repeat is expressed in its natural context, this model was designed to fully recapitulate the DM1 phenotype for use in the rapid evaluation of DM1 therapeutics without the difficulties encountered with transgenic breeding instability.

In making the iDM1 model, it was first confirmed in vitro that expression of the human DMPK Exon15 containing a 480 CTG repeat and a GFP tag (i.e., "GFP-CTG480") was able to accumulate in the cell nucleus, forming foci that would sequester muscleblind-like protein 1 (MBLN1), as seen in DM1 patients. A control (i.e., "GFP-CTG0") containing only human DMPK exon 15 and a GFP tag (without the CTG repeat) was used to confirm that the toxicity was not related to the backbone of the construct. Because MBLN1 is highly expressed in myoblasts, a special human fibroblast cell line (C19GSK_htMyoD) was used to perform this experiment. This cell line has the ability to transdifferentiate into myoblasts because the cells have been infected with a lentivirus encoding myogenic differentiation (MyoD) gene, a master gene for myogenesis. 96 hours post-infection, the GFP-CTG480 construct was able to alter splicing patterns of bridging integrator 1 (BIN1) and insulin receptor (INSR), two genes being mis-spliced in the absence of MBLN1.

To assess if this construct would induce a DM1 phenotype in vivo, the CMV.GFP-CTG480 construct was packaged into AAV (i.e., "AAV6.GFP-CTG480") and AAV6.GFP-CTG480 was injected intramuscularly into wild-type mice at four weeks of age. Two different doses (3e10 and 1e11 viral genomes per animal (vg)) were used. Four weeks post injection, AAV6.GFP-CTG480 was able to induce DM1 features, such as nuclear foci formation, alteration in BIN1 and Sarcoplasmic/endoplasmic reticulum calcium ATPase 1 (SERCA1) splicing, and the nuclear co-localization of MBNL-1 with toxic RNA repeats. The creation of this AAV-inducible mouse model, as described herein, provides a useful tool for a more efficient evaluation of pertinent and promising therapeutic approaches for DM1 in vivo.

EXAMPLES

Aspects and embodiments of the disclosure are illustrated by the following examples.

Example 1

Mouse Model of DM1

The objective of experiments in this Example was to create and evaluate an inducible, multisystemic mouse model of DM1 (iDM1) for research without the difficulties encountered with transgenic breeding instability. To generate this model, an AAV viral vector expressing toxic $CTG^{exp}$ within the context of the human DMPK exon 15 (5E11vg) was injected intramuscularly into both tibialis anterior (TA) muscles/group of 4-week old male and female C57BL/6 mice. Since the repeat is expressed in its natural context and because AAV targets every DM1 affected organ, this model should fully recapitulate the DM1 phenotype.

The expression of human DMPK exon15 containing a 480 CTG repeat and a green fluorescent (GFP) tag (i.e., GFP-CTG480) was confirmed in vitro to accumulate in the nucleus, forming foci that would sequester MBLN1, as seen in DM1 patients. A control, GFP-CTG0, containing only DMPK exon 15 was used to confirm that the toxicity was not related to the backbone of the construct. Because MBLN1 is greatly expressed in myoblasts, a special human fibroblast line, i.e., C19GSK_htMyoD, was used. This cell line has the ability to transdifferentiate into myoblasts after infection with a lentivirus encoding MyoD, a master gene for myogenesis. 96 hours post-infection, the GFP-CTG480 construct was able to alter splicing patterns of the bridging integrator 1 (Bin1) gene and the insulin receptor (IR) gene, two genes being mis-spliced in the absence of muscleblind-like 1 (MBNL1), confirming expected results.

Figure 5A:
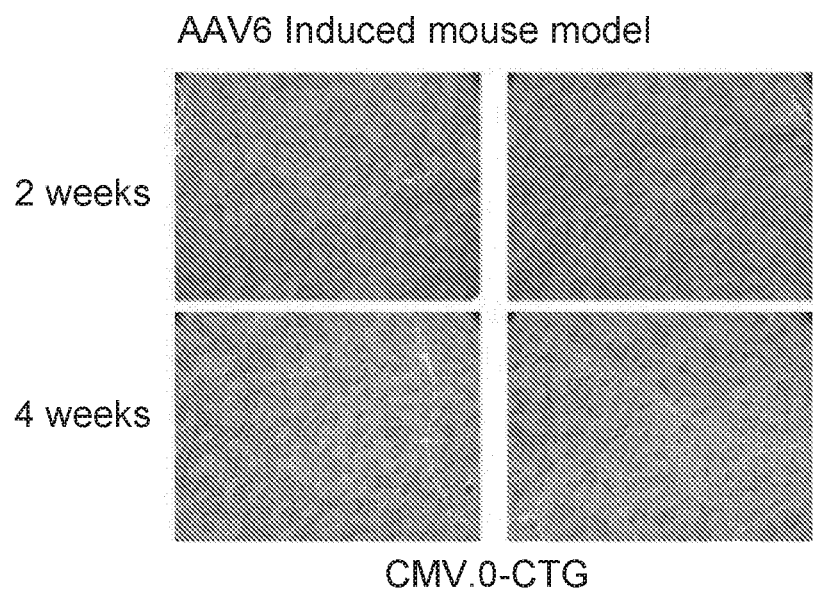
FIGS. 5A-B shows induction of DM1 pathologic features in C57BL/6J mice (The Jackson Laboratory) following injection of AAV.480CTG.
Figure 5B:
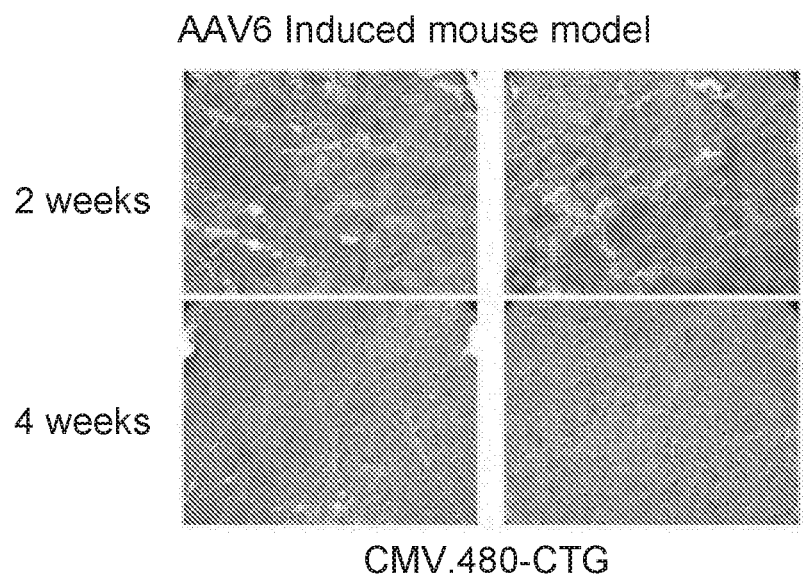

To assess if this construct would induce a DM1 phenotype in vivo in mice, the CMV.GFP-CTG480 construct was packaged into AAV (AAV6.GFP-CTG480) and male and female C57BL/6 wild-type mice were injected intramuscularly at four weeks of age into the TA muscles. Two different doses (3e10 and 1e11 viral genomes (vg) per animal) were used. As shown in FIG. 5A, four weeks post-injection, the AAV6.GFP-CTG480 vector was able to induce DM1 features in the AAV6-induced mouse model, such as centronucleation, alteration of the splicing of several genes, such as chloride channel protein, skeletal muscle (CLCN) and sarco(endo)plasmic reticulum calcium-ATPase 1 (SERCA-1), muscleblind-like 2 (MBNL2), and insulin receptor (IR). Because alteration of splicing of these genes, as described herein above, is a common feature associated with DM1 in patients, these results demonstrate the ability of the AAV.GFP-CTG480 approach to induce DM1 features in muscle in vivo. Thus, this Example provides a new inducible, multisystemic mouse model of DM1 (iDM1).

Example 2

Systemic Delivery of the Repeat Expansion in a Mouse Model of DM1

The objective of experiments in this Example is to observe the effects of systemic intravenous delivery of AAV9 constructs comprising inhibitory DMPK RNAs targeting the central nervous system (CNS) and all muscles, including the heart and diaphragm. Because DM1 is a multisystemic disorder, an approach that allows efficient expression of the CUG toxic repeat in several affected organs simultaneously is of great value. AAV9.CTG0 and AAV9.CTG480 vectors are delivered systemically by facial vein injection in both male and female neonatal animals (n=10) at postnatal days 1-2 (P1-P2) by facial vein injection using 5E11 vg/animal. 10 PBS injected mice serve as controls. Evaluation is performed in a blinded manner by an independent experimenter that is not involved in the injection procedures.

At 4 and 12 weeks post-injection with the AAV9 constructs, TA of these mice are analyzed with electromyography (EMG), force measurements, and assessed for splicing alterations in a blinded and randomized fashion. Because myotonia is one of the most prevalent symptoms of DM1 patients, myotonia is quantified electrophysiologically by testing for muscle hyper-excitability using electromyography (EMG) [Kanadia et al., Science 302(5652): 1978-80 (2003); Wheeler et al., J. Clin. Invest. 117(12): 3952-7 (2007). Statland et al., JAMA 308(13): 1357-65 (2012)]. Myotonic potentials on EMG are recorded from the TA muscle and quantified by a blinded evaluator with experience in clinical EMG assessment of myotonia in DM1 patients [Kanadia (supra); Wheeler et al. (supra); Statland et al. (supra)]. Severity of EMG myotonia is used as a simple, translational readout identifying development of a DM1 phenotype. In addition, muscle force assessment tests are carried out. Isometric force (providing assessment of strength) and eccentric contractions (evaluating sarcolemma stability) are also measured on the ex vivo TA preparations. Results of tests indicate the presence of myotonia in this animal model after viral delivery of the toxic repeat.

Additionally, splicing alterations of BIN1, SERCA1, IR, and CLCN1, genes whose splicing patterns are regulated by MBLN-1, are tested by RT-PCR. Aberrant splicing of BIN1, SERCA1, IR, and CLCN1 is present in mice transduced with the CUG toxic repeat. The number of nuclear CUG foci is counted and fluorescent in situ hybridization (FISH) tests are conducted to determine if these foci colocalize with MBNL-1. CUG foci sequester MBLN1 in DM1 and in mice transduced with the CUG toxic repeat.

Because CELF-1 is overexpressed in DM1, Western blot detection of CELF1 is performed on harvested muscle homogenates using an anti-CELF1 monoclonal antibody (Santa Cruz Biotechnologies) and anti-GAPDH antibody (Abcam) as loading control protein. CELF-1 is overexpressed in mice transduced with the CUG toxic repeat.

Tissue histology is carried out to measure fiber size and check for the presence of centronucleated fibers. In addition to the TA, other muscles, including at least gastrocnemius, triceps, heart, diaphragm and brain, are harvested for histology.

Because AAV9 transduces both skeletal and cardiac muscle, nuclear accumulation of toxic RNA in multiple skeletal muscles and heart, causing splice alterations with possible myotonia is expected. Likewise, nerve conduction defects are expected since AAV9 is capable of crossing the blood-brain barrier and targeting neurons.

Example 3

U6shRNA Constructs Specific for DMPK

This Example provides sequences of the U6shRNA constructs specific for targeting DMPK. These constructs were synthesized and clone into the pAAV.shuttle plasmid. Antisense target sequences were predicted using "design rules" [Schwartz et al., Cell 115(2):199-208 (2003); Khvorova et al., Nature 115:209-16 (2003); Reynolds et al., Nat. Biotechnol. 22:326-30 (2004); Li et al., RNA 13:1765-74 (2007)]. The underlined nucleotide sequences at the 5' end of the constructs encode the mouse U6 promoter. The bolded nucleotide sequences encode the short hairpin RNAs. The underlined nucleotide sequences at the 3'end of the constructs encode the U6 terminator.

```
>U6.sh2577
                                   (SEQ ID NO: 20)
GACGCCGCCATCTCTAGGCCCGCGCCGGCCCCCTCGCACA

GACTTGTGGGAGAAGCTCGGCTACTCCCCTGCCCCGGTTA

ATTTGCATATAATATTTCCTAGTAACTATAGAGGCTTAAT

GTGCGATAAAAGACAGATAATCTGTTCTTTTTAATACTAG

CTACATTTTACATGATAGGCTTGGATTTCTATAAGAGATA

CAAATACTAAATTATTATTTTAAAAAACAGCACAAAAGGA

AACTCACCCTAACTGTAAAGTAATTGTGTGTTTTGAGACT

ATAAATATCCCTTGGAGAAAAGCCTTGTTTGCGTTTAGTG

AACCGTCAGATGGTACCGTTTAAACTCGAGTGAGCGAGCC

TGCTTACTCGGGAAATTTCTGTAAAGCCACAGATGGGAAA

TTTCCCGAGTAAGCAGGCACGCCTACTAGAGCGGCCGCCA

CAGCGGGGAGATCCAGACATGATAAGATACATTTTTT

U6.sh2577 Antisense sequence
targeting DMPK:
                                    (SEQ ID NO: 3)
CTCGAGTGAGCGAGCCTGCTTACTCGGGAAATTTCTGTAA

AGCCACAGATGGGAAATTTCCCGAGTAAGCAGGCACGCCT

ACTAGA

>U6T6.sh4364-ex8
                                   (SEQ ID NO: 21)
GACGCCGCCATCTCTAGGCCCGCGCCGGCCCCCTCGCACA

GACTTGTGGGAGAAGCTCGGCTACTCCCCTGCCCCGGTTA

ATTTGCATATAATATTTCCTAGTAACTATAGAGGCTTAAT

GTGCGATAAAAGACAGATAATCTGTTCTTTTTAATACTAG

CTACATTTTACATGATAGGCTTGGATTTCTATAAGAGATA

CAAATACTAAATTATTATTTTAAAAAACAGCACAAAAGGA

AACTCACCCTAACTGTAAAGTAATTGTGTGTTTTGAGACT

ATAAATATCCCTTGGAGAAAAGCCTTGTTTGCGTTTAGTG

AACCGTCAGATGGTACCGTTTAAACTCGAGTGAGCGAACC

TGCCTTTTGTGGGCTACTCTGTAAAGCCACAGATGGGAGT

AGCCCACAAAAGGCAGGTGTGCCTACTAGCTAGAGCGGCC

GCCACAGCGGGGAGATCCAGACATGATAAGATACATTTTT

T

U6T6.sh4364-ex8 Antisense sequence
targeting DMPK:
                                    (SEQ ID NO: 4)
CTCGAGTGAGCGAACCTGCCTTTTGTGGGCTACTCTGTAA

AGCCACAGATGGGAGTAGCCCACAAAAGGCAGGTGTGCCT

ACTAG
```

>U6T6.sh5475-ex5
(SEQ ID NO: 22)
GACGCCGCCATCTCTAGGCCCGCGCCGGCCCCCTCGCACA

GACTTGTGGGAGAAGCTCGGCTACTCCCTGCCCCGGTTA

ATTTGCATATAATATTTCCTAGTAACTATAGAGGCTTAAT

GTGCGATAAAAGACAGATAATCTGTTCTTTTTAATACTAG

CTACATTTTACATGATAGGCTTGGATTTCTATAAGAGATA

CAAATACTAAATTATTATTTTAAAAAACAGCACAAAAGGA

AACTCACCCTAACTGTAAAGTAATTGTGTGTTTTGAGACT

ATAAATATCCCTTGGAGAAAAGCCTTGTTTGCGTTTAGTG

AACCGTCAGATGGTACCGTTTAAACTCGAGTGAGCGACGA

CTTCGGCTCTTGCCTCAACTGTAAAGCCACAGATGGGTTG

AGGCAAGAGCCGAAGTCGGTGCCTACTAGCTAGAGCGGCC

GCCACAGCGGGGAGATCCAGACATGATAAGATACATTTT

T

U6T6.sh5475-ex5 Antisense sequence
targeting DMPK:
(SEQ ID NO: 5)
CTCGAGTGAGCGACGACTTCGGCTCTTGCCTCAACTGTAA

AGCCACAGATGGGTTGAGGCAAGAGCCGAAGTCGGTGCCT

ACTAG

>U6T6.shD6
(SEQ ID NO: 23)
GACGCCGCCATCTCTAGGCCCGCGCCGGCCCCCTCGCACA

GACTTGTGGGAGAAGCTCGGCTACTCCCTGCCCCGGTTA

ATTTGCATATAATATTTCCTAGTAACTATAGAGGCTTAAT

GTGCGATAAAAGACAGATAATCTGTTCTTTTTAATACTAG

CTACATTTTACATGATAGGCTTGGATTTCTATAAGAGATA

CAAATACTAAATTATTATTTTAAAAAACAGCACAAAAGGA

AACTCACCCTAACTGTAAAGTAATTGTGTGTTTTGAGACT

ATAAATATCCCTTGGAGAAAAGCCTTGTTTGCGTTTAGTG

AACCGTCAGATGGTACCGTTTAAACTCGAGTGAGCGAAG

GGACGACTTCGAGATTCTGCTGTAAAGCCACAGATGGGCA

GAATCTCGAAGTCGTCCCTCCGCCTACTAGAGCGGCCGCC

ACAGCGGGGAGATCCAGACATGATAAGATACATTTTTT

U6T6.shD6 Antisense sequence
targeting DMPK:
(SEQ ID NO: 6)
CTCGAGTGAGCGAAGGGACGACTTCGAGATTCTGCTGTAA

AGCCACAGATGGGCAGAATCTCGAAGTCGTCCCTCCGCCT

A

>U6T6. sh2683
(SEQ ID NO: 24)
GACGCCGCCATCTCTAGGCCCGCGCCGGCCCCCTCGCACA

GACTTGTGGGAGAAGCTCGGCTACTCCCTGCCCCGGTTA

ATTTGCATATAATATTTCCTAGTAACTATAGAGGCTTAAT

GTGCGATAAAAGACAGATAATCTGTTCTTTTTAATACTAG

CTACATTTTACATGATAGGCTTGGATTTCTATAAGAGATA

CAAATACTAAATTATTATTTTAAAAAACAGCACAAAAGGA

AACTCACCCTAACTGTAAAGTAATTGTGTGTTTTGAGACT

ATAAATATCCCTTGGAGAAAAGCCTTGTTTGCGTTTAGTG

AACCGTCAGATGGTACCGTTTAAACCTCGAGTGAGCGATT

CGGCGGTTTGGATATTTATCTGTAAAGCCACAGATGGGAT

AAATATCCAAACCGCCGAAGCGCCTACTAGAGCGGCCGCC

ACAGCGGGGAGATCCAGACATGATAAGATACATTTTTT

U6T6.sh2683 Antisense sequence
targeting DMPK:
(SEQ ID NO: 7)
CTCGAGTGAGCGATTCGGCGGTTTGGATATTTATCTGTAA

AGCCACAGATGGGATAAATATCCAAACCGCCGAAGCGCCT

A

Example 4

U6shRNA to Knock Down DMPK mRNA Expression

This Example discloses experiments carried out to determine if U6shRNA could be used to interfere with the expression of toxic DMPK mRNA. AAV was used to deliver shRNA targeting DMPK mRNA or the CUG repeat itself. The sequences of the U6shRNA constructs used in these experiments are provided above in Example 3 and in FIGS. 1A-E.

AAV vectors comprising shRNA targeting the human DMPK RNA (sh2577, sh2683) under the control of the U6 promoter were constructed. These antisense RNAs target the 3' untranslated region of the DMPK RNA. As a control, an established target against the coding region of DMPK (shRNA DH6.5 or shDH6.5) [Sobczak et al., Mol. Ther. 21(2):380-7 (2013)] was used. A human DM1 primary fibroblast cell line (GM03132, Coriell) was used to evaluate the ability of these shRNAs to knockdown DMPK.

Because MBLN1 is more abundantly expressed in myoblasts, fibroblasts were converted into myoblasts using a lentivirus expressing MyoD. Cells were seeded at 30% confluency in a 12-well plate in order to have about 50% confluency the next day. For lentiviral transduction, 2 to 5e9 vg/ml of each lentivirus (htert-puromycin and doxycycline inducible Myo-D-hygromycin) were added in 400 μL of the growth medium. 1 ml of media was added the following day. One or two days later, cells were seeded in a 6-well plate and allowed to grow until reaching 70% confluency. At this point, growth medium was supplemented with 400 μg/ml of hygromycin and 1 μg/ml of puromycin. The cells were kept under selection pressure for at least 12 days. Media was changed every 2-3 days. 10 cm dishes were coated with laminin (stock solution 0.5 mg/ml in TBS, pH 7.4, working solution 100 μg/ml in HBSS). After adding an adequate volume of laminin, dishes were incubated at 37° C. for 2 hours. Dishes were next rinsed 3 times with PBS. Fibroblasts were seeded in a 10 cm laminin-coated dish at 50% confluency maximum. For myoblast induction, when the fibroblasts reached 70% confluency, media was replaced by the myoblast media (supplemented with 4 µg/ml of freshly made doxycycline). Two to three days later, cells were 90-95% confluent and their morphology changed. Media was replaced by the differentiation media (supplemented with 4 µg/ml of freshly made doxycycline).

Figure 3B:
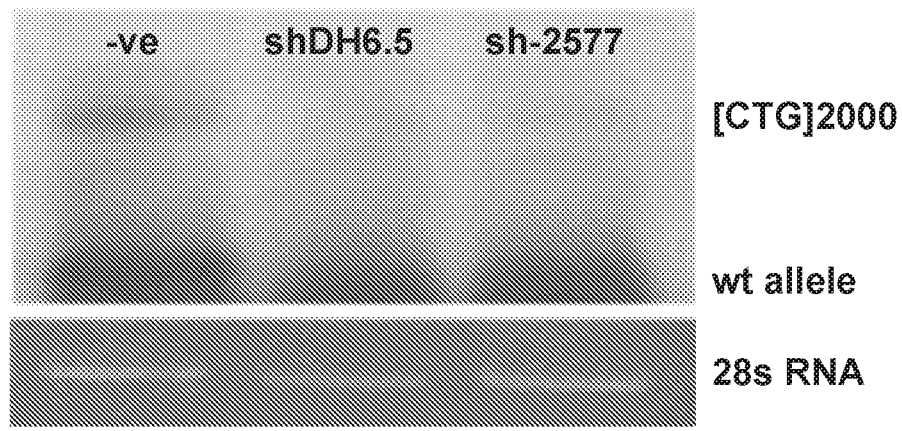
Figure 4A:
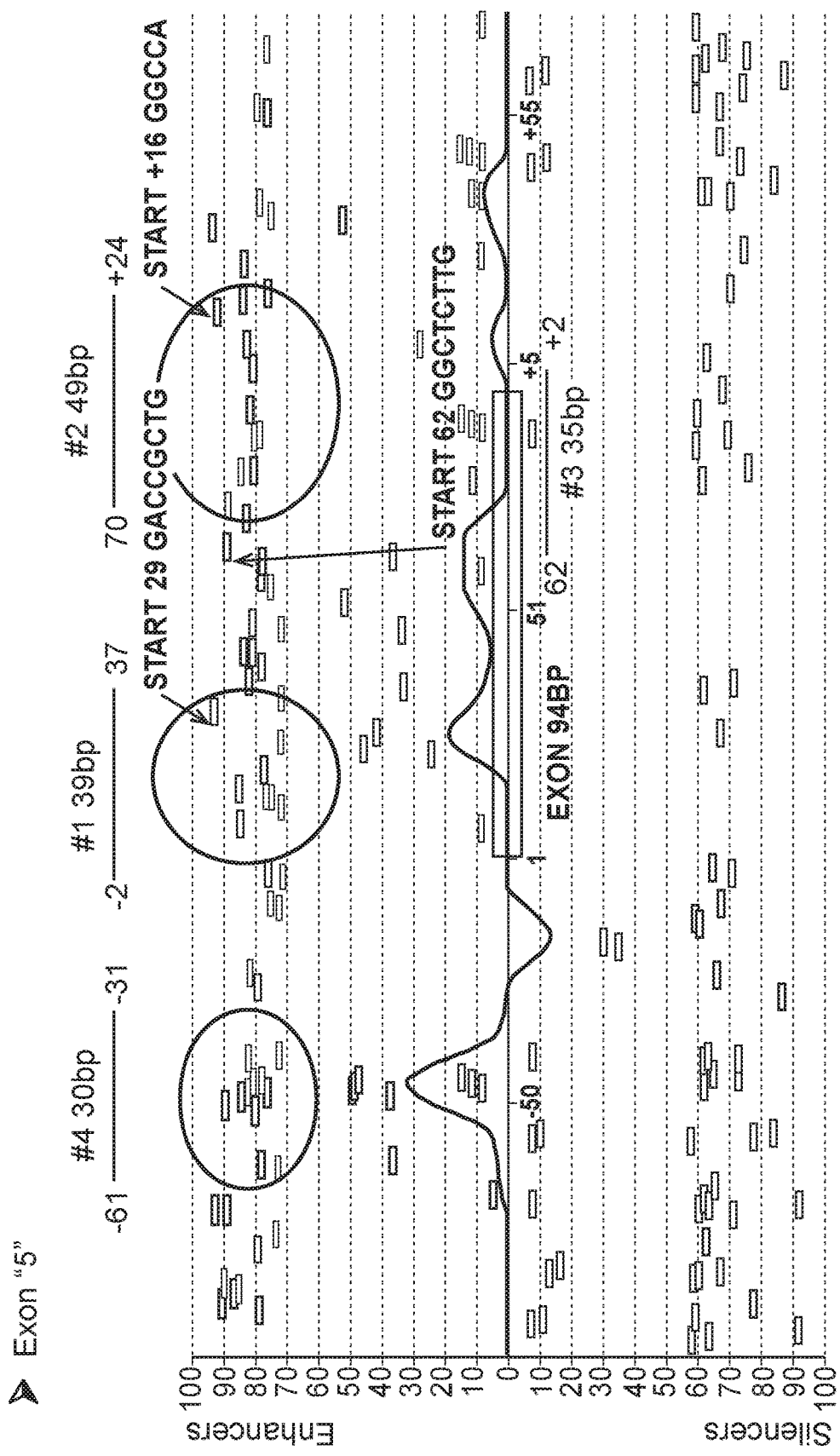
FIGS. 4A-C shows the design of various sequences.
Figure 4B:
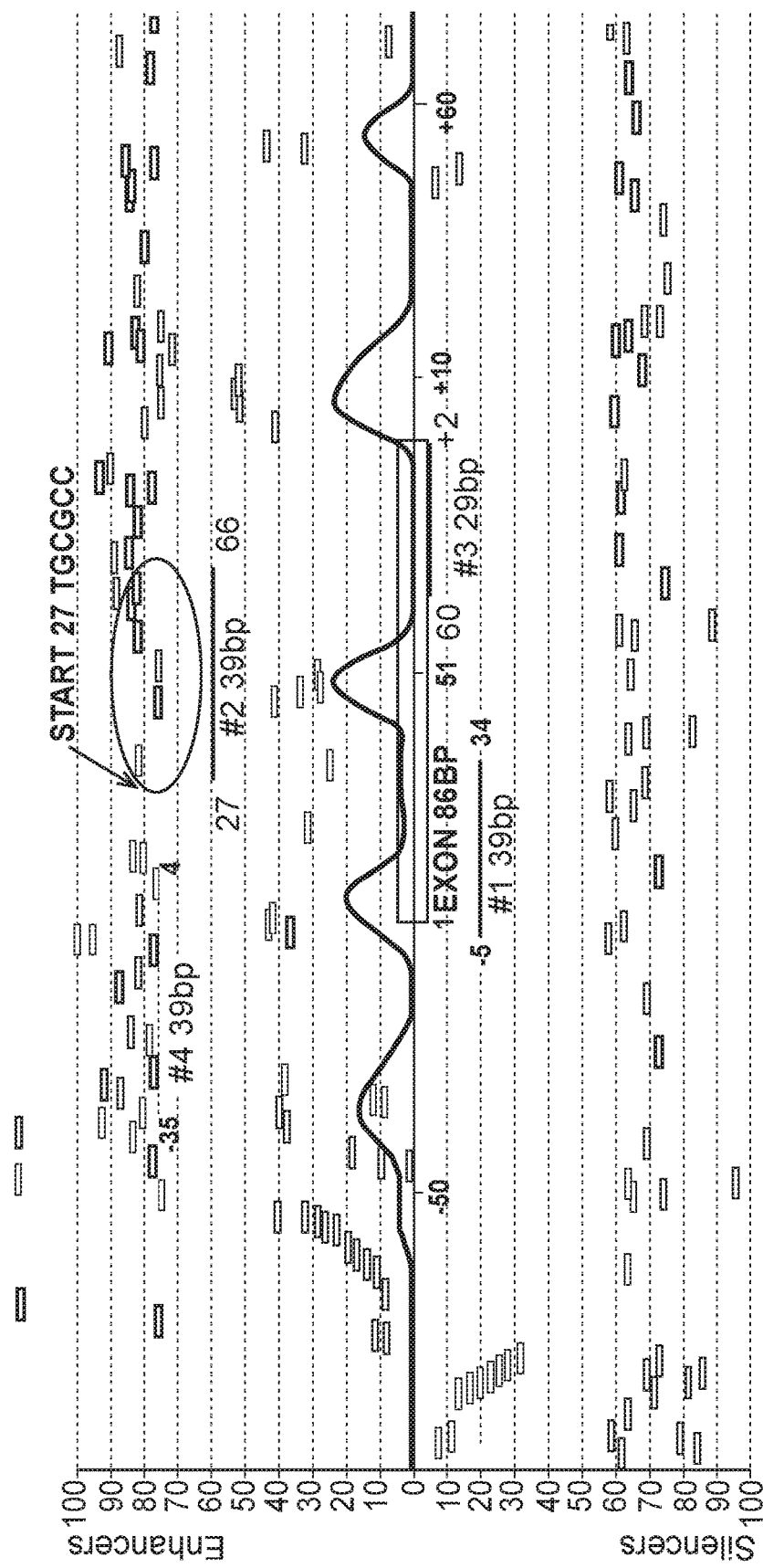
Figure 4C:
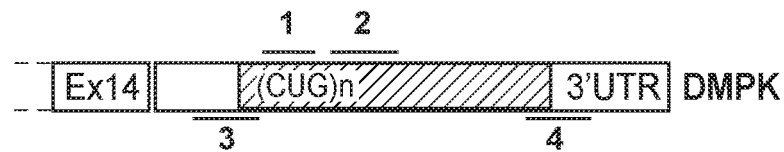

Induced DM1 myoblasts were then transduced with AAV.U6.shRNA (sh2577, sh2683, or shDH6.5) vectors. shRNA 2577 and 2683 target the 3' untranslated region of the DMPK gene and shRNA DH6.5 targets the DMPK coding region. Two days post infection, RT-qPCR and Northern blot assays were carried out on the cells. Both assays demonstrated a reduced RNA expression of the toxic DMPK transcript. RT-qPCR of DMPK expression in total mRNA isolated from DM1 myoblasts treated with rAAV.shRNAs showed that the shRNAs (2683, 2577, and DH6.5) were able to reduce DMPK expression (FIG. 3A). Northern blot analysis of total RNA following infection with indicated AAV.shRNAs demonstrated a reduction in expanded DMPK transcript "[CTG]2000" (FIG. 3B). These experiments show that both sh2577 and sh2683 U6shRNA constructs were able to efficiently knock down the DMPK transcript in myoblasts.

Example 5

U7snRNA Constructs Specific for DMPK

This Example provides the sequences of the U7snNA constructs specifically designed to break the reading frame of DMPK, including identification of the targeted sequence, and the reverse complement. Four sequences were designed to target exon 5 (FIGS. 2A-D); four sequences were designed to target exon 8 (FIGS. 2E-H), and four sequences were designed to target CTG repeats in the untranslated exon 15 (FIGS. 2I-L), all of the DMPK gene. These constructs were synthesized and clone into the pAAV.shuttle plasmid. Antisense target sequences were predicted using the human splicing finder website site (www.umd.be/HSF3/) [Desmet et al., Nucleic Acids Res. 37(9): E67 (2009)].

```
Targeting exon '5'
#1 39 bp: -2_37
Sequence to target:
                                (SEQ ID NO: 37)
AGGGACATCAAACCCGACAACATCCTGCTGGACCGCTGT Reverse complement:
                                (SEQ ID NO: 8)
ACAGCGGTCCAGCAGGATGTTGTCGGGTTTGATGTCCCT (SEQ ID NO: 25)
GGGTCTAGAtaacaacataggagctgtgattggctgtttt cagccaatcagcactgActcatttgcatagcctttacaag cggtcacaaactcaagaaacgagcggttttaatagtctt ttagaatattgtttatcgaaccgaataaggaactgtgctt tgtgattcacatatcagtggaggggtgtggaaatggcac cttgatctcaccctcatcgaaagtggagttgatgtcctTc cctggctcgctacagacgcacttccgcaaACAGCGGTCC AGCAGGATGTTGTCGGGTTTGATGTCCctAATTTTTGGAG caggttttctgacttcggtcggaaaacccctcccaattt cactggtctacaatgaaagcaaaacagttctcttccccgc tccccggtgtgtgagaggggctttgatccttctctggtt tcctaggaaacgcgtatgtggctagcaaa

1 39 bp: -2_37 Antisense sequence
targeting DMPK:
                                (SEQ ID NO: 8)
ACAGCGGTCCAGCAGGATGTTGTCGGGTTTGATGTCCCT

#2 49 bp: 70_+24
Sequence to target:
                                (SEQ ID NO: 38)
CCTCAAGCTGCGGGCAGATGGAACGGTGAGCCAGTGCCCT

GGCCACAGA

Reverse complement:
                                (SEQ ID NO: 9)
TCTGTGGCCAGGGCACTGGCTCACCGTTCCATCTGCCCGC

AGCTTGAGG (SEQ ID NO: 26)
GGGTCTAGAtaacaacataggagctgtgattggctgtttt cagccaatcagcactgActcatttgcatagcctttacaag cggtcacaaactcaagaaacgagcggttttaatagtctt ttagaatattgtttatcgaaccgaataaggaactgtgctt tgtgattcacatatcagtggaggggtgtggaaatggcac cttgatctcaccctcatcgaaagtggagttgatgtcctTc cctggctcgctacagacgcacttccgcaatctgtggcca gggcactggctcacCGTTCCATCTGCCCGCAGCTTGAGGA ATTTTTGGAGcaggttttctgacttcggtcggaaaaccc ctcccaatttcactggtctacaatgaaagcaaaacagttc tcttccccgctccccggtgtgtgagaggggctttgatcc ttctctggtttcctaggaaacgcgtatgtggctagcaaa

2 49 bp: 70_+24 Antisense sequence
targeting DMPK:
                                (SEQ ID NO: 9)
TCTGTGGCCAGGGCACTGGCTCACCGTTCCATCTGCCCGC

AGCTTGAGG

#3 35 bp: 62_+2
Sequence to target:
                                (SEQ ID NO: 39)
GGCTCTTGCCTCAAGCTGCGGGCAGATGGAACGgt Reverse complement:
                                (SEQ ID NO: 10)
acCGTTCCATCTGCCCGCAGCTTGAGGCAAGAGCC (SEQ ID NO: 27)
GGGTCTAGAtaacaacataggagctgtgattggctgtttt cagccaatcagcactgActcatttgcatagcctttacaag cggtcacaaactcaagaaacgagcggttttaatagtctt ttagaatattgtttatcgaaccgaataaggaactgtgctt tgtgattcacatatcagtggaggggtgtggaaatggcac cttgatctcaccctcatcgaaagtggagttgatgtcctTc cctggctcgctacagacgcacttccgcaaacCGTTCCATC
```

-continued
```
TGCCCGCAGCTTGAGGCAAGAGCCAATTTTTGGAGcaggt tttctgacttcggtcggaaaaccccctcccaatttcactgg tctacaatgaaagcaaaacagttctcttccccgctccccg gtgtgtgagaggggctttgatccttctctggtttcctagg aaacgcgtatgtggctagcaaa
```

3 35 bp: 62_+2 Antisense sequence
targeting DMPK:
  (SEQ ID NO: 10)
ACCGTTCCATCTGCCCGCAGCTTGAGGCAAGAGCC

4 31 bp: -61_-31
Sequence to target:
  (SEQ ID NO: 40)
gcctggtgggaccacagaagggaggttcatt Reverse complement:
  (SEQ ID NO: 11)
aatgaacctcccttctgtggtcccaccaggc (SEQ ID NO: 28)
```
GGGTCTAGAtaacaacataggagctgtgattggctgtttt cagccaatcagcactgActcatttgcatagcctttacaag cggtcacaaactcaagaaacgagcggattaatagtattt agaatattgtttatcgaaccgaataaggaactgtgctttg tgattcacatatcagtggaggggtgtggaaatggcacct tgatctcaccctcatcgaaagtggagttgatgtcctTccc tggctcgctacagacgcacttccgcaaaatgaacctccc ttctgtggtcccaccaggcAATTTTTGGAGcaggttttct gacttcggtcggaaaaccccctcccaatttcactggtcta caatgaaagcaaaacagttctcttccccgctccccggtgt gtgagaggggctttgatccttctctggtttcctaggaaac gcgtatgtggctagcaaa
```

4 31 bp: -61_-31 Antisense sequence
targeting DMPK:
  (SEQ ID NO: 11)
AATGAACCTCCCTTCTGTGGTCCCACCAGGC Targeting exon '8'
1 39 bp: -5_34
Sequence to target:
  (SEQ ID NO: 41)
CGCAGGAGACACTGTCGGACATTCGGGAAGGTGCGCCGC Reverse complement:
  (SEQ ID NO: 12)
GCGGCGCACCTTCCCGAATGTCCGACAGTGTCTCCTGCG (SEQ ID NO: 29)
```
GGGTCTAGAtaacaacataggagctgtgattggctgtttt cagccaatcagcactgActcatttgcatagcctttacaag cggtcacaaactcaagaaacgagcggttttaatagtcttt tagaatattgtttatcgaaccgaataaggaactgtgcttt gtgattcacatatcagtggaggggtgtggaaatggcacct tgatctcaccctcatcgaaagtggagttgatgtcctTccc tggctcgctacagacgcacttccgcaaGCGGCGCACCTTC
```

-continued
```
CCGAATGTCCGACAGTGTCTCCtgcgAATTTTTGGAGcag gttttctgacttcggtcggaaaaccccctcccaatttcact ggtctacaatgaaagcaaaacagttctcttccccgctccc cggtgtgtgagaggggctttgatccttctctggtttccta ggaaacgcgtatgtggctagcaaa
```

1 39 bp: -5_34 Antisense sequence
targeting DMPK:
  (SEQ ID NO: 12)
GCGGCGCACCTTCCCGAATGTCCGACAGTGTCTCCTGCG

2 39 bp: 27_66
Sequence to target:
  (SEQ ID NO: 42)
TGCGCCGCTAGGGGTCCACCTGCCTTTTGTGGGCTACTCC Reverse complement:
  (SEQ ID NO: 13)
GGAGTAGCCCACAAAAGGCAGGTGGACCCCTAGCGGCGCA (SEQ ID NO: 30)
```
GGGTCTAGAtaacaacataggagctgtgattggctgtttt cagccaatcagcactgActcatttgcatagcctttacaag cggtcacaaactcaagaaacgagcggttttaatagtcttt tagaatattgtttatcgaaccgaataaggaactgtgcttt gtgattcacatatcagtggaggggtgtggaaatggcacct tgatctcaccctcatcgaaagtggagttgatgtcctTccc tggctcgctacagacgcacttccgcaaGGAGTAGCCCACA AAAGGCAGGTGGACCCCTAGCGGCGCAAATTTTTGGAGca ggttttctgacttcggtcggaaaaccccctcccaatttcac tggtctacaatgaaagcaaaacagttctcttccccgctcc ccggtgtgtgagaggggctttgatccttctctggtttcct aggaaacgcgtatgtggctagcaaa
```

2 39 bp: 27_66 Antisense sequence
targeting DMPK:
  (SEQ ID NO: 13)
GGAGTAGCCCACAAAAGGCAGGTGGACCCCTAGCGGCGCA

3 29 bp: 60 +2 :
Sequence to target:
  (SEQ ID NO: 43)
CTACTCCTACTCCTGCATGGCCCTCAGgt Reverse complement:
  (SEQ ID NO: 14)
acCTGAGGGCCATGCAGGAGTAGGAGTAG (SEQ ID NO: 31)
```
GGGTCTAGAtaacaacataggagctgtgattggctgtttt cagccaatcagcactgActcatttgcatagcctttacaag cggtcacaaactcaagaaacgagcggttttaatagtcttt tagaatattgtttatcgaaccgaataaggaactgtgcttt gtgattcacatatcagtggaggggtgtggaaatggcacct tgatctcaccctcatcgaaagtggagttgatgtcctTccc tggctcgctacagacgcacttccgcaaacCTGAGGGCCAT GCAGGAGTAGGAGTAGAATTTTTGGAGcaggttttctgac ttcggtcggaaaaccccctcccaatttcactggtctacaat
``` gaaagcaaaacagttctcttccccgctccccggtgtgtga gagggctttgatccttctctggttt<u>tcctaggaaacgcgt</u>

<u>atgtggctagcaaa</u>

3 29 bp: 60_+2 Antisense sequence
targeting DMPK:
(SEQ ID NO: 14)
ACCTGAGGGCCATGCAGGAGTAGGAGTAG

4 39 bp: -35_4
Sequence to target:
(SEQ ID NO: 44)
gacgactgctgctcacatctgtgtgtcttgcgcagGAGA Reverse complement:
(SEQ ID NO: 15)
TCTCctgcgcaagacacacagatgtgagcagcagtcgtc (SEQ ID NO: 32)
<u>GGGTCTAGA</u>taacaacataggagctgtgattggctgtttt cagccaatcagcactgActcatttgcatagcctttacaag cggtcacaaactcaagaaacgagcggttttaatagtcttt tagaatattgtttatcgaaccgaataaggaactgtgcttt gtgattcacatatcagtggaggggtgtggaaatggcacct tgatctcaccctcatcgaaagtggagttgatgtcctTccc tggctcgctacagacgcacttccgcaaTCTCctgcgcaag acacacagatgtgagcagcagtcgtcAATTTTTGGAGcag gttttctga*cttc*ggtcggaaaacccctcccaatttcact ggtctacaatgaaagcaaaacagttctcttccccgctccc cggtgtgtgagagggctttgatccttctctggttt<u>tccta</u>

<u>ggaaacgcgtatgtggctagcaaa</u>

4 39 bp: -35_4 Antisense sequence
targeting DMPK:
(SEQ ID NO: 15)
TCTCCTGCGCAAGACACACAGATGTGAGCAGCAGTCGTC Targeting CTG repeats
>U7-15CTG
Sequence to target:
(SEQ ID NO: 45)
CTGCTGCTGCTGCTGCTGCTGCTGCTGCTGCTGCTGCTG

CTGCTG

Reverse complement:
(SEQ ID NO: 16)
CAGCAGCAGCAGCAGCAGCAGCAGCAGCAGCAGCAGCAG

CAGCAG (SEQ ID NO: 33)
<u>GGGTCTAGA</u>taacaacataggagctgtgattggctgtttt cagccaatcagcactgActcatttgcatagcctttacaag cggtcacaaactcaagaaacgagcggttttaatagtcttt tagaatattgtttatcgaaccgaataaggaactgtgcttt gtgattcacatatcagtggaggggtgtggaaatggcacct tgatctcaccctcatcgaaagtggagttgatgtcctTccc tggctcgctacagacgcacttccgcaaCAGCAGCAGCAGC

AGCAGCAGCAGCAGCAGCAGCAGCAGCAGCAGAATTTTTG

GAGcaggttttctga*cttc*ggtcggaaaacccctcccaat ttcactggtctacaatgaaagcaaaacagttctcttcccc gctccccggtgtgtgagagggctttgatccttctctggtt t<u>tcctaggaaacgcgtatgtggctagcaaa</u>

U7-15CTG Antisense sequence targeting
DMPK:
(SEQ ID NO: 16)
CAGCAGCAGCAGCAGCAGCAGCAGCAGCAGCAGCAGCAGC

AGCAG

>U7-20CTG
Sequence to target:
(SEQ ID NO: 46)
CTGCTGCTGCTGCTGCTGCTGCTGCTGCTGCTGCTGCTGC

TGCTGCTGCTGCTGCTGCTG

Reversecomplement:
(SEQ ID NO: 17)
CAGCAGCAGCAGCAGCAGCAGCAGCAGCAGCAGCAGCAGC

AGCAGCAGCAGCAGCAGCAG (SEQ ID NO: 34)
<u>GGGTCTAGA</u>taacaacataggagctgtgattggctgtttt cagccaatcagcactgActcatttgcatagcctttacaag cggtcacaaactcaagaaacgagcggttttaatagtcttt tagaatattgtttatcgaaccgaataaggaactgtgcttt gtgattcacatatcagtggaggggtgtggaaatggcacct tgatctcaccctcatcgaaagtggagttgatgtcctTccc tggctcgctacagacgcacttccgcaaCAGCAGCAGCAGC

AGCAGCAGCAGCAGCAGCAGCAGCAGCAGCAGCAGCAGCA

GCAGCAGAATTTTTGGAGcaggttttctga*cttc*ggtcgg aaaacccctcccaatttcactggtctacaatgaaagcaaa acagttctcttccccgctccccggtgtgtgagaggggctt tgatccttctctggttt<u>tcctaggaaacgcgtatgtggcta</u>

<u>gcaaa</u>

U7-20CTG Antisense sequence targeting
DMPK:
(SEQ ID NO: 17)
CAGCAGCAGCAGCAGCAGCAGCAGCAGCAGCAGCAGCAGC

AGCAGCAGCAGCA

GCAGCAG

>U7-5' CTG
Sequence to target:
(SEQ ID NO: 47)
GGTCCTTGTAGCCGGGAATGCTGCTGCTGCTGCTGCTG

CTG

Reverse complement:
(SEQ ID NO: 18)
CAGCAGCAGCAGCAGCAGCAGCATTCCCGGCTACAAGG

ACC

-continued (SEQ ID NO: 35)
GGGTCTAGAtaacaacataggagctgtgattggctgtttt cagccaatcagcactgActcatttgcatagcctttacaag cggtcacaaactcaagaaacgagcggttttaatagtcttt tagaatattgtttatcgaaccgaataaggaactgtgcttt gtgattcacatatcagtggaggggtgtggaaatggcacct tgatctcaccctcatcgaaagtggagttgatgtcctTccc tggctcgctacagacgcacttccgcaaCAGCAGCAGCAGC AGCAGCAGCATTCCCGGCTACAAGGACCAATTTTTGGAGc aggttttctgacttcggtcggaaaaccccctcccaatttca ctggtctacaatgaaagcaaaacagttctcttccccgctc cccggtgtgtgagaggggctttgatccttctctggtttcc taggaaacgcgtatgtggctagcaaa U7-5'CTG Antisense sequence targeting
DMPK:

(SEQ ID NO: 18)
CAGCAGCAGCAGCAGCAGCAGCATTCCCGGCTACAAGGAC

C

>U7-3'CTG
Sequence to target:

(SEQ ID NO: 48)
CTGCTGCTGCTGCTGCTGGGGGGATCACAGACCATT

TC

Reverse complement:

(SEQ ID NO: 19)
GAAATGGTCTGTGATCCCCCCAGCAGCAGCAGCAGCAGC

AG (SEQ ID NO: 36)
GGGTCTAGAtaacaacataggagctgtgattggctgtttt cagccaatcagcactgActcatttgcatagcctttacaag cggtcacaaactcaagaaacgagcggttttaatagtcttt tagaatattgtttatcgaaccgaataaggaactgtgcttt gtgattcacatatcagtggaggggtgtggaaatggcacct tgatctcaccctcatcgaaagtggagttgatgtcctTccc tggctcgctacagacgcacttccgcaaGAAATGGTCTGTG ATCCCCCCAGCAGCAGCAGCAGCAGAATTTTTGGAGc aggttttctgacttcggtcggaaaaccccctcccaatttca ctggtctacaatgaaagcaaaacagttctcttccccgctc cccggtgtgtgagaggggctttgatccttctctggtttcc taggaaacgcgtatgtggctagcaaa U7-3'CTG Antisense sequence targeting
DMPK:

(SEQ ID NO: 19)
GAAATGGTCTGTGATCCCCCCAGCAGCAGCAGCAGCAGCAG

Example 6

The Use of U7snRNA to Knock Down DMPK mRNA Expression

This Example discloses the use of AAV to deliver U7snRNA constructs targeting the DMPK mRNA or the CUG repeat itself to knock down or interfere with the DMPK transcript, including the toxic RNA that forms nuclear foci. When embedded into a gene therapy vector, these snRNAs can be permanently expressed in the target cell.

In order to knock down or interfere with the DMPK transcript, 12 constructs were designed and ordered through GenScript®. Eight constructs were designed using Human Splicing Finder [Desmet et al., Nucleic Acids Res. 37(9): e67, 2009); (www.umd.be/HSF3/)] an online bioinformatics tool to predict splicing signals. Eight constructs were designed to skip either exon 5 (n=4; 5#1, 5#2, 5#3, 5#4) or exon 8 (n=4; 8#1, 8#2, 8#3, 8#4) of the DMPK transcript. Four additional constructs (15CAG, 20CAG, 5'CAG, 3'CAG) were designed to target the DMPK repeat expansion. The sequences of these constructs are set out in Example 5 and in FIGS. 2A-L.

Constructs were cloned in a pAAV.Shuttle plasmid (He et al., Proc. Nat. Acad. Sci. U.S.A 95(5):2509-14, 1998) that contains a qPCR probe to quantify the virus, a 5' and 3'Inverted Terminal Repeat and a kanamycin resistance gene. The constructs and a GFP control were transfected in 293 cells. Cells were stopped 36 hours post-transfection. RNA extraction and RT-PCR were performed. RNA extraction from the cells was carried out using 3250 of TRIzol™. Cell lysate was added to the column using R1054 Quick-RNA (Zymo Research, Irvine, Calif.). RNA extraction was carried out according to the manufacturer's protocol. Reverse transcription was then performed using 500 ng of RNA using RevertAid RT Reverse Transcription Kit (Thermo Scientific™). 150 ng of reverse transcriptase was used for each PCR. PCR, using primers either in exons 3 and 6 (to look for exon 5 skipping) or in exons 7 and 10 (to look for exon 8 skipping), was carried out.

RT-PCR results to date showed that constructs 8#2 and 8#3 can induce skipping of exon 8.

Example 7

AAV.480CTG Causes Splicing Alterations in DM1-Associated Genes in Mice

The example provides experimental results from experiments carried out to determine if AAV.480CTG causes splicing alterations in DM1-associated genes in mice. Mice were injected with the AAV.480CTG construct as described herein above in Example 2. Two weeks post-injection with the viral construct, RNA extraction was performed using 500 μl of TRIzol™ on 15×30 μm sections from muscle injected with either AAV.480CTG or AAV.00TG. Lysate was then treated with TRIzol™ according to the manufacturer's protocol (Thermo Scientific™). Reverse transcription was then performed using 500 ng of RNA using the RevertAid First Strand cDNA Synthesis Kit (Thermo Scientific™). PCR, using various sets of primers to amplify CLCN, SERCA1, MBLN2, and INSR genes, was carried out. PCR of the 18s gene was carried out to normalize relative expression. 150 ng of RT was used for each PCR.

RT-PCR results showed that 2 weeks post-injection with the viral construct, construct 480CTG altered splicing of CLCN1, SERCA1, MBLN2, and IR genes. In DM1 patients, CLCN1, SERCA1, MBLN2, and IR are mis-spliced, as observed in the injected mice, indicating that this construct induced a DM1 phenotype in vivo in the mouse.

Example 8

Quantification of Nuclear CUG Foci and Colocalization with MBNL by FISH

Detection of CUG foci was accomplished using a Cy3-(CAG)10 probe either on fixed frozen cells or on fresh frozen tissue sections (10 μm) using standard procedures. Cells were fixed with 4% PFA (or 10% NBF) in 1×PBS for 10 minutes at room temperature (RT) and then washed 3 times with 1×PBS (3 minutes each). Cells were then permeabilized with 1 mL 0.1% Triton X in PBS at RT for 5 minutes and washed twice with 1×TBS at RT. Cells were blocked in 10% normal goat serum with 1% BSA in TBS for 2 hours at RT and drained with a vacuum trap. Cells were incubated with primary antibody (Mouse anti-MBNL, 1:500 dilution) in TBS with 1% BSA overnight at 4° C. The following day, cells were rinsed 2 times for 3 minutes in TBS with 0.025% Triton. Cells were then washed once with 1×TBS. Cells were incubated with secondary antibody (goat-anti-mouse A488, 1:500 dilution) for 1 hour at RT and then washed once with 1×TBS, and twice with PBS at RT (3 min each) and with 1 mL 30% formamide, 2×SSC for 10 minutes at RT.

FISH probe was then added with 2 ug/mL BSA, 66 ug/mL yeast tRNA, 1 ng/uL Cy3-(CAG)10 in 30% formamide, 2×SSC at 37° C. for 2 hours. Cells were then washed with 30% formamide, 2×SSC for 30 mins, at 37° C. Cells were washed with 1×SSC for 30 mins, at RT and stained with NucBlue probe in 1×PBS for 25-30 min at RT (2 drops per mL of PBS were added). Cells were washed once with 1×PBS and then mounted with CC/Mount and coverslipped. Quantitation of CUG foci was accomplished by selecting five random, non-overlapping 20× areas under the microscope and the number of nuclear foci quantified using ImageJ software. Cy3-(CTG)10 sense probe served as a negative control. Following treatment with DMPK inhibitory RNAs, a reduction of number of CUG foci with a reduction of the colocalization of the foci and MBLN1 was observed. Because the number of CUG foci is increased in patients with DM1, a reduction of CUG foci indicates treatment with DMPK inhibitory RNA sequences as described herein was effective. Because MBLN1 is elevated in patients with DM1, downregulation of MBLN1 indicates that treatment with DMPK inhibitory RNA sequences as described herein was effective.

Example 9

Western Blot Analysis of CELF1

A key feature of DM1 pathogenesis is nuclear accumulation of RNA, which causes aberrant alternative splicing of specific pre-mRNAs by altering the functions of CUG-binding proteins (CUGBPs). CUGBP Elav-like family member 1 (CELF1) is a member of a protein family that regulates pre-mRNA alternative splicing and may also be involved in mRNA editing, and translation. Elevated CELF1 protein levels are found in nuclei containing foci of CUG repeat RNA. To determine if DMPK inhibitory RNAs as described herein knock down or interfere with DMPK translation and accumulation of CUG toxic repeats, Western blot detection of CELF1 was performed on harvested muscle homogenates using an anti-CELF1 monoclonal antibody (Santa Cruz Biotechnologies) and anti-GAPDH antibody (Abcam) as loading control protein.

Because CELF1 is elevated in patients with DM1, down-regulation of CELF1 expression in cells and tissues transduced with DMPK inhibitory RNAs indicates that treatment with DMPK inhibitory RNAs as described herein was effective.

Example 10

AAV Injection and Delivery

Because both muscle and brain are affected in DM1, vectors are injected for delivery into all cells. Mice are injected with an effective dose (in some examples, dosage will be up to about 1 E 15 in max 300 uL diluted in PBS (0.9% Sodium Chloride)) at the appropriate age (P1 to 12 weeks of age). In some instances, doses and volumes of injection depend on the injection route. For example, amounts in most instances do not exceed 50, 50, 300 uL, or 5 or 15 uL of up to 1 E 15 vector genomes/uL for intramuscular injection, intravenous injection (face vein or tail vein), intracerebroventricular injection, or cerebellomedullary injection (cisterna magna), respectively. In some instances, injection route varies based on the promoters and constructs, and will be intramuscular (e.g., tibialis anterior (IM)), intravascular (e.g., tail vein (TV) or face vein (FV)), intracerebroventricular (ICV), or cerebellomedullary (e.g., cisterna magna (ICM/lumbar)).

In most instances, tail-vein injections are performed without anesthesia, but with the mouse briefly placed in a cone-shaped restraint. All other injections are performed with the mouse under anesthesia by ketamine/xylazine (100 mg/kg and 10 mg/kg) via IP or isofluorane (5% induction, 2% maintenance) via inhalation except for face vein and ICV. For these latter procedures, and because they are performed on P1-3 animals, anesthesia is performed via placement on ice (cryo-anesthetization process described below). Following the injection, animals are placed on a heating pad. Anesthetized mice are monitored until sternal recumbency is regained.

Intramuscular injection (volume up to about 50 uL):

Around 21 and 85 days of age mice are sedated with Isofluorane. Legs are shaved and up to 50 uL of AAV or 0.9% saline solution is injected into the tibialis anterior. Animals are placed on a heating pad and are monitored until they are fully recovered and placed back in their cage.

Tail Vein Injections (TV, volume range: about 150-300 uL):

Around 21 and 85 days of age mice are placed in a tail vein apparatus. The tail is warmed via light bulb to enlarge the veins. Once the tail vein is visible, AAV9 or PBS is injected. Following injection, a sterile cotton pad is placed on the injection site and held with pressure until any bleeding ceases. Mice are placed back in their cage.

Intracisternal magna (ICM)/Lumbar puncture (volume range: about 3-15 uL):

Around 21 and 85 days of age mice are sedated with Isofluorane. Using a sterile scalpel, a 1 cm skin incision is made at the base of the skull. A micro-capillary needle is inserted 1 mm deep into the cisterna and either virus (e.g., AAV) or PBS is injected. The incision site is closed using tissue adhesive or staples. Animals are placed on a heating pad and are monitored until they are fully recovered and placed back in their cage. Because only a small incision of the skin is made, pain medication is not necessary. Lumbar puncture is similar to ICM injection and will follow very similar steps: the micro-capillary needle is inserted into the intrathecal space between the L4 and L5 vertebrae, but without making an incision in the skin. This injection does not require any surgery.

ICV Injection (Volume Range: About 3-5 uL):

1-3 day old pups are anesthetized via placement on ice (cryo-anesthetization process described below). An anesthetized pup is placed on a clean surface and held steady between the thumb and index finger. Using the other hand, a laser pulled Borosilicate Glass Microtube needle is inserted about 1 mm above the eye (either side) and 0.5-1 mm deep. No more than 5 uL of virus or PBS is injected. This is a minimally invasive procedure that takes less than 3 minutes to perform. Following the injection, pups are placed on a heating pad or in an incubator to recover. Once the animal is moving it is placed back in the cage with the mom.

Facial Vein Injection (Volume Range: Up to about 50 uL):

1-3 day old pups are anesthetized via placement on ice (cryo-anesthetization process described below). An anesthetized pup is placed on a clean surface and held steady between the thumb and index finger. Using the other hand, an insulin needle is inserted into the cranial vein about 1 mm above the eye (either side) and 0.5-1 mm deep. No more than 50 uL of virus or 0.9% saline solution is injected. This is a minimally invasive procedure that takes less than 3 minutes to perform. Following the injection, pups are placed on a heating pad to recover. Once the animal is moving it is placed back in the cage with its mother.

After transduction of DMPK inhibitory RNAs into the mice, experiments are carried out (e.g., RT-PCR, Northern blot analysis, Western blot analysis, FISH analysis, etc. are carried out, as described herein above, to determine if U6shRNA and U7snRNA knock down DMPK mRNA expression and/or interfere with expression of the CTG trinucleotide repeat in the 3' untranslated region of the DMPK Gene.

In mice treated with U6shRNA and U7snRNA constructs as described herein, there is a reduction or elimination of myotonic dystrophy symptoms including, but not limited to, restoration of normal gene splicing patterns, e.g., in genes including, but not limited to, CLCN (and CLCN1, 2, 3, 4, 5, 6, etc.), BIN1, SERCA-1, MLBN1, MLBN2, and IR; and/or a reduction of expression of CELF1 and MBLN1, and/or the reduction of the number of nuclear foci or CUG foci (including foci that sequester genes, like MBLN1) or the reduction of centronucleation; and the amelioration of muscle hyper-excitability using electromyography.

Example 11

U6shRNA and U7snRNA Knock Down DMPK mRNA Expression and/or Interfere with Expression of the CTG Trinucleotide Repeat in the 3' Untranslated Region of the DMPK Gene in the DMSXL Model Pathologic features of DM1 are assessed in the well-characterized DMSXL mouse model containing the human DMPK containing 1000 CTG repeats [Huguet et al., PLoS Genet. 8(11) (2012); 8(11); doi.org/10.1371/journal.pgen.1003043] following local intramuscular delivery and/or systemic delivery of AAV comprising U6shRNA and/or U7snRNA are disclosed herein.

At 4 and 12 weeks post-injection, tibialis anterior (TA) of mice are analyzed with electromyography (EMG), force measurements, and assessment of splicing alterations. In patients with DM1, muscle myotonia/stiffness results in impaired motor control and mobility [Logigian et al., Neurology 74(18): 1441-8 (2010)].

A prior study demonstrated that myotonia is one of the most prevalent symptoms and is reported by 90% of DM1 patients [Heatwole et al., Neurology 79(4): 348-57 (2012)]. Myotonia can be quantified electrophysiologically by testing for muscle hyper-excitability using electromyography (EMG) [Kanadia et al., Science 302(5652): 1978-80 (2003); Wheeler et al., J. Clin. Investigation 117(12): 3952-7 (2007); Statland et al., JAMA 308(13): 1357-65 (2012)]. Myotonic potentials on EMG are recorded from the TA muscle and quantified by a blinded evaluator with experience in clinical EMG assessment of myotonia in DM1 patients [Kanadia et al., Science 302(5652): 1978-1980 (2003); Wheeler et al., J. Clin. Investigation 117(12): 3952-7 (2007); Statland et al., JAMA 308(13): 1357-65 (2012)].

Severity of EMG myotonia is used as a simple, translational readout identifying development of a DM1 phenotype. In addition, force assessment also is performed. Two tests are performed on the ex vivo TA preparations: isometric force (providing assessment of strength), and eccentric contractions (evaluating sarcolemma stability). The objective is to perform isolated muscle function measurements for mouse extensor TA. The assay is limited to the evaluation of isometric forces of isolated muscles in vitro.

Evaluation of muscle function requires careful surgical tendon-to-tendon excision of muscles from anesthetized animals. Functional testing of mouse skeletal muscles requires a minimum of four components: (1) a force transducer to monitor force production, (2) a stimulator and electrodes to excite the muscle, (3) a bath to superfuse the muscle with oxygenated Ringer's solution, and (4) a device to record force production. While the tendons are excised, muscles remain attached to the leg and continue to receive blood/oxygen flow from the mouse. For comparative purposes, all force measurements are expressed per unit cross-sectional area (normalized isometric force or tension: $mN/mm^2$). Cross-sectional area (CSA) is calculated using the following equation: CSA=(muscle mass in g)/[(optimal fiber length in cm)×(muscle density in $g/cm^3$)], where muscle density is 1.06 $g/cm^3$).

Gene splicing alterations (e.g., CLCN1, BIN1, SERCA-1, MLBN1, and MLBN2) are assessed by RT-PCR. Additionally, the number of nuclear CUG foci is quantified (as described herein above). Fluorescent in situ hybridization (FISH) is used to check to determine if the CUG foci colocalize with MBNL-1 (as described herein above). Additionally, Western blot analysis of CELF-1 is carried out to determine if CELF-1 is being over expressed. Tissue histology is carried out to measure muscle fiber size and check for the presence of centronucleated fibers. Muscle is tested using electromyography.

In mice treated with U6shRNA and U7snRNA constructs as described herein, there is a reduction or elimination of myotonic dystrophy symptoms including, but not limited to, restoration of normal gene splicing patterns, e.g., in genes including, but not limited to, CLCN1, BIN1, SERCA-1, MLBN1, MLBN2, and IR; and/or a reduction of expression of CELF1 and MBLN1, and/or the reduction of the number of nuclear foci or CUG foci (including foci that sequester genes, like MBLN1) or the reduction of centronucleatoin; and the amelioration of muscle hyper-excitability using electromyography.

Example 12

U6shRNA and U7snRNA Knock Down DMPK mRNA Expression and/or Interfere with Expression of the CTG Trinucleotide Repeat in the 3' Untranslated Region of the DMPK Gene in the iDM1 Model Pathologic features of DM1 are assessed in the iDM1 model (as described herein above in Examples 1 and 2) following delivery of AAV (as described herein above in Example 10) comprising U6shRNA and/or U7snRNA constructs described herein.

At 4 and 12 weeks post-injection, tibialis anterior (TA) of mice are extracted. The cells and tissues are analyzed for histology. The health condition of muscle is tested with electromyography (EMG) and force measurements. Cells and tissues are assessed for splicing alterations, FISH, Western blot, RT-PCR, Northern blot analysis and Western blot analysis. Gene splicing alterations (e.g., CLCN1, BIN1, SERCA-1, MLBN1, and/or MLBN2) are assessed by RT-PCR. Additionally, the number of nuclear CUG foci is quantified (as described herein above). FISH is used to check to determine if the CUG foci colocalize with MBNL-1 (as described herein above). Additionally, Western blot analysis of CELF-1 is carried out to determine if CELF-1 is being over expressed. Tissue histology is carried out to measure muscle fiber size and check for the presence of centronucleated fibers. Muscle is tested using electromyography and force measurements.

In mice treated with U6shRNA and U7snRNA constructs as described herein, there is a reduction or elimination of myotonic dystrophy symptoms including, but not limited to, restoration of normal gene splicing patterns, e.g., in genes including, but not limited to, CLCN1, BIN1, SERCA-1, MLBN1, MLBN2, and IR; and/or a reduction of expression of CELF1 and MBLN1, and/or the reduction of the number of nuclear foci or CUG foci (including foci that sequester genes, like MBLN1) or the reduction of centronucleatoin; and the amelioration of muscle hyper-excitability using electromyography.

Example 13

U6shRNA Knock Down DMPK mRNA Expression in Human Cells

This Example discloses the use of AAV to deliver U6shRNA constructs targeting DMPK mRNA (i.e., targeted to bind 3'UTR) to knock down or interfere with the DMPK transcript to decrease human DMPK expression in PANC-1 and HEK293 cells in vitro.

Figure 8:
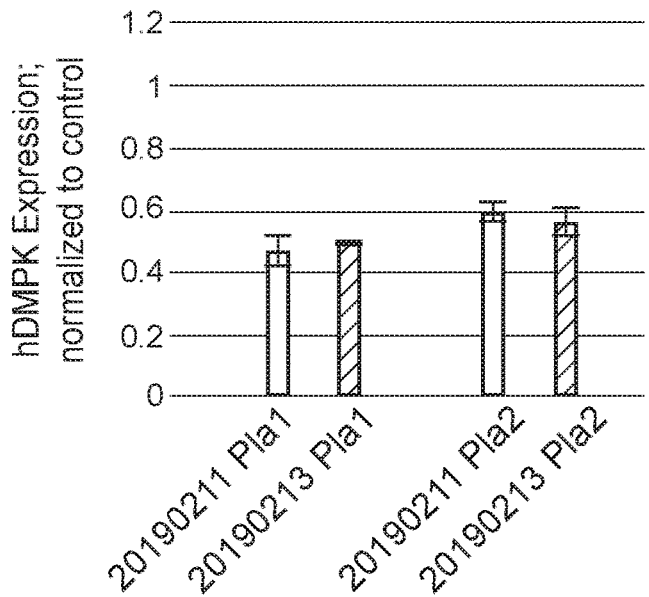
FIG. 8 shows the downregulation of DMPK expression in human PANC-1 and HEK293 cells by AAV comprising DNA encoding short hairpin RNAs (rAAV.shRNAs) (i.e., 2577 and 2685).

Human pancreatic cancer cells, i.e., PANC-1, and human kidney cancer cells, i.e., HEK293 cells, were seeded (2e5 cells/well) 24 hours prior to transfection. In order to knock down or interfere with the DMPK transcript in these cell lines, constructs comprising DNA encoding 2577 (i.e., SEQ ID NO: 3) and 2683 (i.e., SEQ ID NO: 7) and, more specifically, the DNA encoding U6T6.sh2577 (i.e., SEQ ID NO: 20) and U6T6.sh2683 (i.e., SEQ ID NO: 24) were used. The constructs (500 ng plasmid DNA) and a GFP control were transfected into the PANC-1 and HEK 293 cells using LipoFectamine 3000. 72 hours post-transfection cells were collected and RNA was isolated using an RNeasy Plus kit (Qiagen). Complementary DNA (cDNA) was generated from the RNA using SuperScribe. RNA integrity was analyzed using an Agilent 2100 Bioanalyzer. Quantitative PCR (qPCR) was carried out and data was normalized using three housekeeping genes, i.e., UBC, GUSB, and HPRT1. Fold change was compared to cells transfected with siGAPDH (control). Cell lysate was added to the column using R1054 Quick-RNA (Zymo Research, Irvine, Calif.).

qPCR results showed that AAV vectors comprising shRNA targeting the human DMPK RNA (i.e., sh2577 and sh2683) under the control of the U6 promoter were successful in downregulating DMPK expression by as much as about 50-53% (i.e., sh2577) and about 40-44% (i.e., sh2683) (see FIG. 8).

Example 14

Figure 9A:
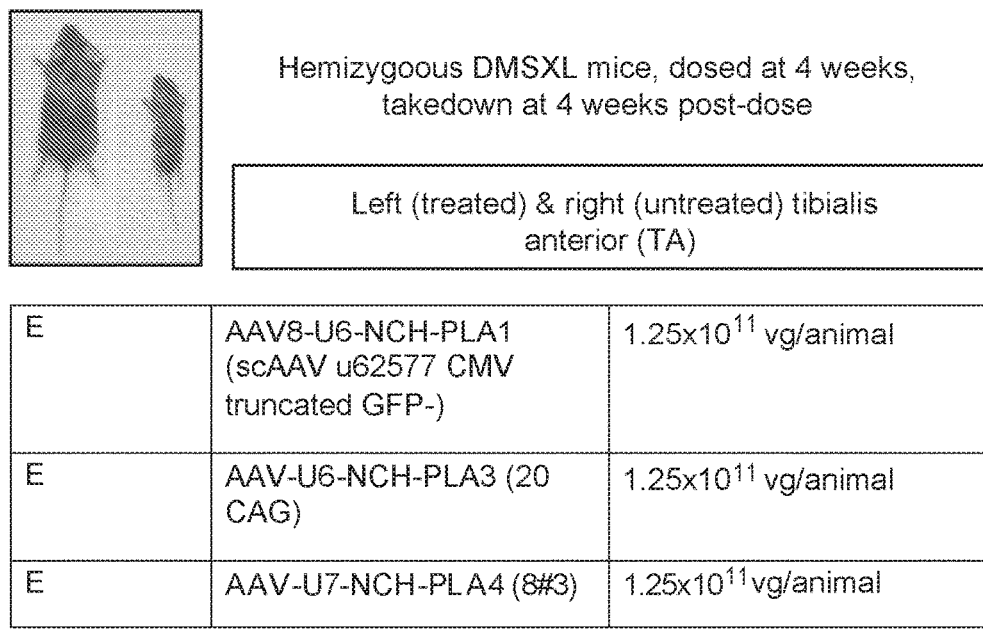
FIGS. 9A-C shows the downregulation of hDMPK expression in hemizygous DMSXL mice treated at 4 weeks of age with AAV8 ($1.25 \times 10^{11}$ vg/animal) comprising various constructs designed to downregulate or interfere with hDMPK mRNA transcript.
Figure 9B:
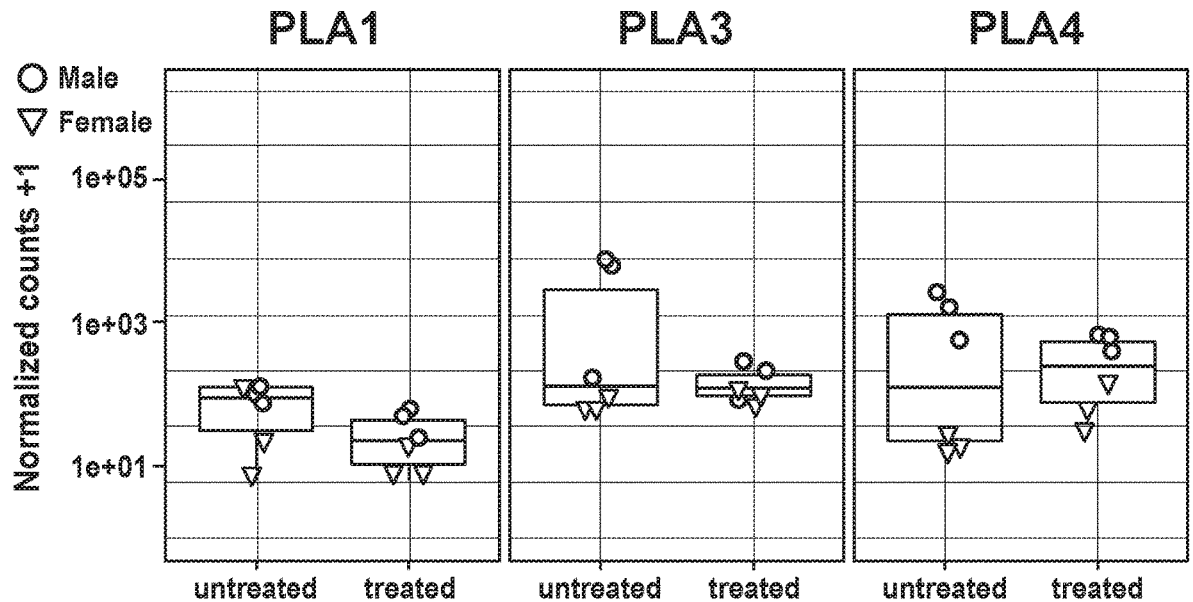
Figure 9C:
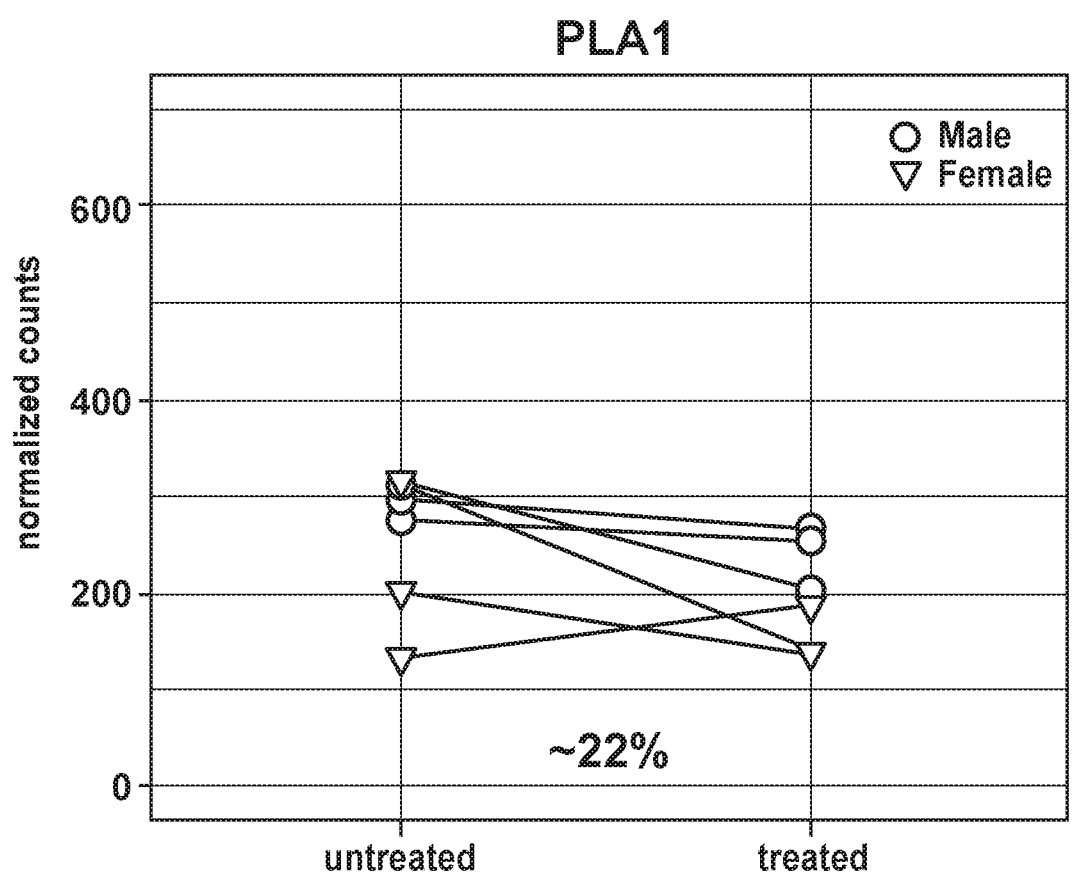

U6shRNA and U7snRNA Knock Down DMPK mRNA Expression in Hemizygous DMSXL Mice The objective of this study was to test three different DMPK targeting adeno-associated virus (AAV) constructs in a mouse model of myotonic dystrophy type 1, the DMSXL mouse. The transgenic DMSXL mouse line carries a 45-kb human genomic fragment containing the human DMPK gene (hDMPK) with >1000 CTG repeat. Hemizygous mice will carry and express transcript from a single hDMPK copy. Each AAV construct was injected intramuscularly into the tibialis anterior (TA) muscle of the left leg of a hemizygous DMSXL mice (Hemi), at a dose of $1.25 \times 10^{11}$ vg/animal (FIG. 9A). The contralateral TA remained untreated and acted as the control leg. A total of three hemizygous female and three hemizygous male DMSXL mice, at the age of four weeks old, were injected with each AAV construct (i.e. sample size of six), e.g., PLA1 (i.e., SEQ ID NO: 20 (U6.sh2577)), PLA3 (SEQ ID NO: 34 (U7-20CTG)) and PLA4 (SEQ ID NO: 31 (U7EX8#3). Four weeks following administration, both right and left TA muscles were harvested. RNA was isolated and prepared and the RNA sequence and the RNA expression level of hDMPK were analyzed. Reduced levels of hDMPK RNA expression in the treated leg compared to the untreated leg were observed in mice treated with the PLA1 construct (i.e., SEQ ID NO: 20 (U6.sh2577)) (FIG. 9B). The PLA1 construct showed a 22% of knockdown hDMPK in the treated TA muscle versus the untreated contralateral side (FIG. 9C).

While the present disclosure has been described in terms of specific embodiments, it is understood that variations and modifications will occur to those skilled in the art. Accordingly, only such limitations as appear in the claims should be placed on the disclosure.

All documents referred to in this application are hereby incorporated by reference in their entirety.

The nucleotide and amino acid sequences disclosed herein are set out in Table 1, set out below.

TABLE 1

Sequence Table

| Sequence Identification Number | Sequence |
|---|---|
| 1 | AGGGGGGCTGGACCAAGGGGTGGGG<br>AGAAGGGGAGGAGGCCTCGGCCGGC<br>CGCAGAGAGAAGTGGCCAGAGAGGC<br>CCAGGGGACAGCCAGGGACAGGCAG<br>ACATGCAGCCAGGGCTCCAGGGCCT<br>GGACAGGGGCTGCCAGGCCCTGTGA<br>CAGGAGGACCCCGAGCCCCCGGCCC |

TABLE 1-continued

Sequence Table

| Sequence Identification Number | Sequence |
|---|---|
| | GGGGAGGGGCCATGGTGCTGCCTGT |
| | CCAACATGTCAGCCGAGGTGCGGCT |
| | GAGGCGGCTCCAGCAGCTGGTGTTG |
| | GACCCGGGCTTCCTGGGGCTGGAGC |
| | CCCTGCTCGACCTTCTCCTGGGCGT |
| | CCACCAGGAGCTGGGCGCCTCCGAA |
| | CTGGCCCAGGACAAGTACGTGGCCG |
| | ACTTCTTGCAGTGGGCGGAGCCCAT |
| | CGTGGTGAGGCTTAAGGAGGTCCGA |
| | CTGCAGAGGGACGACTTCGAGATTC |
| | TGAAGGTGATCGGACGCGGGGCGTT |
| | CAGCGAGGTAGCGGTAGTGAAGATG |
| | AAGCAGACGGGCCAGGTGTATGCCA |
| | TGAAGATCATGAACAAGTGGGACAT |
| | GCTGAAGAGGGGCGAGGTGTCGTGC |
| | TTCCGTGAGGAGAGGGACGTGTTGG |
| | TGAATGGGGACCGGCGGTGGATCAC |
| | GCAGCTGCACTTCGCCTTCCAGGAT |
| | GAGAACTACCTGTACCTGGTCATGG |
| | AGTATTACGTGGGCGGGGACCTGCT |
| | GACACTGCTGAGCAAGTTTGGGGAG |
| | CGGATTCCGGCCGAGATGGCGCGCT |
| | TCTACCTGGCGGAGATTGTCATGGC |
| | CATAGACTCGGTGCACCGGCTTGGC |
| | TACGTGCACAGGGACATCAAACCCG |
| | ACAACATCCTGCTGGACCGCTGTGG |
| | CCACATCCGCCTGGCCGACTTCGGC |
| | TCTTGCCTCAAGCTGCGGGCAGATG |
| | GAACGGTGCGGTCGCTGGTGGCTGT |
| | GGGCACCCCAGACTACCTGTCCCCC |
| | GAGATCCTGCAGGTGTGGGCGGTG |
| | GGCCTGGGACAGGCAGCTACGGGCC |
| | CGAGTGTGACTGGTGGGCGCTGGGT |
| | GTATTCGCCTATGAAATGTTCTATG |
| | GGCAGACGCCCTTCTACGCGGATTC |
| | CACGGCGGAGACCTATGGCAAGATC |
| | GTCCACTACAAGGAGCACCTCTCTC |
| | TGCCGCTGGTGGACGAAGGGGTCCC |
| | TGAGGAGGCTCGAGACTTCATTCAG |
| | CGGTTGCTGTGTCCCCGGAGACAC |
| | GGCTGGGCCGGGGTGGAGCAGGCGA |
| | CTTCCGGACACATCCCTTCTTCTTT |
| | GGCCTCGACTGGGATGGTCTCCGGG |
| | ACAGCGTGCCCCCCTTTACACCGGA |
| | TTTCGAAGGTGCCACCGACACATGC |
| | AACTTCGACTTGGTGGAGGACGGGC |
| | TCACTGCCATGGTGAGCGGGGGCGG |
| | GGAGACACTGTCGGACATTCGGGAA |
| | GGTGCGCCGCTAGGGGTCCACCTGC |
| | CTTTTGTGGGCTACTCCTACTCCTG |
| | CATGGCCCTCAGGGACAGTGAGGTC |
| | CCAGGCCCCACACCCATGGAACTGG |
| | AGGCCGAGCAGCTGCTTGAGCCACA |
| | CGTGCAAGCGCCCAGCCTGGAGCCC |
| | TCGGTGTCCCCACAGGATGAAACAG |
| | CTGAAGTGCAGTTCCAGCGGCTGT |
| | CCCTGCGGCAGAGGCTGAGGCCGAG |
| | GTGACGCTGCGGGAGCTCCAGGAAG |
| | CCCTGGAGGAGGAGGTGCTCACCCG |
| | GCAGAGCCTGAGCCGGGAGATGGAG |
| | GCCATCCGCACGGACAACCAGAACT |
| | TCGCCAGTCAACTACGCGAGGCAGA |
| | GGCTCGGAACCGGGACCTAGAGGCA |
| | CACGTCCGGCAGTTGCAGGAGCGGA |
| | TGGAGTTGCTGCAGGCAGAGGGAGC |
| | CACAGCTGTCACGGGGGTCCCCAGT |
| | CCCCGGGCCACGGATCCACCTTCCC |
| | ATCTAGATGCCCCCGACCGTGGC |
| | TGTGGGCCAGTGCCCGCTGGTGGGG |
| | CCAGGCCCCATGCACCGCCGCCACC |
| | TGCTGCTCCCTGCCAGGGTCCCTAG |
| | GCCTGGCCTATCGGAGGCGCTTCC |
| | CTGCTCCTGTTCGCCGTTGTTCTGT |

| Sequence Identification Number | Sequence |
|---|---|
| | CTCGTGCCGCCGCCCTGGGCTGCAT |
| | TGGGTTGGTGGCCCACGCGGCCAA |
| | CTCACCGCAGTCTGGCGCCGCCCAG |
| | GAGCCGCCCGCGCTCCCTGAACCCT |
| | AGAACTGTCTTCGACTCCGGGGCCC |
| | CGTTGGAAGACTGAGTGCCCGGGGC |
| | ACGGCACAGAAGCCGCGCCCACCGC |
| | CTGCCAGTTCACAACCGCTCCGAGC |
| | GTGGGTCTCCGCCCAGCTCCAGTCC |
| | TGTGATCCGGGCCCGCCCCCCTAGCG |
| | GCCGGGAGGGAGGGGCCGGGTCCG |
| | CGGCCGGCGAACGGGGCTCGAAGGG |
| | TCCTTGTAGCCGGGAATGCTGCTGC |
| | TGCTGCTGCTGCTGCTGCTGCTGCT |
| | GCTGCTGCTGCTGCTGCTGCTGCTG |
| | CTGGGGGGATCACAGACCATTTCTT |
| | TCTTTCGGCCAGGCTGAGGCCCTGA |
| | CGTGGATGGGCAAACTGCAGGCCTG |
| | GGAAGGCAGCAAGCCGGGCCGTCCG |
| | TGTTCCATCCTCCACGCACCCCCAC |
| | CTATCGTTGGTTCGCAAAGTGCAAA |
| | GCTTTCTTGTGCATGACGCCCTGCT |
| | CTGGGGAGCGTCTGGCGCGATCTCT |
| | GCCTGCTTACTCGGGAAATTTGCTT |
| | TTGCCAAACCCGCTTTTTCGGGGAT |
| | CCCGCGCCCCCCTCCTCACTTGCGC |
| | TGCTCTCGGAGCCCCAGCCGGCTCC |
| | GCCCGCTTCGGCGTTTGGATATTT |
| | ATTGACCTCGTCCTCCGACTCGCTG |
| | ACAGGCTACAGGACCCCCAACAACC |
| | CCAATCCACGTTTTGGATGCACTGA |
| | GACCCCGACATTCCTCGGTATTTAT |
| | TGTCTGTCCCCACCTAGGACCCCCA |
| | CCCCCGACCCTCGCGAATAAAAGGC |
| | CCTCCATCTGCCCAAAGCTCTGGA |
| 2 | MSAEVRLRRLQQLVLDPGFLGLEPL |
| | LDLLLGVHQELGASELAQDKYVADF |
| | LQWAEPIVVRLKEVRLQRDDFEILK |
| | VIGRGAFSEVAVVKMKQTGQVYAMK |
| | IMNKWDMLKRGEVSCFREERDVLVN |
| | GDRRWITQLHFAFQDENYLYLVMEY |
| | YVGGDLLTLLSKFGERIPAEMARFY |
| | LAEIVMAIDSVHRLGYVHRDIKPDN |
| | ILLDRCGHIRLADFGSCLKLRADGT |
| | VRSLVAVGTPDYLSPEILQAVGGGP |
| | GTGSYGPECDWWALGVFAYEMFYGQ |
| | TPFYADSTAETYGKIVHYKEHLSLP |
| | LVDEGVPEEARDFIQRLLCPPETRL |
| | GRGGAGDFRTHPFFFGLDWDGLRDS |
| | VPPFTPDFEGATDTCNFDLVEDGLT |
| | AMVSGGGETLSDIREGAPLGVHLPF |
| | VGYSYSCMALRDSEVPGPTPMELEA |
| | EQLLEPHVQAPSLEPSVSPQDETAE |
| | VAVPAAVPAAEAEAEVTLRELQEAL |
| | EEEVLTRQSLSREMEAIRTDNQNFA |
| | SQLREAEARNRDLEAHVRQLQERME |
| | LLQAEGATAVTGVPSPRATDPPSHL |
| | DGPPAVAVGQCPLVGPGPMIIRRHL |
| | LLPARVPRPGLSEALSLLLFAVVLS |
| | RAAALGCIGLVAHAGQLTAVWRRPG |
| | AARAP |
| 3 | CTCGAGTGAGCGAGCCTGCTTACTC |
| | GGGAAATTTCTGTAAAGCCACAGAT |
| | GGGAAATTTCCCGAGTAAGCAGGCA |
| | CGCCTACTAGA |
| 4 | CTCGAGTGAGCGAACCTGCCTTTTG |
| | TGGGCTACTCTGTAAAGCCACAGAT |
| | GGGAGTAGCCCACAAAAGGCAGGTG |
| | TGCCTACTAG |

TABLE 1-continued

Sequence Table

| Sequence Identification Number | Sequence |
|---|---|
| 5 | CTCGAGTGAGCGACGACTTCGGCTC TTGCCTCAACTGTAAAGCCACAGAT GGGTTGAGGCAAGAGCCGAAGTCGG TGCCTACTAG |
| 6 | CTCGAGTGAGCGAAGGGACGACTTC GAGATTCTGCTGTAAAGCCACAGAT GGGCAGAATCTCGAAGTCGTCCCTC CGCCTA |
| 7 | CTCGAGTGAGCGATTCGGCGGTTTG GATATTTATCTGTAAAGCCACAGAT GGGATAAATATCCAAACCGCCGAAG CGCCTA |
| 8 | ACAGCGGTCCAGCAGGATGTTGTCG GGTTTGATGTCCCT |
| 9 | TCTGTGGCCAGGGCACTGGCTCACC GTTCCATCTGCCCGCAGCTTGAGG |
| 10 | ACCGTTCCATCTGCCCGCAGCTTGA GGCAAGAGCC |
| 11 | AATGAACCTCCCTTCTGTGGTCCCA CCAGGC |
| 12 | GCGGCGCACCTTCCCGAATGTCCGA CAGTGTCTCCTGCG |
| 13 | GGAGTAGCCCACAAAAGGCAGGTGG ACCCCTAGCGGCGCA |
| 14 | ACCTGAGGGCCATGCAGGAGTAGGA GTAG |
| 15 | TCTCCTGCGCAAGACACACAGATGT GAGCAGCAGTCGTC |
| 16 | CAGCAGCAGCAGCAGCAGCAGC AGCAGCAGCAGCAGCAG |
| 17 | CAGCAGCAGCAGCAGCAGCAGC AGCAGCAGCAGCAGCAGCAGCA GCAGCAGCAG |
| 18 | CAGCAGCAGCAGCAGCAGCAGCATT CCCGGCTACAAGGACC |
| 19 | GAAATGGTCTGTGATCCCCCCAGCA GCAGCAGCAGCAG |
| 20 | GACGCCGCCATCTCTAGGCCCGCGC CGGCCCCCTCGCACAGACTTGTGGG AGAAGCTCGGCTACTCCCCTGCCCC GGTTAATTTGCATATAATATTTCCT AGTAACTATAGAGGCTTAATGTGCG ATAAAAGACAGATAATCTGTTCTTT TTAATACTAGCTACATTTTACATGA TAGGCTTGGATTTCTATAAGAGATA CAAATACTAAATTATTATTTTAAAA AACAGCACAAAAGGAAACTCACCCT AACTGTAAAGTAATTGTGTGTTTTG AGACTATAAATATCCCTTGGAGAAA AGCCTTGTTTGCGTTTAGTGAACCG TCAGATGGTACCGTTTAAACTCGAG TGAGCGAGCCTGCTTACTCGGGAAA TTTCTGTAAAGCCACAGATGGGAAA TTTCCCGAGTAAGCAGGCACGCCTA CTAGAGCGGCCGCCACAGCGGGGAG ATCCAGACATGATAAGATACATTTT TT |
| 21 | GACGCCGCCATCTCTAGGCCCGCGC CGGCCCCCTCGCACAGACTTGTGGG AGAAGCTCGGCTACTCCCCTGCCCC GGTTAATTTGCATATAATATTTCCT AGTAACTATAGAGGCTTAATGTGCG ATAAAAGACAGATAATCTGTTCTTT TTAATACTAGCTACATTTTACATGA TAGGCTTGGATTTCTATAAGAGATA CAAATACTAAATTATTATTTTAAAA AACAGCACAAAAGGAAACTCACCCT AACTGTAAAGTAATTGTGTGTTTTG AGACTATAAATATCCCTTGGAGAAA AGCCTTGTTTGCGTTTAGTGAACCG TCAGATGGTACCGTTTAAACTCGAG TGAGCGAACCTGCCTTTTGTGGGCT ACTCTGTAAAGCCACAGATGGGAGT AGCCCACAAAAGGCAGGTGTGCCTA CTAGAGCGGCCGCCACAGCGG GGAGATCCAGACATGATAAGATACA TTTTTT |
| 22 | GACGCCGCCATCTCTAGGCCCGCGC CGGCCCCCTCGCACAGACTTGTGGG AGAAGCTCGGCTACTCCCCTGCCCC GGTTAATTTGCATATAATATTTCCT AGTAACTATAGAGGCTTAATGTGCG ATAAAAGACAGATAATCTGTTCTTT TTAATACTAGCTACATTTTACATGA TAGGCTTGGATTTCTATAAGAGATA CAAATACTAAATTATTATTTTAAAA AACAGCACAAAAGGAAACTCACCCT AACTGTAAAGTAATTGTGTGTTTTG AGACTATAAATATCCCTTGGAGAAA AGCCTTGTTTGCGTTTAGTGAACCG TCAGATGGTACCGTTTAAACTCGAG TGAGCGACGACTTCGGCTCTTGCCT CAACTGTAAAGCCACAGATGGGTTG AGGCAAGAGCCGAAGTCGGTGCCTA CTAGAGCGGCCGCCACAGCGG GGAGATCCAGACATGATAAGATACA TTTTTT |
| 23 | GACGCCGCCATCTCTAGGCCCGCGC CGGCCCCCTCGCACAGACTTGTGGG AGAAGCTCGGCTACTCCCCTGCCCC GGTTAATTTGCATATAATATTTCCT AGTAACTATAGAGGCTTAATGTGCG ATAAAAGACAGATAATCTGTTCTTT TTAATACTAGCTACATTTTACATGA TAGGCTTGGATTTCTATAAGAGATA CAAATACTAAATTATTATTTTAAAA AACAGCACAAAAGGAAACTCACCCT AACTGTAAAGTAATTGTGTGTTTTG AGACTATAAATATCCCTTGGAGAAA AGCCTTGTTTGCGTTTAGTGAACCG TCAGATGGTACCGTTTAAACTCGA GTGAGCGAAGGGACGACTTCGAGAT TCTGCTGTAAAGCCACAGATGGGCA GAATCTCGAAGTCGTCCCTCCGCCT ACTAGAGCGGCCGCCACAGCGGGGA GATCCAGACATGATAAGATACATTT TTT |
| 24 | GACGCCGCCATCTCTAGGCCCGCGC CGGCCCCCTCGCACAGACTTGTGGG AGAAGCTCGGCTACTCCCCTGCCCC GGTTAATTTGCATATAATATTTCCT AGTAACTATAGAGGCTTAATGTGCG ATAAAAGACAGATAATCTGTTCTTT TTAATACTAGCTACATTTTACATGA TAGGCTTGGATTTCTATAAGAGATA CAAATACTAAATTATTATTTTAAAA AACAGCACAAAAGGAAACTCACCCT |

TABLE 1-continued

Sequence Table

| Sequence Identification Number | Sequence |
|---|---|
|  | AACTGTAAAGTAATTGTGTGTTTTG AGACTATAAATATCCCTTGGAGAAA AGCCTTGTTGCGTTTAGTGAACCG TCAGATGGTACCGTTTAAACCTCGA GTGAGCGATTCGGCGGTTTGGATAT TTATCTGTAAAGCCACAGATGGGAT AAATATCCAAACCGCCGAAGCGCCT ACTAGAGCGGCCGCCACAGCGGGGA GATCCAGACATGATAAGATACATTT TTT |
| 25 | GGGTCTAGATAACAACATAGGAGCT GTGATTGGCTGTTTTCAGCCAATCA GCACTGACTCATTTGCATAGCCTTT ACAAGCGGTCACAAACTCAAGAAAC GAGCGGTTTTAATAGTCTTTTAGAA TATTGTTTATCGAACCGAATAAGGA ACTGTGCTTTGTGATTCACATATCA GTGGAGGGGTGTGGAAATGGCACCT TGATCTCACCCTCATCGAAAGTGGA GTTGATGTCCTTCCCTGGCTCGCTA CAGACGCACTTCCGCAAACAGCGGT CCAGCAGGATGTTGTCGGGTTTGAT GTCCCTAATTTTTGGAGCAGGTTTT CTGACTTCGGTCGGAAAACCCCTCC CAATTTCACTGGTCTACAATGAAAG CAAAACAGTTCTCTTCCCCGCTCCC CGGTGTGAGAGGGGCTTTGATCC TTCTCTGGTTTCCTAGGAAACGCGT ATGTGGCTAGCAAA |
| 26 | GGGTCTAGATAACAACATAGGAGCT GTGATTGGCTGTTTTCAGCCAATCA GCACTGACTCATTTGCATAGCCTTT ACAAGCGGTCACAAACTCAAGAAAC GAGCGGTTTTAATAGTCTTTTAGAA TATTGTTTATCGAACCGAATAAGGA ACTGTGCTTTGTGATTCACATATCA GTGGAGGGGTGTGGAAATGGCACCT TGATCTCACCCTCATCGAAAGTGGA GTTGATGTCCTTCCCTGGCTCGCTA CAGACGCACTTCCGCAATCTGTGGC CAGGGCACTGGCTCACCGTTCCATC TGCCCGCAGCTTGAGGAATTTTTGG AGCAGGTTTTCTGACTTCGGTCGGA AAACCCCTCCCAATTTCACTGGTCT ACAATGAAAGCAAAACAGTTCTCTT CCCCGCTCCCCGGTGTGTGAGAGGG GCTTTGATCCTTCTCTGGTTTCCTA GGAAACGCGTATGTGGCTAGCAAA |
| 27 | GGGTCTAGATAACAACATAGGAGCT GTGATTGGCTGTTTTCAGCCAATCA GCACTGACTCATTTGCATAGCCTTT ACAAGCGGTCACAAACTCAAGAAAC GAGCGGTTTTAATAGTCTTTTAGAA TATTGTTTATCGAACCGAATAAGGA ACTGTGCTTTGTGATTCACATATCA GTGGAGGGGTGTGGAAATGGCACCT TGATCTCACCCTCATCGAAAGTGGA GTTGATGTCCTTCCCTGGCTCGCTA CAGACGCACTTCCGCAAACCGTTCC ATCTGCCCGCAGCTTGAGGCAAGAG CCAATTTTTGGAGCAGGTTTTCTGA CTTCGGTCGGAAAACCCCTCCCAAT TTCACTGGTCTACAATGAAAGCAAA ACAGTTCTCTTCCCCGCTCCCCGGT GTGTGAGAGGGGCTTTGATCCTTCT CTGGTTTCCTAGGAAACGCGTATGT GGCTAGCAAA |

TABLE 1-continued

Sequence Table

| Sequence Identification Number | Sequence |
|---|---|
| 28 | GGGTCTAGATAACAACATAGGAGCT GTGATTGGCTGTTTTCAGCCAATCA GCACTGACTCATTTGCATAGCCTTT ACAAGCGGTCACAAACTCAAGAAAC GAGCGGTTTTAATAGTCTTTTAGAA TATTGTTTATCGAACCGAATAAGGA ACTGTGCTTTGTGATTCACATATCA GTGGAGGGGTGTGGAAATGGCACCT TGATCTCACCCTCATCGAAAGTGGA GTTGATGTCCTTCCCTGGCTCGCTA CAGACGCACTTCCGCAAAATGAACC TCCCTTCTGTGGTCCCACCAGGCAA TTTTTGGAGCAGGTTTTCTGACTTC GGTCGGAAAACCCCTCCCAATTTCA CTGGTCTACAATGAAAGCAAAACAG TTCTCTTCCCCGCTCCCCGGTGTGT GAGAGGGGCTTTGATCCTTCTCTGG TTTCCTAGGAAACGCGTATGTGGCT AGCAAA |
| 29 | GGGTCTAGATAACAACATAGGAGCT GTGATTGGCTGTTTTCAGCCAATCA GCACTGACTCATTTGCATAGCCTTT ACAAGCGGTCACAAACTCAAGAAAC GAGCGGTTTTAATAGTCTTTTAGAA TATTGTTTATCGAACCGAATAAGGA ACTGTGCTTTGTGATTCACATATCA GTGGAGGGGTGTGGAAATGGCACCT TGATCTCACCCTCATCGAAAGTGGA GTTGATGTCCTTCCCTGGCTCGCTA CAGACGCACTTCCGCAAGCGGCGCA CCTTCCCGAATGTCCGACAGTGTCT CCTGCGAATTTTTGGAGCAGGTTTT CTGACTTCGGTCGGAAAACCCCTCC CAATTTCACTGGTCTACAATGAAAG CAAAACAGTTCTCTTCCCCGCTCCC CGGTGTGTGAGAGGGGCTTTGATCC TTCTCTGGTTTCCTAGGAAACGCGT ATGTGGCTAGCAAA |
| 30 | GGGTCTAGATAACAACATAGGAGCT GTGATTGGCTGTTTTCAGCCAATCA GCACTGACTCATTTGCATAGCCTTT ACAAGCGGTCACAAACTCAAGAAAC GAGCGGTTTTAATAGTCTTTTAGAA TATTGTTTATCGAACCGAATAAGGA ACTGTGCTTTGTGATTCACATATCA GTGGAGGGGTGTGGAAATGGCACCT TGATCTCACCCTCATCGAAAGTGGA GTTGATGTCCTTCCCTGGCTCGCTA CAGACGCACTTCCGCAAGGAGTAGC CCACAAAAGGCAGGTGGACCCCTAG CGGCGCAAATTTTTGGAGCAGGTTT TCTGACTTCGGTCGGAAAACCCCTC CCAATTTCACTGGTCTACAATGAAA GCAAAACAGTTCTCTTCCCCGCTCC CCGGTGTGTGAGAGGGGCTTTGATC CTTCTCTGGTTTCCTAGGAAACGCG TATGTGGCTAGCAAA |
| 31 | GGGTCTAGATAACAACATAGGAGCT GTGATTGGCTGTTTTCAGCCAATCA GCACTGACTCATTTGCATAGCCTTT ACAAGCGGTCACAAACTCAAGAAAC GAGCGGTTTTAATAGTCTTTTAGAA TATTGTTTATCGAACCGAATAAGGA ACTGTGCTTTGTGATTCACATATCA GTGGAGGGGTGTGGAAATGGCACCT TGATCTCACCCTCATCGAAAGTGGA GTTGATGTCCTTCCCTGGCTCGCTA CAGACGCACTTCCGCAAACCTGAGG GCCATGCAGGAGTAGGAGTAGAATT |

TABLE 1-continued

Sequence Table

| Sequence Identification Number | Sequence |
|---|---|
|  | TTTGGAGCAGGTTTTCTGACTTCGG TCGGAAAACCCCTCCCAATTTCACT GGTCTACAATGAAAGCAAAACAGTT CTCTTCCCCGCTCCCCGGTGTGTGA GAGGGGCTTTGATCCTTCTCTGGTT TCCTAGGAAACGCGTATGTGGCTAG CAAA |
| 32 | GGGTCTAGATAACAACATAGGAGCT GTGATTGGCTGTTTTCAGCCAATCA GCACTGACTCATTTGCATAGCCTTT ACAAGCGGTCACAAACTCAAGAAAC GAGCGGTTTTAATAGTCTTTTAGAA TATTGTTTATCGAACCGAATAAGGA ACTGTGCTTTGTGATTCACATATCA GTGGAGGGGTGTGGAAATGGCACCT TGATCTCACCCTCATCGAAAGTGGA GTTGATGTCCTTCCCTGGCTCGCTA CAGACGCACTTCCGCAATCTCCTGC GCAAGACACACAGATGTGAGCAGCA GTCGTCAATTTTTGGAGCAGGTTTT CTGACTTCGGTCGGAAAACCCCTCC CAATTTCACTGGTCTACAATGAAAG CAAAACAGTTCTCTTCCCCGCTCCC CGGTGTGTGAGAGGGGCTTTGATCC TTCTCTGGTTTCCTAGGAAACGCGT ATGTGGCTAGCAAA |
| 33 | GGGTCTAGATAACAACATAGGAGCT GTGATTGGCTGTTTTCAGCCAATCA GCACTGACTCATTTGCATAGCCTTT ACAAGCGGTCACAAACTCAAGAAAC GAGCGGTTTTAATAGTCTTTTAGAA TATTGTTTATCGAACCGAATAAGGA ACTGTGCTTTGTGATTCACATATCA GTGGAGGGGTGTGGAAATGGCACCT TGATCTCACCCTCATCGAAAGTGGA GTTGATGTCCTTCCCTGGCTCGCTA CAGACGCACTTCCGCAACAGCAGCA GCAGCAGCAGCAGCAGCAGCAGCAG CAGCAGCAGCAGAATTTTTGGAGCA GGTTTTCTGACTTCGGTCGGAAAAC CCCTCCCAATTTCACTGGTCTACAA TGAAAGCAAAACAGTTCTCTTCCCC GCTCCCCGGTGTGTGAGAGGGGCTT TGATCCTTCTCTGGTTTCCTAGGAA ACGCGTATGTGGCTAGCAAA |
| 34 | GGGTCTAGATAACAACATAGGAGCT GTGATTGGCTGTTTTCAGCCAATCA GCACTGACTCATTTGCATAGCCTTT ACAAGCGGTCACAAACTCAAGAAAC GAGCGGTTTTAATAGTCTTTTAGAA TATTGTTTATCGAACCGAATAAGGA ACTGTGCTTTGTGATTCACATATCA GTGGAGGGGTGTGGAAATGGCACCT TGATCTCACCCTCATCGAAAGTGGA GTTGATGTCCTTCCCTGGCTCGCTA CAGACGCACTTCCGCAACAGCAGCA GCAGCAGCAGCAGCAGCAGCAGCAG CAGCAGCAGCAGCAGCAGCAGCAGC AGAATTTTTGGAGCAGGTTTTCTGA CTTCGGTCGGAAAACCCCTCCCAAT TTCACTGGTCTACAATGAAAGCAAA ACAGTTCTCTTCCCCGCTCCCCGGT GTGTGAGAGGGGCTTTGATCCTTCT CTGGTTTCCTAGGAAACGCGTATGT GGCTAGCAAA |
| 35 | GGGTCTAGATAACAACATAGGAGCT GTGATTGGCTGTTTTCAGCCAATCA GCACTGACTCATTTGCATAGCCTTT ACAAGCGGTCACAAACTCAAGAAAC |

TABLE 1-continued

Sequence Table

| Sequence Identification Number | Sequence |
|---|---|
|  | GAGCGGTTTTAATAGTCTTTTAGAA TATTGTTTATCGAACCGAATAAGGA ACTGTGCTTTGTGATTCACATATCA GTGGAGGGGTGTGGAAATGGCACCT TGATCTCACCCTCATCGAAAGTGGA G TTGATGTCCTTCCCTGGCTCGCTAC AGACGCACTTCCGCAACAGCAGCAG CAGCAGCAGCAGCATTCCCGGCTAC AAGGACCAATTTTTGGAGCAGGTTT TCTGACTTCGGTCGGAAAACCCCTC CCAATTTCACTGGTCTACAATGAAA GCAAAACAGTTCTCTTCCCCGCTCC CCGGTGTGTGAGAGGGGCTTTGATC CTTCTCTGGTTTCCTAGGAAACGCG TATGTGGCTAGCAAA |
| 36 | GGGTCTAGATAACAACATAGGAGCT GTGATTGGCTGTTTTCAGCCAATCA GCACTGACTCATTTGCATAGCCTTT ACAAGCGGTCACAAACTCAAGAAAC GAGCGGTTTTAATAGTCTTTTAGAA TATTGTTTATCGAACCGAATAAGGA ACTGTGCTTTGTGATTCACATATCA GTGGAGGGGTGTGGAAATGGCACCT TGATCTCACCCTCATCGAAAGTGGA GTTGATGTCCTTCCCTGGCTCGCTA CAGACGCACTTCCGCAAGAAATGGT CTGTGATCCCCCAGCAGCAGCAGC AGCAGCAGAATTTTTGGAGCAGGTT TTCTGACTTCGGTCGGAAAACCCTC CCAATTTCACTGGTCTACAATGAA AGCAAAACAGTTCTCTTCCCCGCTC CCCGGTGTGTGAGAGGGGCTTTGAT CCTTCTCTGGTTTCCTAGGAAACGC GTATGTGGCTAGCAAA |
| 37 | AGGGACATCAAACCCGACAACATCC TGCTGGACCGCTGT |
| 38 | CCTCAAGCTGCGGGCAGTGGAACG GTGAGCCAGTGCCCTGGCCACAGA |
| 39 | GGCTCTTGCCTCAAGCTGCGGGCAG ATGGAACGGT |
| 40 | GCCTGGTGGGACCACAGAAGGGAGG TTCATT |
| 41 | CGCAGGAGACACTGTCGGACATTCG GGAAGGTGCGCCGC |
| 42 | TGCGCCGCTAGGGGTCCACCTGCCT TTTGTGGGCTACTCC |
| 43 | CTACTCCTACTCCTGCATGGCCCTC AGGT |
| 44 | GACGACTGCTGCTCACATCTGTGTG TCTTGCGCAGGAGA |
| 45 | CTGCTGCTGCTGCTGCTGCTGCTGC TGCTGCTGCTGCTGCTG |
| 46 | CTGCTGCTGCTGCTGCTGCTGCTGC TGCTGCTGCTGCTGCTGCTGCT GCTGCTGCTG |
| 47 | GGTCCTTGTAGCCGGGAATGCTGCT GCTGCTGCTGCTG |
| 48 | CTGCTGCTGCTGCTGCTGGGGG GATCACAGACCATTTC |

TABLE 1-continued

Sequence Table

| Sequence Identification Number | Sequence |
|---|---|
| 49 | ACAGCGGUCCAGCAGGAUGUUGUCGGGUUUGAUGUCCCU |
| 50 | UCUGUGGCCAGGGCACUGGCUCACCGUUCCAUCUGCCCGCAGCUUGAGG |
| 51 | ACCGUUCCAUCUGCCCGCAGCUUGAGGCAAGAGCC |
| 52 | AAUGAACCUCCCUUCUGUGGUCCCACCAGGC |
| 53 | GCGGCGCACCUUCCCGAAUGUCCGACAGUGUCUCCUGCG |
| 54 | GGAGUAGCCCACAAAAGGCAGGUGGACCCCUAGCGGCGCA |
| 55 | ACCUGAGGGCCAUGCAGGAGUAGGAGUAG |
| 56 | UCUCCUGCGCAAGACACACAGAUGUGAGCAGCAGUCGUC |
| 57 | CAGCAGCAGCAGCAGCAGCAGCAGCAGCAGCAGCAGCAG |
| 58 | CAGCAGCAGCAGCAGCAGCAGCAGCAGCAGCAGCAGCAGCAGCAGCAG |
| 59 | CAGCAGCAGCAGCAGCAGCAGCAUUCCCGGCUACAAGGACC |
| 60 | GAAAUGGUCUGUGAUCCCCCCAGCAGCAGCAGCAGCAG |
| 61 | TTTGCTAGCCACATACGCGTTTCCTAGGAAACCAGAGAAGGATCAAAGCCCCTCTCACACACCGGGGAGCGGGGAAGAGAACTGTTTTGCTTTCATTGTAGACCAGTGAAATTGGGAGGGGTTTTCCGACCGAAGTCAGAAAACCTGCTCCAAAAATTAGGGACATCAAACCCGACAACATCCTGCTGGACCGCTGTTTGCGGAAGTGCGTCTGTAGCGAGCCAGGGAAGGACATCAACTCCACTTTCGATGAGGGTGAGATCAAGGTGCCATTTCCACACCCCTCCACTGATATGTGAATCACAAAGCACAGTTCCTTATTCGGTTCGATAAACAATATTCTAAAAGACTATTAAAACCGCTCGTTTCTTGAGTTTGTGACCGCTTGTAAAGGCTATGCAAATGAGTCAGTGCTGATTGGCTGAAAACAGCCAATCACAGCTCCTATGTTGTTATCTAGACCC |
| 62 | TTTGCTAGCCACATACGCGTTTCCTAGGAAACCAGAGAAGGATCAAAGCCCCTCTCACACACCGGGGAGCGGGGAAGAGAACTGTTTTGCTTTCATTGTAGACCAGTGAAATTGGGAGGGGTTTTCCGACCGAAGTCAGAAAACCTGCTCCAAAAATTCCTCAAGCTGCGGGCAGATGGAACGGTGAGCCAGTGCCCTGGCCACAGATTGCGGAAGTGCGTCTGTAGCGAGCCAGGGAAGGACATCAACTCCACTTTCGATGAGGGTGAGATCAAGGTGCCATTTCCACACCCCTCCACTGATATGTGAATCACAAAGCACAGTTCCTTATTCGGTTCGATAAACAATATTCTAAAAGACTATTAAAACCGCTCGTTT |

| Sequence Identification Number | Sequence |
|---|---|
| | TTTCTTGAGTTTGTGACCGCTTGTAAAGGCTATGCAAATGAGTCAGTGCTGATTGGCTGAAAACAGCCAATCACAGCTCCTATGTTGTTATCTAGACCC |
| 63 | TTTGCTAGCCACATACGCGTTTCCTAGGAAACCAGAGAAGGATCAAAGCCCCTCTCACACACCGGGGAGCGGGGAAGAGAACTGTTTTGCTTTCATTGTAGACCAGTGAAATTGGGAGGGGTTTTCCGACCGAAGTCAGAAAACCTGCTCCAAAAATTGGCTCTTGCCTCAAGCTGCGGGCAGATGGAACGGTTTGCGGAAGTGCGTCTGTAGCGAGCCAGGGAAGGACATCAACTCCACTTTCGATGAGGGTGAGATCAAGGTGCCATTTCCACACCCCTCCACTGATATGTGAATCACAAAGCACAGTTCCTTATTCGGTTCGATAAACAATATTCTAAAAGACTATTAAAACCGCTCGTTTCTTGAGTTTGTGACCGCTTGTAAAGGCTATGCAAATGAGTCAGTGCTGATTGGCTGAAAACAGCCAATCACAGCTCCTATGTTGTTATCTAGACCC |
| 64 | TTTGCTAGCCACATACGCGTTTCCTAGGAAACCAGAGAAGGATCAAAGCCCCTCTCACACACCGGGGAGCGGGGAAGAGAACTGTTTTGCTTTCATTGTAGACCAGTGAAATTGGGAGGGGTTTTCCGACCGAAGTCAGAAAACCTGCTCCAAAAATTGCCTGGTGGGACCACAGAAGGGAGGTTCATTTTGCGGAAGTGCGTCTGTAGCGAGCCAGGGAAGGACATCAACTTTCGATGAGGGTGAGATCAAGGTGCCATTTCCACACCCCTCCACTGATATGTGAATCACAAAGCACAGTTCCTTATTCGGTTCGATAAACAATATTCTAAAAGACTATTAAACCGCTCGTTTCTTGAGTTTGTGACCGCTTGTAAAGGCTATGCAAATGAGTCAGTGCTGATTGGCTGAAAACAGCCAATCACAGCTCCTATGTTGTTATCTAGACCC |
| 65 | TTTGCTAGCCACATACGCGTTTCCTAGGAAACCAGAGAAGGATCAAAGCCCCTCTCACACACCGGGGAGCGGGGAAGAGAACTGTTTTGCTTTCATTGTAGACCAGTGAAATTGGGAGGGGTTTTCCGACCGAAGTCAGAAAACCTGCTCCAAAAATTCGCAGGAGACACTGTCGGACATTCGGGAAGGTGCGCCGCTTGCGGAAGTGCGTCTGTAGCGAGCCAGGGAAGGACATCAACTCCACTTTCGATGAGGGTGAGATCAAGGTGCCATTTCCACACCCCTCCACTGATATGTGAATCACAAAGCACAGTTCCTTATTCGGTTCGATAAACAATATTCTAAAAGACTATTAAAACCGCTCGTTTCTTGAGTTTGTGACCGCTTGTAAAGGCTATGCAAATGAGTCAGTGCTGATTGGCTGAAAACAGCCAATCACAGCTCCTATGTTGTTATCTAGACCC |
| 66 | TTTGCTAGCCACATACGCGTTTCCTAGGAAACCAGAGAAGGATCAAAGCCCCTCTCACACACCGGGGAGCGGGGAAGAGAACTGTTTTGCTTTCATTGTAGACCAGTGAAATTGGGAGGGGTTTTCCGACCGAAGTCAGAAAACCTGCTCCAAAAATTTGCGCCGCTAGGGGTCCACCTGCCTTTTGTGGGCTACTCCTT |

TABLE 1-continued

Sequence Table

| Sequence Identification Number | Sequence |
|---|---|
|  | GCGGAAGTGCGTCTGTAGCGAGCCA GGGAAGGACATCAACTCCACTTTCG ATGAGGGTGAGATCAAGGTGCCATT TCCACACCCCTCCACTGATATGTGA ATCACAAAGCACAGTTCCTTATTCG GTTCGATAAACAATATTCTAAAAGA CTATTAAAACCGCTCGTTTCTTGAG TTTGTGACCGCTTGTAAAGGCTATG CAAATGAGTCAGTGCTGATTGGCTG AAAACAGCCAATCACAGCTCCTATG TTGTTATCTAGACCC |
| 67 | TTTGCTAGCCACATACGCGTTTCCT AGGAAACCAGAGAAGGATCAAAGCC CCTCTCACACACCGGGGAGCGGGGA AGAGAACTGTTTTGCTTTCATTGTA GACCAGTGAAATTGGGAGGGGTTTT CCGACCGAAGTCAGAAAACCTGCTC CAAAAATTCTACTCCTACTCCTGCA TGGCCCTCAGGTTTGCGGAAGTGCG TCTGTAGCGAGCCAGGGAAGGACAT CAACTCCACTTTCGATGAGGGTGAG ATCAAGGTGCCATTTCCACACCCCT CCACTGATATGTGAATCACAAAGCA CAGTTCCTTATTCGGTTCGATAAAC AATATTCTAAAAGACTATTAAAACC GCTCGTTTCTTGAGTTTGTGACCGC TTGTAAAGGCTATGCAAATGAGTCA GTGCTGATTGGCTGAAAACAGCCAA TCACAGCTCCTATGTTGTTATCTAG ACCC |
| 68 | TTTGCTAGCCACATACGCGTTTCCT AGGAAACCAGAGAAGGATCAAAGCC CCTCTCACACACCGGGGAGCGGGGA AGAGAACTGTTTTGCTTTCATTGTA GACCAGTGAAATTGGGAGGGGTTTT CCGACCGAAGTCAGAAAACCTGCTC CAAAAATTGACGACTGCTGCTCACA TCTGTGTGTCTTGCGCAGGAGATTG CGGAAGTGCGTCTGTAGCGAGCCAG GGAAGGACATCAACTCCACTTTCGA TGAGGGTGAGATCAAGGTGCCATTT CCACACCCCTCCACTGATATGTGAA TCACAAAGCACAGTTCCTTATTCGG TTCGATAAACAATATTCTAAAAGAC TATTAAAACCGCTCGTTTCTTGAGT TTGTGACCGCTTGTAAAGGCTATGC AAATGAGTCAGTGCTGATTGGCTGA AAACAGCCAATCACAGCTCCTATGT TGTTATCTAGACCC |
| 69 | TTTGCTAGCCACATACGCGTTTCCT AGGAAACCAGAGAAGGATCAAAGCC CCTCTCACACACCGGGGAGCGGGGA AGAGAACTGTTTTGCTTTCATTGTA GACCAGTGAAATTGGGAGGGGTTTT CCGACCGAAGTCAGAAAACCTGCTC CAAAAATTCTGCTGCTGCTGCTGCT GCTGCTGCTGCTGCTGCTGCTGCTG CTGTTGCGGAAGTGCGTCTGTAGCG AGCCAGGGAAGGACATCAACTCCAC TTTCGATGAGGGTGAGATCAAGGTG CCATTTCCACACCCCTCCACTGATA TGTGAATCACAAAGCACAGTTCCTT ATTCGGTTCGATAAACAATATTCTA AAAGACTATTAAAACCGCTCGTTTC TTGAGTTTGTGACCGCTTGTAAAGG CTATGCAAATGAGTCAGTGCTGATT GGCTGAAAACAGCCAATCACAGCTC CTATGTTGTTATCTAGACCC |

TABLE 1-continued

Sequence Table

| Sequence Identification Number | Sequence |
|---|---|
| 70 | TTTGCTAGCCACATACGCGTTTCCT AGGAAACCAGAGAAGGATCAAAGCC CCTCTCACACACCGGGGAGCGGGGA AGAGAACTGTTTTGCTTTCATTGTA GACCAGTGAAATTGGGAGGGGTTTT CCGACCGAAGTCAGAAAACCTGCTC CAAAAATTCTGCTGCTGCTGCTGCT GCTGCTGCTGCTGCTGCTGTTGCGGA AGTGCGTCTGTAGCGAGCCAGGGAA GGACATCAACTCCACTTTCGATGAG GGTGAGATCAAGGTGCCATTTCCAC ACCCCTCCACTGATATGTGAATCAC AAAGCACAGTTCCTTATTCGGTTCG ATAAACAATATTCTAAAAGACTATT AAAACCGCTCGTTTCTTGAGTTTGT GACCGCTTGTAAAGGCTATGCAAAT GAGTCAGTGCTGATTGGCTGAAAAC AGCCAATCACAGCTCCTATGTTGTT ATCTAGACCC |
| 71 | TTTGCTAGCCACATACGCGTTTCCT AGGAAACCAGAGAAGGATCAAAGCC CCTCTCACACACCGGGGAGCGGGGA AGAGAACTGTTTTGCTTTCATTGTA GACCAGTGAAATTGGGAGGGGTTTT CCGACCGAAGTCAGAAAACCTGCTC CAAAAATTGGTCCTTGTAGCCGGGA ATGCTGCTGCTGCTGCTGCTGCTGT TGCGGAAGTGCGTCTGTAGCGAGCC AGGGAAGGACATCAACTCCACTTTC GATGAGGGTGAGATCAAGGTGCCAT TTCCACACCCCTCCACTGATATGTG AATCACAAAGCACAGTTCCTTATTC GGTTCGATAAACAATATTCTAAAAG ACTATTAAAACCGCTCGTTTCTTGA GTTTGTGACCGCTTGTAAAGGCTAT GCAAATGAGTCAGTGCTGATTGGCT GAAAACAGCCAATCACAGCTCCTAT GTTGTTATCTAGACCC |
| 72 | TTTGCTAGCCACATACGCGTTTCCT AGGAAACCAGAGAAGGATCAAAGCC CCTCTCACACACCGGGGAGCGGGGA AGAGAACTGTTTTGCTTTCATTGTA GACCAGTGAAATTGGGAGGGGTTTT CCGACCGAAGTCAGAAAACCTGCTC CAAAAATTCTGCTGCTGCTGCTGCT GCTGGGGGATCACAGACCATTTCT TGCGGAAGTGCGTCTGTAGCGAGCC AGGGAAGGACATCAACTCCACTTTC GATGAGGGTGAGATCAAGGTGCCAT TTCCACACCCCTCCACTGATATGTG AATCACAAAGCACAGTTCCTTATTC GGTTCGATAAACAATATTCTAAAAG ACTATTAAAACCGCTCGTTTCTTGA GTTTGTGACCGCTTGTAAAGGCTAT GCAAATGAGTCAGTGCTGATTGGCT GAAAACAGCCAATCACAGCTCCTAT GTTGTTATCTAGACCC |

We claim:

1. A nucleic acid comprising a) a DMPK U7snRNA encoding nucleotide sequence comprising at least 81%, 82%, 83%, 84%, 85%, 86%, 87%, 88%, 89%, 90%, 91%, 92%, 93%, 94%, 95%, 96%, 97%, 98%, 99%, 100% identity to sequence of SEQ ID NO: 34; b) a DMPK U7RNA-encoding reverse complementary sequence comprising at least 81%, 82%, 83%, 84%, 85%, 86%, 87%, 88%, 89%, 90%, 91%, 92%, 93%, 94%, 95%, 96%, 97%, 98%, 99%, 100% identity to sequence of SEQ ID NO: 70; and/or c) a combination of two or more of the nucleotide sequences of (a) and/or (b).

2. A viral vector comprising the nucleic acid of claim 1.

3. The viral vector of claim 2, wherein the viral vector is an adeno-associated virus (AAV), adenovirus, lentivirus, retrovirus, poxvirus, baculovirus, herpes simplex virus, vaccinia virus, or a synthetic virus.

4. The viral vector of claim 3, wherein the viral vector is an AAV.

5. The viral vector of claim 4, wherein the AAV lacks rep and cap genes.

6. The viral vector of claim 4, wherein the AAV is a recombinant AAV (rAAV) or a self-complementary recombinant AAV (scAAV).

7. The viral vector of claim 4, wherein the AAV has a capsid serotype selected from the group consisting of: AAV-1, AAV-2, AAV-3, AAV-4, AAV-5, AAV-6, AAV-7, AAV-8, AAV-9, AAV-10, AAV-11, AAV-12, AAV-13, AAV-anc80, and AAV rh.74.

8. The viral vector of claim 4, wherein the AAV has a capsid serotype of AAV-9.

9. The viral vector of claim 4, wherein the AAV is a pseudotyped AAV.

10. The viral vector of claim 9, wherein the AAV is AAV2/8 or AAV2/9.

11. A composition comprising the viral vector of claim 4 and a pharmaceutically acceptable carrier.

12. A method of inhibiting and/or interfering with expression of a dystrophia myotonica protein kinase (DMPK) gene or interfering with the CUG triplet repeat expansion (CTG$^{exp}$) in the 3' untranslated region of the DMPK gene in a cell comprising contacting the cell with the viral vector of claim 4.

* * * * *

SEQUENCE LISTING

<160> NUMBER OF SEQ ID NOS: 72

<210> SEQ ID NO 1
<211> LENGTH: 2874
<212> TYPE: DNA
<213> ORGANISM: Artificial Sequence
<220> FEATURE:
<223> OTHER INFORMATION: Synthetic polynucleotide

<400> SEQUENCE: 1

| | | | | | |
|---|---|---|---|---|---|
| aggggggctg | gaccaagggg | tggggagaag | gggaggaggc | ctcggccggc | cgcagagaga | 60 |
| agtggccaga | gaggcccagg | ggacagccag | ggacaggcag | acatgcagcc | agggctccag | 120 |
| ggcctggaca | ggggctgcca | ggccctgtga | caggaggacc | ccgagccccc | ggcccgggga | 180 |
| ggggccatgg | tgctgcctgt | ccaacatgtc | agccgaggtg | cggctgaggc | ggctccagca | 240 |
| gctggtgttg | gacccgggct | tcctggggct | ggagcccctg | ctcgaccttc | tcctgggcgt | 300 |
| ccaccaggag | ctgggcgcct | ccgaactggc | ccaggacaag | tacgtggccg | acttcttgca | 360 |
| gtgggcggag | cccatcgtgg | tgaggcttaa | ggaggtccga | ctgcagaggg | acgacttcga | 420 |
| gattctgaag | gtgatcggac | gcggggcgtt | cagcgaggta | gcggtagtga | agatgaagca | 480 |
| gacgggccag | gtgtatgcca | tgaagatcat | gaacaagtgg | gacatgctga | gaggggcga | 540 |
| ggtgtcgtgc | ttccgtgagg | agagggacgt | gttggtgaat | gggaccggc | ggtggatcac | 600 |
| gcagctgcac | ttcgccttcc | aggatgagaa | ctacctgtac | ctggtcatgg | agtattacgt | 660 |
| gggcgggac | ctgctgacac | tgctgagcaa | gtttgggag | cggattccgg | ccgagatggc | 720 |
| gcgcttctac | ctggcggaga | ttgtcatggc | catagactcg | gtgcaccggc | ttggctacgt | 780 |
| gcacagggac | atcaaacccg | acaacatcct | gctggaccgc | tgtggccaca | tccgcctggc | 840 |
| cgacttcggc | tcttgcctca | gctgcgggc | agatggaacg | gtgcggtcgc | tggtggctgt | 900 |
| gggcacccca | gactacctgt | cccccgagat | cctgcaggct | gtgggcggtg | ggcctgggac | 960 |
| aggcagctac | gggcccgagt | gtgactggtg | ggcgctgggt | gtattcgcct | atgaaatgtt | 1020 |
| ctatgggcag | acgccttct | acgcggattc | acggcggag | acctatggca | agatcgtcca | 1080 |
| ctacaaggag | cacctctctc | tgccgctggt | ggacgaaggg | gtccctgagg | aggctcgaga | 1140 |
| cttcattcag | cggttgctgt | gtcccccgga | gacacggctg | ggccggggtg | gagcaggcga | 1200 |
| cttccggaca | catcccttct | tctttggcct | cgactgggat | ggtctccggg | acagcgtgcc | 1260 |
| ccccttaca | ccggatttcg | aaggtgccac | cgacacatgc | aacttcgact | tggtggagga | 1320 |
| cgggctcact | gccatggtga | gcggggcgg | ggagacactg | tcggacattc | gggaaggtgc | 1380 |
| gccgctaggg | gtccacctgc | cttttgtggg | ctactcctac | tcctgcatgg | ccctcaggga | 1440 |
| cagtgaggtc | ccaggcccca | cacccatgga | actggaggcc | gagcagctgc | ttgagccaca | 1500 |
| cgtgcaagcg | cccagcctgg | agccctcggt | gtccccacag | gatgaaacag | ctgaagtggc | 1560 |
| agttccagcg | gctgtccctg | cggcagaggc | tgaggccgag | gtgacgctgc | gggagctcca | 1620 |
| ggaagccctg | gaggaggagg | tgctcacccg | gcagagcctg | agccgggaga | tggaggccat | 1680 |
| ccgcacggac | aaccagaact | tcgccagtca | actacgcgag | gcagaggctc | ggaaccggga | 1740 |
| cctagaggca | cacgtccggc | agttgcagga | gcggatggag | ttgctgcagg | cagagggagc | 1800 |
| cacagctgtc | acggggtcc | ccagtccccg | ggccacggat | ccaccttccc | atctagatgg | 1860 |
| cccccggcc | gtggctgtgg | gccagtgccc | gctggtgggg | ccaggcccca | tgcaccgccg | 1920 |
| ccacctgctg | ctccctgcca | gggtccctag | gcctggccta | tcgaggcgc | tttccctgct | 1980 |
| cctgttcgcc | gttgttctgt | ctcgtgccgc | cgccctgggc | tgcattgggt | tggtggccca | 2040 |

```
cgccggccaa ctcaccgcag tctggcgccg cccaggagcc gcccgcgctc cctgaaccct    2100
agaactgtct tcgactccgg ggccccgttg aagactgag tgcccggggc acggcacaga     2160
agccgcgccc accgcctgcc agttcacaac cgctccgagc gtgggtctcc gcccagctcc    2220
agtcctgtga tccggcccg ccccctagcg gccggggagg gaggggccgg gtccgcggcc     2280
ggcgaacggg gctcgaaggg tccttgtagc cgggaatgct gctgctgctg ctgctgctgc    2340
tgctgctgct gctgctgctg ctgctgctgc tgctgctggg gggatcacag accatttctt    2400
tctttcggcc aggctgaggc cctgacgtgg atgggcaaac tgcaggcctg ggaaggcagc    2460
aagccgggcc gtccgtgttc catcctccac gcaccccac ctatcgttgg ttcgcaaagt     2520
gcaaagcttt cttgtgcatg acgccctgct ctggggagcg tctggcgcga tctctgcctg    2580
cttactcggg aaatttgctt ttgccaaacc cgcttttcg gggatcccgc gccccctcc      2640
tcacttgcgc tgctctcgga gccccagccg gctccgcccg cttcggcggt ttggatattt    2700
attgacctcg tcctccgact cgctgacagg ctacaggacc ccaacaacc ccaatccacg     2760
ttttggatgc actgagaccc cgacattcct cggtatttat tgtctgtccc cacctaggac    2820
ccccacccc gaccctcgcg aataaaaggc cctccatctg cccaaagctc tgga           2874
```

<210> SEQ ID NO 2
<211> LENGTH: 629
<212> TYPE: PRT
<213> ORGANISM: Artificial Sequence
<220> FEATURE:
<223> OTHER INFORMATION: Synthetic Polypeptide

<400> SEQUENCE: 2

Met Ser Ala Glu Val Arg Leu Arg Arg Leu Gln Gln Leu Val Leu Asp
1               5                   10                  15

Pro Gly Phe Leu Gly Leu Glu Pro Leu Leu Asp Leu Leu Leu Gly Val
            20                  25                  30

His Gln Glu Leu Gly Ala Ser Glu Leu Ala Gln Asp Lys Tyr Val Ala
        35                  40                  45

Asp Phe Leu Gln Trp Ala Glu Pro Ile Val Val Arg Leu Lys Glu Val
    50                  55                  60

Arg Leu Gln Arg Asp Asp Phe Glu Ile Leu Lys Val Ile Gly Arg Gly
65                  70                  75                  80

Ala Phe Ser Glu Val Ala Val Val Lys Met Lys Gln Thr Gly Gln Val
                85                  90                  95

Tyr Ala Met Lys Ile Met Asn Lys Trp Asp Met Leu Lys Arg Gly Glu
            100                 105                 110

Val Ser Cys Phe Arg Glu Glu Arg Asp Val Leu Val Asn Gly Asp Arg
        115                 120                 125

Arg Trp Ile Thr Gln Leu His Phe Ala Phe Gln Asp Glu Asn Tyr Leu
    130                 135                 140

Tyr Leu Val Met Glu Tyr Tyr Val Gly Gly Asp Leu Leu Thr Leu Leu
145                 150                 155                 160

Ser Lys Phe Gly Glu Arg Ile Pro Ala Glu Met Ala Arg Phe Tyr Leu
                165                 170                 175

Ala Glu Ile Val Met Ala Ile Asp Ser Val His Arg Leu Gly Tyr Val
            180                 185                 190

His Arg Asp Ile Lys Pro Asp Asn Ile Leu Leu Asp Arg Cys Gly His
        195                 200                 205

Ile Arg Leu Ala Asp Phe Gly Ser Cys Leu Lys Leu Arg Ala Asp Gly

```
            210                 215                 220
Thr Val Arg Ser Leu Val Ala Val Gly Thr Pro Asp Tyr Leu Ser Pro
225                 230                 235                 240

Glu Ile Leu Gln Ala Val Gly Gly Pro Gly Thr Gly Ser Tyr Gly
                245                 250                 255

Pro Glu Cys Asp Trp Trp Ala Leu Gly Val Phe Ala Tyr Glu Met Phe
                260                 265                 270

Tyr Gly Gln Thr Pro Phe Tyr Ala Asp Ser Thr Ala Glu Thr Tyr Gly
                275                 280                 285

Lys Ile Val His Tyr Lys Glu His Leu Ser Leu Pro Leu Val Asp Glu
                290                 295                 300

Gly Val Pro Glu Glu Ala Arg Asp Phe Ile Gln Arg Leu Leu Cys Pro
305                 310                 315                 320

Pro Glu Thr Arg Leu Gly Arg Gly Gly Ala Gly Asp Phe Arg Thr His
                325                 330                 335

Pro Phe Phe Phe Gly Leu Asp Trp Asp Gly Leu Arg Asp Ser Val Pro
                340                 345                 350

Pro Phe Thr Pro Asp Phe Glu Gly Ala Thr Asp Thr Cys Asn Phe Asp
                355                 360                 365

Leu Val Glu Asp Gly Leu Thr Ala Met Val Ser Gly Gly Glu Thr
370                 375                 380

Leu Ser Asp Ile Arg Glu Gly Ala Pro Leu Gly Val His Leu Pro Phe
385                 390                 395                 400

Val Gly Tyr Ser Tyr Ser Cys Met Ala Leu Arg Asp Ser Glu Val Pro
                405                 410                 415

Gly Pro Thr Pro Met Glu Leu Glu Ala Glu Gln Leu Leu Glu Pro His
                420                 425                 430

Val Gln Ala Pro Ser Leu Glu Pro Ser Val Ser Pro Gln Asp Glu Thr
                435                 440                 445

Ala Glu Val Ala Val Pro Ala Ala Val Pro Ala Glu Ala Glu Ala
                450                 455                 460

Glu Val Thr Leu Arg Glu Leu Gln Glu Ala Leu Glu Glu Val Leu
465                 470                 475                 480

Thr Arg Gln Ser Leu Ser Arg Glu Met Glu Ala Ile Arg Thr Asp Asn
                485                 490                 495

Gln Asn Phe Ala Ser Gln Leu Arg Glu Ala Glu Ala Arg Asn Arg Asp
                500                 505                 510

Leu Glu Ala His Val Arg Gln Leu Gln Glu Arg Met Glu Leu Leu Gln
                515                 520                 525

Ala Glu Gly Ala Thr Ala Val Thr Gly Val Pro Ser Pro Arg Ala Thr
                530                 535                 540

Asp Pro Pro Ser His Leu Asp Gly Pro Pro Ala Val Ala Val Gly Gln
545                 550                 555                 560

Cys Pro Leu Val Gly Pro Gly Pro Met His Arg Arg His Leu Leu Leu
                565                 570                 575

Pro Ala Arg Val Pro Arg Pro Gly Leu Ser Glu Ala Leu Ser Leu Leu
                580                 585                 590

Leu Phe Ala Val Val Leu Ser Arg Ala Ala Ala Leu Gly Cys Ile Gly
                595                 600                 605

Leu Val Ala His Ala Gly Gln Leu Thr Ala Val Trp Arg Arg Pro Gly
                610                 615                 620

Ala Ala Arg Ala Pro
625
```

<210> SEQ ID NO 3
<211> LENGTH: 86
<212> TYPE: DNA
<213> ORGANISM: Artificial Sequence
<220> FEATURE:
<223> OTHER INFORMATION: Synthetic polynucleotide

<400> SEQUENCE: 3
ctcgagtgag cgagcctgct tactcgggaa atttctgtaa agccacagat gggaaatttc    60
ccgagtaagc aggcacgcct actaga                                         86

<210> SEQ ID NO 4
<211> LENGTH: 85
<212> TYPE: DNA
<213> ORGANISM: Artificial Sequence
<220> FEATURE:
<223> OTHER INFORMATION: Synthetic polynucleotide

<400> SEQUENCE: 4
ctcgagtgag cgaacctgcc ttttgtgggc tactctgtaa agccacagat gggagtagcc    60
cacaaaaggc aggtgtgcct actag                                          85

<210> SEQ ID NO 5
<211> LENGTH: 85
<212> TYPE: DNA
<213> ORGANISM: Artificial Sequence
<220> FEATURE:
<223> OTHER INFORMATION: Synthetic polynucleotide

<400> SEQUENCE: 5
ctcgagtgag cgacgacttc ggctcttgcc tcaactgtaa agccacagat gggttgaggc    60
aagagccgaa gtcggtgcct actag                                          85

<210> SEQ ID NO 6
<211> LENGTH: 81
<212> TYPE: DNA
<213> ORGANISM: Artificial Sequence
<220> FEATURE:
<223> OTHER INFORMATION: Synthetic polynucleotide

<400> SEQUENCE: 6
ctcgagtgag cgaagggacg acttcgagat tctgctgtaa agccacagat gggcagaatc    60
tcgaagtcgt ccctccgcct a                                              81

<210> SEQ ID NO 7
<211> LENGTH: 6157
<212> TYPE: DNA
<213> ORGANISM: Artificial Sequence
<220> FEATURE:
<223> OTHER INFORMATION: Synthetic polynucleotide

<400> SEQUENCE: 7
acagcggucc agcaggaugu ugucggguuu gaugucccuu cuguggccag ggcacuggcu    60
caccguucca ucugcccgca gcuugaggac cguccaucu gcccgcagcu ugaggcaaga   120
gccaaugaac cucccuucug guucccacc aggcgcggcg caccuucccg aaugccgac    180 agugucccu gcgggaguag cccacaaaag gcagguggac cccuagcggc gcaaccugag   240
ggccaugcag gaguaggagu agucuccugc gcaagacaca cagaugugag cagcagucgu   300
ccagcagcag cagcagcagc agcagcagca gcagcagcag cagcagcagc agcagcagca   360

-continued

```
gcagcagcag cagcagcagc agcagcagca gcagcagcag cagcagcagc agcagcagca    420
gcagcagcau ucccggcuac aaggaccgaa auggucugug aucccccag cagcagcagc     480
agcagcagtt tgctagccac atacgcgttt cctaggaaac agagaagga tcaaagcccc     540
tctcacacac cggggagcgg ggaagagaac tgttttgctt tcattgtaga ccagtgaaat    600
tgggaggggt tttccgaccg aagtcagaaa acctgctcca aaaattaggg acatcaaacc    660
cgacaacatc ctgctggacc gctgtttgcg gaagtgcgtc tgtagcgagc cagggaagga    720
catcaactcc actttcgatg agggtgagat caaggtgcca tttccacacc cctccactga    780
tatgtgaatc acaaagcaca gttccttatt cggttcgata acaatattc taaaagacta    840
ttaaaaccgc tcgtttcttg agtttgtgac cgcttgtaaa ggctatgcaa atgagtcagt    900
gctgattggc tgaaaacagc caatcacagc tcctatgttg ttatctagac cctttgctag    960
ccacatacgc gtttcctagg aaaccagaga aggatcaaag cccctctcac acaccgggga   1020
gcggggaaga gaactgtttt gctttcattg tagaccagtg aaattgggag gggttttccg   1080
accgaagtca gaaaacctgc tccaaaaatt cctcaagctg cgggcagatg gaacggtgag   1140
ccagtgccct ggccacagat gcggaagtg cgtctgtagc gagccaggga aggacatcaa    1200
ctccactttc gatgagggtg agatcaaggt gccatttcca cccctcca ctgatatgtg      1260
aatcacaaag cacagttcct tattcggttc gataaacaat attctaaaag actattaaaa   1320
ccgctcgttt cttgagtttg tgaccgcttg taaaggctat gcaaatgagt cagtgctgat   1380
tggctgaaaa cagccaatca cagctcctat gttgttatct agacccttttg ctagccacat  1440
acgcgtttcc taggaaacca gagaaggatc aaagcccctc tcacacaccg gggagcgggg   1500
aagagaactg ttttgctttc attgtagacc agtgaaattg ggaggggttt tccgaccgaa   1560
gtcagaaaac ctgctccaaa aattggctct tgcctcaagc tgcgggcaga tggaacggtt   1620
tgcggaagtg cgtctgtagc gagccaggga aggacatcaa ctccactttc gatgagggtg   1680
agatcaaggt gccatttcca cccctcca ctgatatgtg aatcacaaag cacagttcct     1740
tattcggttc gataaacaat attctaaaag actattaaaa ccgctcgttt cttgagtttg   1800
tgaccgcttg taaaggctat gcaaatgagt cagtgctgat tggctgaaaa cagccaatca   1860
cagctcctat gttgttatct agacccttttg ctagccacat acgcgtttcc taggaaacca  1920
gagaaggatc aaagcccctc tcacacaccg gggagcgggg aagagaactg ttttgctttc   1980
attgtagacc agtgaaattg ggaggggttt tccgaccgaa gtcagaaaac ctgctccaaa   2040
aattgcctgg tgggaccaca gaagggaggt tcattttgcg gaagtgcgtc tgtagcgagc   2100
cagggaagga catcaactcc actttcgatg agggtgagat caaggtgcca tttccacacc   2160
cctccactga tatgtgaatc acaaagcaca gttccttatt cggttcgata acaatattc    2220
taaaagacta ttaaaaccgc tcgtttcttg agtttgtgac cgcttgtaaa ggctatgcaa   2280
atgagtcagt gctgattggc tgaaaacagc caatcacagc tcctatgttg ttatctagac   2340
cctttgctag ccacatacgc gtttcctagg aaaccagaga aggatcaaag cccctctcac   2400
acaccgggga gcggggaaga gaactgtttt gctttcattg tagaccagtg aaattgggag   2460
gggttttccg accgaagtca gaaaacctgc tccaaaaatt cgcaggagac actgtcggac   2520
attcgggaag gtgcgccgct tgcggaagtg cgtctgtagc gagccaggga aggacatcaa   2580
ctccactttc gatgagggtg agatcaaggt gccatttcca cccctcca ctgatatgtg     2640
aatcacaaag cacagttcct tattcggttc gataaacaat attctaaaag actattaaaa   2700
ccgctcgttt cttgagtttg tgaccgcttg taaaggctat gcaaatgagt cagtgctgat   2760
```

```
tggctgaaaa cagccaatca cagctcctat gttgttatct agacccttg ctagccacat    2820 acgcgtttcc taggaaacca gagaaggatc aaagcccctc tcacacaccg gggagcgggg    2880
aagagaactg ttttgctttc attgtagacc agtgaaattg ggaggggttt tccgaccgaa    2940
gtcagaaaac ctgctccaaa aatttgcgcc gctaggggtc cacctgcctt tgtgggcta     3000 ctccttgcgg aagtgcgtct gtagcgagcc agggaaggac atcaactcca ctttcgatga    3060
gggtgagatc aaggtgccat ttccacaccc ctccactgat atgtgaatca caaagcacag    3120
ttccttattc ggttcgataa acaatattct aaaagactat taaaaccgct cgtttcttga    3180
gtttgtgacc gcttgtaaag gctatgcaaa tgagtcagtg ctgattggct gaaaacagcc    3240
aatcacagct cctatgttgt tatctagacc ctttgctagc cacatacgcg tttcctagga    3300
aaccagagaa ggatcaaagc ccctctcaca caccggggag cggggaagag aactgttttg    3360 cttcattgt agaccagtga attgggagg ggttttccga ccgaagtcag aaaacctgct      3420
ccaaaaattc tactcctact cctgcatggc cctcaggttt gcggaagtgc gtctgtagcg    3480
agccagggaa ggacatcaac tccactttcg atgagggtga gatcaaggtg ccatttccac    3540 accctccac tgatatgtga atcacaaagc acagttcctt attcggttcg ataaacaata    3600
ttctaaaaga ctattaaaac cgctcgtttc ttgagtttgt gaccgcttgt aaaggctatg    3660
caaatgagtc agtgctgatt ggctgaaaac agccaatcac agctcctatg ttgttatcta    3720 gacccttgc tagccacata cgcgttcct aggaaaccag agaaggatca agcccctct       3780 cacacaccgg ggagcgggga agagaactgt tttgctttca ttgtagacca gtgaaattgg    3840
gaggggtttt ccgaccgaag tcagaaaacc tgctccaaaa attgacgact gctgctcaca    3900
tctgtgtgtc ttgcgcagga gattgcggaa gtgcgtctgt agcgagccag ggaaggacat    3960
caactccact ttcgatgagg gtgagatcaa ggtgccattt ccacacccct ccactgatat    4020
gtgaatcaca agcacagtt ccttattcgg ttcgataaac aatattctaa aagactatta    4080
aaaccgctcg tttcttgagt ttgtgaccgc ttgtaaaggc tatgcaaatg agtcagtgct    4140
gattggctga aaacagccaa tcacagctcc tatgttgtta tctagaccct tgctagcca    4200 catacgcgtt tcctaggaaa ccagagaagg atcaaagccc ctctcacaca ccggggagcg    4260
gggaagagaa ctgttttgct ttcattgtag accagtgaaa ttgggagggg ttttccgacc    4320
gaagtcagaa aacctgctcc aaaaattctg ctgctgctgc tgctgctgct gctgctgctg    4380
ctgctgctgc tgttgcggaa gtgcgtctgt agcgagccag ggaaggacat caactccact    4440
ttcgatgagg gtgagatcaa ggtgccattt ccacacccct ccactgatat gtgaatcaca    4500 agcacagtt ccttattcgg ttcgataaac aatattctaa aagactatta aaaccgctcg    4560
tttcttgagt ttgtgaccgc ttgtaaaggc tatgcaaatg agtcagtgct gattggctga    4620
aaacagccaa tcacagctcc tatgttgtta tctagaccct tgctagcca catacgcgtt     4680 tcctaggaaa ccagagaagg atcaaagccc ctctcacaca ccggggagcg gggaagagaa    4740
ctgttttgct ttcattgtag accagtgaaa ttgggagggg ttttccgacc gaagtcagaa    4800
aacctgctcc aaaaattctg ctgctgctgc tgctgctgct gctgctgctg ctgctgctgc    4860
tgctgctgct gctgctgttg cggaagtgcg tctgtagcga gccagggaag gacatcaact    4920
ccactttcga tgagggtgag atcaaggtgc catttccaca cccctccact gatatgtgaa    4980
tcacaaagca cagttcctta ttcggttcga taaacaatat tctaaaagac tattaaaacc    5040
gctcgtttct tgagtttgtg accgcttgta aaggctatgc aaatgagtca gtgctgattg    5100
```

```
gctgaaaaca gccaatcaca gctcctatgt tgttatctag acccctttgct agccacatac    5160 gcgtttccta ggaaaccaga gaaggatcaa agcccctctc acacaccggg gagcggggaa    5220
gagaactgtt ttgctttcat tgtagaccag tgaaattggg aggggttttc cgaccgaagt    5280
cagaaaacct gctccaaaaa ttggtccttg tagccgggaa tgctgctgct gctgctgctg    5340
ctgttgcgga agtgcgtctg tagcgagcca gggaaggaca tcaactccac tttcgatgag    5400
ggtgagatca aggtgccatt tccacacccc tccactgata tgtgaatcac aaagcacagt    5460
tccttattcg gttcgataaa caatattcta aaagactatt aaaaccgctc gtttcttgag    5520
tttgtgaccg cttgtaaagg ctatgcaaat gagtcagtgc tgattggctg aaaacagcca    5580
atcacagctc ctatgttgtt atctagaccc tttgctagcc acatacgcgt tcctaggaa     5640 accagagaag gatcaaagcc cctctcacac accggggagc ggggaagaga actgttttgc    5700
tttcattgta gaccagtgaa attgggaggg gttttccgac cgaagtcaga aaacctgctc    5760 caaaattct gctgctgctg ctgctgctgg ggggatcaca gaccatttct tgcggaagtg     5820
cgtctgtagc gagccaggga aggacatcaa ctccactttc gatgagggtg agatcaaggt    5880
gccatttcca caccctcca ctgatatgtg aatcacaaag cacagttcct tattcggttc     5940
gataaacaat attctaaaag actattaaaa ccgctcgttt cttgagtttg tgaccgcttg    6000
taaaggctat gcaaatgagt cagtgctgat tggctgaaaa cagccaatca cagctcctat    6060
gttgttatct agacccctcg agtgagcgat tcggcggttt ggatatttat ctgtaaagcc    6120
acagatggga taaatatcca aaccgccgaa gcgccta                              6157

<210> SEQ ID NO 8
<211> LENGTH: 39
<212> TYPE: DNA
<213> ORGANISM: Artificial Sequence
<220> FEATURE:
<223> OTHER INFORMATION: Synthetic polynucleotide

<400> SEQUENCE: 8
acagcggtcc agcaggatgt tgtcgggttt gatgtccct                             39

<210> SEQ ID NO 9
<211> LENGTH: 49
<212> TYPE: DNA
<213> ORGANISM: Artificial Sequence
<220> FEATURE:
<223> OTHER INFORMATION: Synthetic polynucleotide

<400> SEQUENCE: 9
tctgtggcca gggcactggc tcaccgttcc atctgcccgc agcttgagg                  49

<210> SEQ ID NO 10
<211> LENGTH: 35
<212> TYPE: DNA
<213> ORGANISM: Artificial Sequence
<220> FEATURE:
<223> OTHER INFORMATION: Synthetic polynucleotide

<400> SEQUENCE: 10
accgttccat ctgcccgcag cttgaggcaa gagcc                                 35

<210> SEQ ID NO 11
<211> LENGTH: 31
<212> TYPE: DNA
<213> ORGANISM: Artificial Sequence
<220> FEATURE:
<223> OTHER INFORMATION: Synthetic polynucleotide
```

<400> SEQUENCE: 11
aatgaacctc ccttctgtgg tcccaccagg c                            31

<210> SEQ ID NO 12
<211> LENGTH: 39
<212> TYPE: DNA
<213> ORGANISM: Artificial Sequence
<220> FEATURE:
<223> OTHER INFORMATION: Synthetic polynucleotide

<400> SEQUENCE: 12
gcggcgcacc ttcccgaatg tccgacagtg tctcctgcg                    39

<210> SEQ ID NO 13
<211> LENGTH: 40
<212> TYPE: DNA
<213> ORGANISM: Artificial Sequence
<220> FEATURE:
<223> OTHER INFORMATION: Synthetic polynucleotide

<400> SEQUENCE: 13
ggagtagccc acaaaaggca ggtggacccc tagcggcgca                   40

<210> SEQ ID NO 14
<211> LENGTH: 29
<212> TYPE: DNA
<213> ORGANISM: Artificial Sequence
<220> FEATURE:
<223> OTHER INFORMATION: Synthetic polynucleotide

<400> SEQUENCE: 14
acctgagggc catgcaggag taggagtag                               29

<210> SEQ ID NO 15
<211> LENGTH: 39
<212> TYPE: DNA
<213> ORGANISM: Artificial Sequence
<220> FEATURE:
<223> OTHER INFORMATION: Synthetic polynucleotide

<400> SEQUENCE: 15
tctcctgcgc aagacacaca gatgtgagca gcagtcgtc                    39

<210> SEQ ID NO 16
<211> LENGTH: 45
<212> TYPE: DNA
<213> ORGANISM: Artificial Sequence
<220> FEATURE:
<223> OTHER INFORMATION: Synthetic polynucleotide

<400> SEQUENCE: 16
cagcagcagc agcagcagca gcagcagcag cagcagcagc agcag             45

<210> SEQ ID NO 17
<211> LENGTH: 60
<212> TYPE: DNA
<213> ORGANISM: Artificial Sequence
<220> FEATURE:
<223> OTHER INFORMATION: Synthetic polynucleotide

<400> SEQUENCE: 17
cagcagcagc agcagcagca gcagcagcag cagcagcagc agcagcagca gcagcagcag    60

<210> SEQ ID NO 18

<211> LENGTH: 41
<212> TYPE: DNA
<213> ORGANISM: Artificial Sequence
<220> FEATURE:
<223> OTHER INFORMATION: Synthetic polynucleotide

<400> SEQUENCE: 18
cagcagcagc agcagcagca gcattcccgg ctacaaggac c                            41

<210> SEQ ID NO 19
<211> LENGTH: 41
<212> TYPE: DNA
<213> ORGANISM: Artificial Sequence
<220> FEATURE:
<223> OTHER INFORMATION: Synthetic polynucleotide

<400> SEQUENCE: 19
gaaatggtct gtgatccccc cagcagcagc agcagcagca g                            41

<210> SEQ ID NO 20
<211> LENGTH: 477
<212> TYPE: DNA
<213> ORGANISM: Artificial Sequence
<220> FEATURE:
<223> OTHER INFORMATION: Synthetic polynucleotide

<400> SEQUENCE: 20
gacgccgcca tctctaggcc cgcgccggcc ccctcgcaca gacttgtggg agaagctcgg         60
ctactcccct gccccggtta atttgcatat aatatttcct agtaactata gaggcttaat        120
gtgcgataaa agacagataa tctgttcttt ttaatactag ctacatttta catgataggc        180
ttggatttct ataagagata caaatactaa attattattt taaaaaacag cacaaaagga        240
aactcaccct aactgtaaag taattgtgtg ttttgagact ataaatatcc cttggagaaa        300
agccttgttt gcgtttagtg aaccgtcaga tggtaccgtt taaactcgag tgagcgagcc        360
tgcttactcg ggaaatttct gtaaagccac agatgggaaa tttcccgagt aagcaggcac        420
gcctactaga gcggccgcca cagcggggag atccagacat gataagatac attttttt        477

<210> SEQ ID NO 21
<211> LENGTH: 481
<212> TYPE: DNA
<213> ORGANISM: Artificial Sequence
<220> FEATURE:
<223> OTHER INFORMATION: Synthetic polynucleotide

<400> SEQUENCE: 21
gacgccgcca tctctaggcc cgcgccggcc ccctcgcaca gacttgtggg agaagctcgg         60
ctactcccct gccccggtta atttgcatat aatatttcct agtaactata gaggcttaat        120
gtgcgataaa agacagataa tctgttcttt ttaatactag ctacatttta catgataggc        180
ttggatttct ataagagata caaatactaa attattattt taaaaaacag cacaaaagga        240
aactcaccct aactgtaaag taattgtgtg ttttgagact ataaatatcc cttggagaaa        300
agccttgttt gcgtttagtg aaccgtcaga tggtaccgtt taaactcgag tgagcgaacc        360
tgccttttgt gggctactct gtaaagccac agatgggagt agcccacaaa aggcaggtgt        420
gcctactagc tagagcggcc gccacagcgg ggagatccag acatgataag atacattttt        480
t                                                                       481

<210> SEQ ID NO 22
<211> LENGTH: 481

```
<212> TYPE: DNA
<213> ORGANISM: Artificial Sequence
<220> FEATURE:
<223> OTHER INFORMATION: Synthetic polynucleotide

<400> SEQUENCE: 22
gacgccgcca tctctaggcc cgcgccggcc ccctcgcaca gacttgtggg agaagctcgg    60
ctactcccct gccccggtta atttgcatat aatatttcct agtaactata gaggcttaat   120
gtgcgataaa agacagataa tctgttcttt ttaatactag ctacatttta catgataggc   180
ttggatttct ataagagata caaatactaa attattattt taaaaaacag cacaaaagga   240
aactcaccct aactgtaaag taattgtgtg ttttgagact ataaatatcc cttggagaaa   300
agccttgttt gcgtttagtg aaccgtcaga tggtaccgtt taaactcgag tgagcgacga   360
cttcggctct tgcctcaact gtaaagccac agatggggttg aggcaagagc cgaagtcggt   420
gcctactagc tagagcggcc gccacagcgg ggagatccag acatgataag atacattttt   480
t                                                                  481

<210> SEQ ID NO 23
<211> LENGTH: 478
<212> TYPE: DNA
<213> ORGANISM: Artificial Sequence
<220> FEATURE:
<223> OTHER INFORMATION: Synthetic polynucleotide

<400> SEQUENCE: 23
gacgccgcca tctctaggcc cgcgccggcc ccctcgcaca gacttgtggg agaagctcgg    60
ctactcccct gccccggtta atttgcatat aatatttcct agtaactata gaggcttaat   120
gtgcgataaa agacagataa tctgttcttt ttaatactag ctacatttta catgataggc   180
ttggatttct ataagagata caaatactaa attattattt taaaaaacag cacaaaagga   240
aactcaccct aactgtaaag taattgtgtg ttttgagact ataaatatcc cttggagaaa   300
agccttgttt gcgtttagtg aaccgtcaga tggtaccgtt taaacctcga gtgagcgaag   360
ggacgacttc gagattctgc tgtaaagcca cagatgggca gaatctcgaa gtcgtccctc   420
cgcctactag agcggccgcc acagcgggga gatccagaca tgataagata cattttt     478

<210> SEQ ID NO 24
<211> LENGTH: 478
<212> TYPE: DNA
<213> ORGANISM: Artificial Sequence
<220> FEATURE:
<223> OTHER INFORMATION: Synthetic polynucleotide

<400> SEQUENCE: 24
gacgccgcca tctctaggcc cgcgccggcc ccctcgcaca gacttgtggg agaagctcgg    60
ctactcccct gccccggtta atttgcatat aatatttcct agtaactata gaggcttaat   120
gtgcgataaa agacagataa tctgttcttt ttaatactag ctacatttta catgataggc   180
ttggatttct ataagagata caaatactaa attattattt taaaaaacag cacaaaagga   240
aactcaccct aactgtaaag taattgtgtg ttttgagact ataaatatcc cttggagaaa   300
agccttgttt gcgtttagtg aaccgtcaga tggtaccgtt taaacctcga gtgagcgatt   360
cggcggtttg gatatttatc tgtaaagcca cagatgggat aaatatccaa accgccgaag   420
cgcctactag agcggccgcc acagcgggga gatccagaca tgataagata cattttt     478

<210> SEQ ID NO 25
```

-continued

```
<211> LENGTH: 464
<212> TYPE: DNA
<213> ORGANISM: Artificial Sequence
<220> FEATURE:
<223> OTHER INFORMATION: Synthetic polynucleotide

<400> SEQUENCE: 25
gggtctagat aacaacatag gagctgtgat tggctgtttt cagccaatca gcactgactc    60
atttgcatag cctttacaag cggtcacaaa ctcaagaaac gagcggtttt aatagtcttt   120
tagaatattg tttatcgaac cgaataagga actgtgcttt gtgattcaca tatcagtgga   180
ggggtgtgga aatggcacct tgatctcacc ctcatcgaaa gtggagttga tgtccttccc   240
tggctcgcta cagacgcact tccgcaaaca gcggtccagc aggatgttgt cgggtttgat   300
gtccctaatt tttggagcag gttttctgac ttcggtcgga aaacccctcc caatttcact   360
ggtctacaat gaaagcaaaa cagttctctt ccccgctccc cggtgtgtga gaggggcttt   420
gatccttctc tggtttccta ggaaacgcgt atgtggctag caaa                   464

<210> SEQ ID NO 26
<211> LENGTH: 474
<212> TYPE: DNA
<213> ORGANISM: Artificial Sequence
<220> FEATURE:
<223> OTHER INFORMATION: Synthetic polynucleotide

<400> SEQUENCE: 26
gggtctagat aacaacatag gagctgtgat tggctgtttt cagccaatca gcactgactc    60
atttgcatag cctttacaag cggtcacaaa ctcaagaaac gagcggtttt aatagtcttt   120
tagaatattg tttatcgaac cgaataagga actgtgcttt gtgattcaca tatcagtgga   180
ggggtgtgga aatggcacct tgatctcacc ctcatcgaaa gtggagttga tgtccttccc   240
tggctcgcta cagacgcact tccgcaatct gtggccaggg cactggctca ccgttccatc   300
tgcccgcagc ttgaggaatt tttggagcag gttttctgac ttcggtcgga aaacccctcc   360
caatttcact ggtctacaat gaaagcaaaa cagttctctt ccccgctccc cggtgtgtga   420
gaggggcttt gatccttctc tggtttccta ggaaacgcgt atgtggctag caaa         474

<210> SEQ ID NO 27
<211> LENGTH: 460
<212> TYPE: DNA
<213> ORGANISM: Artificial Sequence
<220> FEATURE:
<223> OTHER INFORMATION: Synthetic polynucleotide

<400> SEQUENCE: 27
gggtctagat aacaacatag gagctgtgat tggctgtttt cagccaatca gcactgactc    60
atttgcatag cctttacaag cggtcacaaa ctcaagaaac gagcggtttt aatagtcttt   120
tagaatattg tttatcgaac cgaataagga actgtgcttt gtgattcaca tatcagtgga   180
ggggtgtgga aatggcacct tgatctcacc ctcatcgaaa gtggagttga tgtccttccc   240
tggctcgcta cagacgcact tccgcaaacc gttccatctg cccgcagctt gaggcaagag   300 ccaattttg gagcaggttt tctgacttcg gtcggaaaac cctcccaat ttcactggtc    360 tacaatgaaa gcaaaacagt tctcttcccc gctccccggt gtgtgagagg ggctttgatc   420
cttctctggt ttcctaggaa acgcgtatgt ggctagcaaa                         460

<210> SEQ ID NO 28
<211> LENGTH: 456
```

<212> TYPE: DNA
<213> ORGANISM: Artificial Sequence
<220> FEATURE:
<223> OTHER INFORMATION: Synthetic polynucleotide

<400> SEQUENCE: 28

```
gggtctagat aacaacatag gagctgtgat tggctgtttt cagccaatca gcactgactc      60
atttgcatag cctttacaag cggtcacaaa ctcaagaaac gagcggtttt aatagtcttt     120
tagaatattg tttatcgaac cgaataagga actgtgcttt gtgattcaca tatcagtgga     180
ggggtgtgga aatggcacct tgatctcacc ctcatcgaaa gtggagttga tgtccttccc     240
tggctcgcta cagacgcact tccgcaaaat gaacctccct tctgtggtcc caccaggcaa     300
tttttggagc aggttttctg acttcggtcg gaaaacccct cccaatttca ctggtctaca     360
atgaaagcaa aacagttctc ttccccgctc cccggtgtgt gagaggggct ttgatccttc     420
tctggtttcc taggaaacgc gtatgtggct agcaaa                               456
```

<210> SEQ ID NO 29
<211> LENGTH: 464
<212> TYPE: DNA
<213> ORGANISM: Artificial Sequence
<220> FEATURE:
<223> OTHER INFORMATION: Synthetic polynucleotide

<400> SEQUENCE: 29

```
gggtctagat aacaacatag gagctgtgat tggctgtttt cagccaatca gcactgactc      60
atttgcatag cctttacaag cggtcacaaa ctcaagaaac gagcggtttt aatagtcttt     120
tagaatattg tttatcgaac cgaataagga actgtgcttt gtgattcaca tatcagtgga     180
ggggtgtgga aatggcacct tgatctcacc ctcatcgaaa gtggagttga tgtccttccc     240
tggctcgcta cagacgcact tccgcaagcg gcgcaccttc ccgaatgtcc gacagtgtct     300
cctgcgaatt ttttggagcag gttttctgac ttcggtcgga aaaccctcc caatttcact     360
ggtctacaat gaaagcaaaa cagttctctt ccccgctccc cggtgtgtga gaggggcttt     420
gatccttctc tggtttccta ggaaacgcgt atgtggctag caaa                     464
```

<210> SEQ ID NO 30
<211> LENGTH: 465
<212> TYPE: DNA
<213> ORGANISM: Artificial Sequence
<220> FEATURE:
<223> OTHER INFORMATION: Synthetic polynucleotide

<400> SEQUENCE: 30

```
gggtctagat aacaacatag gagctgtgat tggctgtttt cagccaatca gcactgactc      60
atttgcatag cctttacaag cggtcacaaa ctcaagaaac gagcggtttt aatagtcttt     120
tagaatattg tttatcgaac cgaataagga actgtgcttt gtgattcaca tatcagtgga     180
ggggtgtgga aatggcacct tgatctcacc ctcatcgaaa gtggagttga tgtccttccc     240
tggctcgcta cagacgcact tccgcaagga gtagcccaca aaaggcaggt ggaccctag     300
cggcgcaaat ttttggagca ggttttctga cttcggtcgg aaaacccctc ccaatttcac     360
tggtctacaa tgaaagcaaa acagttctct tccccgctcc ccggtgtgtg agaggggctt     420
tgatccttct ctggtttcct aggaaacgcg tatgtggcta gcaaa                    465
```

<210> SEQ ID NO 31
<211> LENGTH: 454
<212> TYPE: DNA

<213> ORGANISM: Artificial Sequence
<220> FEATURE:
<223> OTHER INFORMATION: Synthetic polynucleotide

<400> SEQUENCE: 31

| | |
|---|---|
| gggtctagat aacaacatag gagctgtgat tggctgtttt cagccaatca gcactgactc | 60 |
| atttgcatag cctttacaag cggtcacaaa ctcaagaaac gagcggtttt aatagtcttt | 120 |
| tagaatattg tttatcgaac cgataaggga actgtgcttt gtgattcaca tatcagtgga | 180 |
| ggggtgtgga aatggcacct tgatctcacc ctcatcgaaa gtggagttga tgtccttccc | 240 |
| tggctcgcta cagacgcact tccgcaaacc tgagggccat gcaggagtag gagtagaatt | 300 |
| tttggagcag gttttctgac ttcggtcgga aaacccctcc caatttcact ggtctacaat | 360 |
| gaaagcaaaa cagttctctt ccccgctccc cggtgtgtga gaggggcttt gatccttctc | 420 |
| tggtttccta ggaaacgcgt atgtggctag caaa | 454 |

<210> SEQ ID NO 32
<211> LENGTH: 464
<212> TYPE: DNA
<213> ORGANISM: Artificial Sequence
<220> FEATURE:
<223> OTHER INFORMATION: Synthetic polynucleotide

<400> SEQUENCE: 32

| | |
|---|---|
| gggtctagat aacaacatag gagctgtgat tggctgtttt cagccaatca gcactgactc | 60 |
| atttgcatag cctttacaag cggtcacaaa ctcaagaaac gagcggtttt aatagtcttt | 120 |
| tagaatattg tttatcgaac cgataaggga actgtgcttt gtgattcaca tatcagtgga | 180 |
| ggggtgtgga aatggcacct tgatctcacc ctcatcgaaa gtggagttga tgtccttccc | 240 |
| tggctcgcta cagacgcact tccgcaatct cctgcgcaag acacacagat gtgagcagca | 300 |
| gtcgtcaatt tttggagcag gttttctgac ttcggtcgga aaacccctcc caatttcact | 360 |
| ggtctacaat gaaagcaaaa cagttctctt ccccgctccc cggtgtgtga gaggggcttt | 420 |
| gatccttctc tggtttccta ggaaacgcgt atgtggctag caaa | 464 |

<210> SEQ ID NO 33
<211> LENGTH: 470
<212> TYPE: DNA
<213> ORGANISM: Artificial Sequence
<220> FEATURE:
<223> OTHER INFORMATION: Synthetic polynucleotide

<400> SEQUENCE: 33

| | |
|---|---|
| gggtctagat aacaacatag gagctgtgat tggctgtttt cagccaatca gcactgactc | 60 |
| atttgcatag cctttacaag cggtcacaaa ctcaagaaac gagcggtttt aatagtcttt | 120 |
| tagaatattg tttatcgaac cgataaggga actgtgcttt gtgattcaca tatcagtgga | 180 |
| ggggtgtgga aatggcacct tgatctcacc ctcatcgaaa gtggagttga tgtccttccc | 240 |
| tggctcgcta cagacgcact tccgcaacag cagcagcagc agcagcagca gcagcagcag | 300 |
| cagcagcagc agaattttg gagcaggttt tctgacttcg gtcggaaaac cctcccaat | 360 |
| ttcactggtc tacaatgaaa gcaaaacagt tctcttcccc gctccccggt gtgtgagagg | 420 |
| ggctttgatc cttctctggt ttcctaggaa acgcgtatgt ggctagcaaa | 470 |

<210> SEQ ID NO 34
<211> LENGTH: 485
<212> TYPE: DNA
<213> ORGANISM: Artificial Sequence
<220> FEATURE:
<223> OTHER INFORMATION: Synthetic polynucleotide

<400> SEQUENCE: 34
gggtctagat aacaacatag gagctgtgat tggctgtttt cagccaatca gcactgactc    60
atttgcatag cctttacaag cggtcacaaa ctcaagaaac gagcggtttt aatagtcttt   120
tagaatattg tttatcgaac cgaataagga actgtgcttt gtgattcaca tatcagtgga   180
ggggtgtgga aatggcacct tgatctcacc ctcatcgaaa gtggagttga tgtccttccc   240
tggctcgcta cagacgcact tccgcaacag cagcagcagc agcagcagca gcagcagcag   300
cagcagcagc agcagcagca gcagcagaat ttttggagca ggttttctga cttcggtcgg   360
aaaacccctc ccaatttcac tggtctacaa tgaaagcaaa acagttctct tccccgctcc   420
ccggtgtgtg agaggggctt tgatccttct ctggtttcct aggaaacgcg tatgtggcta   480
gcaaa                                                                485

<210> SEQ ID NO 35
<211> LENGTH: 466
<212> TYPE: DNA
<213> ORGANISM: Artificial Sequence
<220> FEATURE:
<223> OTHER INFORMATION: Synthetic polynucleotide

<400> SEQUENCE: 35
gggtctagat aacaacatag gagctgtgat tggctgtttt cagccaatca gcactgactc    60
atttgcatag cctttacaag cggtcacaaa ctcaagaaac gagcggtttt aatagtcttt   120
tagaatattg tttatcgaac cgaataagga actgtgcttt gtgattcaca tatcagtgga   180
ggggtgtgga aatggcacct tgatctcacc ctcatcgaaa gtggagttga tgtccttccc   240
tggctcgcta cagacgcact tccgcaacag cagcagcagc agcagcagca ttcccggcta   300
caaggaccaa ttttggagc aggttttctg acttcggtcg gaaaacccct cccaatttca   360
ctggtctaca atgaaagcaa aacagttctc ttccccgctc cccggtgtgt gagaggggct   420 tgatccttc tctggtttcc taggaaacgc gtatgtggct agcaaa                   466

<210> SEQ ID NO 36
<211> LENGTH: 466
<212> TYPE: DNA
<213> ORGANISM: Artificial Sequence
<220> FEATURE:
<223> OTHER INFORMATION: Synthetic polynucleotide

<400> SEQUENCE: 36
gggtctagat aacaacatag gagctgtgat tggctgtttt cagccaatca gcactgactc    60
atttgcatag cctttacaag cggtcacaaa ctcaagaaac gagcggtttt aatagtcttt   120
tagaatattg tttatcgaac cgaataagga actgtgcttt gtgattcaca tatcagtgga   180
ggggtgtgga aatggcacct tgatctcacc ctcatcgaaa gtggagttga tgtccttccc   240
tggctcgcta cagacgcact tccgcaagaa atggtctgtg atcccccag cagcagcagc    300 agcagcagaa ttttggagc aggttttctg acttcggtcg gaaaacccct cccaatttca   360
ctggtctaca atgaaagcaa aacagttctc ttccccgctc cccggtgtgt gagaggggct   420 tgatccttc tctggtttcc taggaaacgc gtatgtggct agcaaa                   466

<210> SEQ ID NO 37
<211> LENGTH: 39
<212> TYPE: DNA

```
<213> ORGANISM: Artificial Sequence
<220> FEATURE:
<223> OTHER INFORMATION: Synthetic polynucleotide

<400> SEQUENCE: 37
agggacatca aacccgacaa catcctgctg gaccgctgt                                  39

<210> SEQ ID NO 38
<211> LENGTH: 49
<212> TYPE: DNA
<213> ORGANISM: Artificial Sequence
<220> FEATURE:
<223> OTHER INFORMATION: Synthetic polynucleotide

<400> SEQUENCE: 38
cctcaagctg cgggcagatg gaacggtgag ccagtgccct ggccacaga                       49

<210> SEQ ID NO 39
<211> LENGTH: 35
<212> TYPE: DNA
<213> ORGANISM: Artificial Sequence
<220> FEATURE:
<223> OTHER INFORMATION: Synthetic polynucleotide

<400> SEQUENCE: 39
ggctcttgcc tcaagctgcg ggcagatgga acggt                                      35

<210> SEQ ID NO 40
<211> LENGTH: 31
<212> TYPE: DNA
<213> ORGANISM: Artificial Sequence
<220> FEATURE:
<223> OTHER INFORMATION: Synthetic polynucleotide

<400> SEQUENCE: 40
gcctggtggg accacagaag ggaggttcat t                                          31

<210> SEQ ID NO 41
<211> LENGTH: 39
<212> TYPE: DNA
<213> ORGANISM: Artificial Sequence
<220> FEATURE:
<223> OTHER INFORMATION: Synthetic polynucleotide

<400> SEQUENCE: 41
cgcaggagac actgtcggac attcgggaag gtgcgccgc                                  39

<210> SEQ ID NO 42
<211> LENGTH: 40
<212> TYPE: DNA
<213> ORGANISM: Artificial Sequence
<220> FEATURE:
<223> OTHER INFORMATION: Synthetic polynucleotide

<400> SEQUENCE: 42
tgcgccgcta ggggtccacc tgccttttgt gggctactcc                                 40

<210> SEQ ID NO 43
<211> LENGTH: 29
<212> TYPE: DNA
<213> ORGANISM: Artificial Sequence
<220> FEATURE:
<223> OTHER INFORMATION: Synthetic polynucleotide

<400> SEQUENCE: 43
ctactcctac tcctgcatgg ccctcaggt                                             29
```

<210> SEQ ID NO 44
<211> LENGTH: 39
<212> TYPE: DNA
<213> ORGANISM: Artificial Sequence
<220> FEATURE:
<223> OTHER INFORMATION: Synthetic polynucleotide

<400> SEQUENCE: 44
gacgactgct gctcacatct gtgtgtcttg cgcaggaga                              39

<210> SEQ ID NO 45
<211> LENGTH: 45
<212> TYPE: DNA
<213> ORGANISM: Artificial Sequence
<220> FEATURE:
<223> OTHER INFORMATION: Synthetic polynucleotide

<400> SEQUENCE: 45
ctgctgctgc tgctgctgct gctgctgctg ctgctgctgc tgctg                      45

<210> SEQ ID NO 46
<211> LENGTH: 60
<212> TYPE: DNA
<213> ORGANISM: Artificial Sequence
<220> FEATURE:
<223> OTHER INFORMATION: Synthetic polynucleotide

<400> SEQUENCE: 46
ctgctgctgc tgctgctgct gctgctgctg ctgctgctgc tgctgctgct gctgctgctg      60

<210> SEQ ID NO 47
<211> LENGTH: 41
<212> TYPE: DNA
<213> ORGANISM: Artificial Sequence
<220> FEATURE:
<223> OTHER INFORMATION: Synthetic polynucleotide

<400> SEQUENCE: 47
ggtccttgta gccgggaatg ctgctgctgc tgctgctgct g                          41

<210> SEQ ID NO 48
<211> LENGTH: 41
<212> TYPE: DNA
<213> ORGANISM: Artificial Sequence
<220> FEATURE:
<223> OTHER INFORMATION: Synthetic polynucleotide

<400> SEQUENCE: 48
ctgctgctgc tgctgctgct gggggggatca cagaccattt c                         41

<210> SEQ ID NO 49
<211> LENGTH: 39
<212> TYPE: DNA
<213> ORGANISM: Artificial Sequence
<220> FEATURE:
<223> OTHER INFORMATION: Synthetic polynucleotide

<400> SEQUENCE: 49
acagcggucc agcaggaugu ugucggguuu gaugucccu                             39

<210> SEQ ID NO 50
<211> LENGTH: 49
<212> TYPE: DNA
<213> ORGANISM: Artificial Sequence
<220> FEATURE:

<223> OTHER INFORMATION: Synthetic polynucleotide

<400> SEQUENCE: 50
ucuguggcca gggcacuggc ucaccguucc aucugcccgc agcuugagg           49

<210> SEQ ID NO 51
<211> LENGTH: 35
<212> TYPE: DNA
<213> ORGANISM: Artificial Sequence
<220> FEATURE:
<223> OTHER INFORMATION: Synthetic polynucleotide

<400> SEQUENCE: 51
accguuccau cugcccgcag cuugaggcaa gagcc                         35

<210> SEQ ID NO 52
<211> LENGTH: 31
<212> TYPE: DNA
<213> ORGANISM: Artificial Sequence
<220> FEATURE:
<223> OTHER INFORMATION: Synthetic polynucleotide

<400> SEQUENCE: 52
aaugaaccuc ccuucugugg ucccaccagg c                             31

<210> SEQ ID NO 53
<211> LENGTH: 39
<212> TYPE: DNA
<213> ORGANISM: Artificial Sequence
<220> FEATURE:
<223> OTHER INFORMATION: Synthetic polynucleotide

<400> SEQUENCE: 53
gcggcgcacc uucccgaaug uccgacagug ucuccugcg                     39

<210> SEQ ID NO 54
<211> LENGTH: 40
<212> TYPE: DNA
<213> ORGANISM: Artificial Sequence
<220> FEATURE:
<223> OTHER INFORMATION: Synthetic polynucleotide

<400> SEQUENCE: 54
ggaguagccc acaaaaggca gguggacccc uagcggcgca                    40

<210> SEQ ID NO 55
<211> LENGTH: 29
<212> TYPE: DNA
<213> ORGANISM: Artificial Sequence
<220> FEATURE:
<223> OTHER INFORMATION: Synthetic polynucleotide

<400> SEQUENCE: 55
accugagggc caugcaggag uaggaguag                                29

<210> SEQ ID NO 56
<211> LENGTH: 39
<212> TYPE: DNA
<213> ORGANISM: Artificial Sequence
<220> FEATURE:
<223> OTHER INFORMATION: Synthetic polynucleotide

<400> SEQUENCE: 56
ucuccugcgc aagacacaca gaugugagca gcagucguc                     39

<210> SEQ ID NO 57
<211> LENGTH: 45
<212> TYPE: DNA
<213> ORGANISM: Artificial Sequence
<220> FEATURE:
<223> OTHER INFORMATION: Synthetic polynucleotide

<400> SEQUENCE: 57
cagcagcagc agcagcagca gcagcagcag cagcagcagc agcag                45

<210> SEQ ID NO 58
<211> LENGTH: 60
<212> TYPE: DNA
<213> ORGANISM: Artificial Sequence
<220> FEATURE:
<223> OTHER INFORMATION: Synthetic polynucleotide

<400> SEQUENCE: 58
cagcagcagc agcagcagca gcagcagcag cagcagcagc agcagcagca gcagcagcag     60

<210> SEQ ID NO 59
<211> LENGTH: 41
<212> TYPE: DNA
<213> ORGANISM: Artificial Sequence
<220> FEATURE:
<223> OTHER INFORMATION: Synthetic polynucleotide

<400> SEQUENCE: 59
cagcagcagc agcagcagca gcauucccgg cuacaaggac c              41

<210> SEQ ID NO 60
<211> LENGTH: 41
<212> TYPE: DNA
<213> ORGANISM: Artificial Sequence
<220> FEATURE:
<223> OTHER INFORMATION: Synthetic polynucleotide

<400> SEQUENCE: 60
gaaauggucu gugauccccc cagcagcagc agcagcagca g              41

<210> SEQ ID NO 61
<211> LENGTH: 464
<212> TYPE: DNA
<213> ORGANISM: Artificial Sequence
<220> FEATURE:
<223> OTHER INFORMATION: Synthetic polynucleotide

<400> SEQUENCE: 61
tttgctagcc acatacgcgt ttcctaggaa accagagaag gatcaaagcc cctctcacac     60
accggggagc ggggaagaga actgttttgc tttcattgta gaccagtgaa attgggaggg    120
gttttccgac cgaagtcaga aaacctgctc caaaaattag ggacatcaaa cccgacaaca    180
tcctgctgga ccgctgtttg cggaagtgcg tctgtagcga gccagggaag gacatcaact    240
ccactttcga tgagggtgag atcaaggtgc catttccaca cccctccact gatatgtgaa    300
tcacaaagca cagttcctta ttcggttcga taaacaatat tctaaaagac tattaaaacc    360
gctcgtttct tgagtttgtg accgcttgta aaggctatgc aaatgagtca gtgctgattg    420
gctgaaaaca gccaatcaca gctcctatgt tgttatctag accc                    464

<210> SEQ ID NO 62
<211> LENGTH: 474
<212> TYPE: DNA
<213> ORGANISM: Artificial Sequence
<220> FEATURE:

<223> OTHER INFORMATION: Synthetic polynucleotide

<400> SEQUENCE: 62

| | | | | | |
|---|---|---|---|---|---|
| tttgctagcc | acatacgcgt | ttcctaggaa | accagagaag | gatcaaagcc | cctctcacac | 60 |
| accggggagc | ggggaagaga | actgttttgc | tttcattgta | gaccagtgaa | attgggaggg | 120 |
| gttttccgac | cgaagtcaga | aaacctgctc | caaaaattcc | tcaagctgcg | ggcagatgga | 180 |
| acggtgagcc | agtgccctgg | ccacagattg | cggaagtgcg | tctgtagcga | gccagggaag | 240 |
| gacatcaact | ccactttcga | tgagggtgag | atcaaggtgc | catttccaca | ccctccact | 300 |
| gatatgtgaa | tcacaaagca | cagttcctta | ttcggttcga | taaacaatat | tctaaaagac | 360 |
| tattaaaacc | gctcgtttct | tgagtttgtg | accgcttgta | aaggctatgc | aaatgagtca | 420 |
| gtgctgattg | gctgaaaaca | gccaatcaca | gctcctatgt | tgttatctag | accc | 474 |

<210> SEQ ID NO 63
<211> LENGTH: 460
<212> TYPE: DNA
<213> ORGANISM: Artificial Sequence
<220> FEATURE:
<223> OTHER INFORMATION: Synthetic polynucleotide

<400> SEQUENCE: 63

| | | | | | |
|---|---|---|---|---|---|
| tttgctagcc | acatacgcgt | ttcctaggaa | accagagaag | gatcaaagcc | cctctcacac | 60 |
| accggggagc | ggggaagaga | actgttttgc | tttcattgta | gaccagtgaa | attgggaggg | 120 |
| gttttccgac | cgaagtcaga | aaacctgctc | caaaaattgg | ctcttgcctc | aagctgcggg | 180 |
| cagatggaac | ggtttgcgga | agtgcgtctg | tagcgagcca | gggaaggaca | tcaactccac | 240 |
| tttcgatgag | ggtgagatca | aggtgccatt | tccacacccc | tccactgata | tgtgaatcac | 300 |
| aaagcacagt | tccttattcg | gttcgataaa | caatattcta | aaagactatt | aaaaccgctc | 360 |
| gtttcttgag | tttgtgaccg | cttgtaaagg | ctatgcaaat | gagtcagtgc | tgattggctg | 420 |
| aaaacagcca | atcacagctc | ctatgttgtt | atctagaccc | | | 460 |

<210> SEQ ID NO 64
<211> LENGTH: 456
<212> TYPE: DNA
<213> ORGANISM: Artificial Sequence
<220> FEATURE:
<223> OTHER INFORMATION: Synthetic polynucleotide

<400> SEQUENCE: 64

| | | | | | |
|---|---|---|---|---|---|
| tttgctagcc | acatacgcgt | ttcctaggaa | accagagaag | gatcaaagcc | cctctcacac | 60 |
| accggggagc | ggggaagaga | actgttttgc | tttcattgta | gaccagtgaa | attgggaggg | 120 |
| gttttccgac | cgaagtcaga | aaacctgctc | caaaaattgc | ctggtgggac | cacagaaggg | 180 |
| aggttcattt | tgcggaagtg | cgtctgtagc | gagccaggga | aggacatcaa | ctccactttc | 240 |
| gatgagggtg | agatcaaggt | gccatttcca | caccccctcca | ctgatatgtg | aatcacaaag | 300 |
| cacagttcct | tattcggttc | gataaacaat | attctaaaag | actattaaaa | ccgctcgttt | 360 |
| cttgagtttg | tgaccgcttg | taaaggctat | gcaaatgagt | cagtgctgat | tggctgaaaa | 420 |
| cagccaatca | cagctcctat | gttgttatct | agaccc | | | 456 |

<210> SEQ ID NO 65
<211> LENGTH: 464
<212> TYPE: DNA
<213> ORGANISM: Artificial Sequence
<220> FEATURE:
<223> OTHER INFORMATION: Synthetic polynucleotide

<400> SEQUENCE: 65

```
tttgctagcc acatacgcgt ttcctaggaa accagagaag gatcaaagcc cctctcacac    60
accggggagc ggggaagaga actgttttgc tttcattgta gaccagtgaa attgggaggg   120
gttttccgac cgaagtcaga aaacctgctc caaaaattcg caggagacac tgtcggacat   180
tcgggaaggt gcgccgcttg cggaagtgcg tctgtagcga gccagggaag gacatcaact   240
ccactttcga tgagggtgag atcaaggtgc catttccaca ccctccact gatatgtgaa    300
tcacaaagca cagttcctta ttcggttcga taaacaatat tctaaaagac tattaaaacc   360
gctcgtttct tgagtttgtg accgcttgta aaggctatgc aaatgagtca gtgctgattg   420
gctgaaaaca gccaatcaca gctcctatgt tgttatctag accc                    464
```

<210> SEQ ID NO 66
<211> LENGTH: 465
<212> TYPE: DNA
<213> ORGANISM: Artificial Sequence
<220> FEATURE:
<223> OTHER INFORMATION: Synthetic polynucleotide

<400> SEQUENCE: 66

```
tttgctagcc acatacgcgt ttcctaggaa accagagaag gatcaaagcc cctctcacac    60
accggggagc ggggaagaga actgttttgc tttcattgta gaccagtgaa attgggaggg   120
gttttccgac cgaagtcaga aaacctgctc caaaaatttg cgccgctagg ggtccacctg   180
ccttttgtgg gctactcctt gcggaagtgc gtctgtagcg agccagggaa ggacatcaac   240
tccactttcg atgagggtga gatcaaggtg ccatttccac accctccac tgatatgtga    300
atcacaaagc acagttcctt attcggttcg ataaacaata ttctaaaaga ctattaaaac   360
cgctcgtttc ttgagtttgt gaccgcttgt aaaggctatg caaatgagtc agtgctgatt   420
ggctgaaaac agccaatcac agctcctatg ttgttatcta gaccc                   465
```

<210> SEQ ID NO 67
<211> LENGTH: 454
<212> TYPE: DNA
<213> ORGANISM: Artificial Sequence
<220> FEATURE:
<223> OTHER INFORMATION: Synthetic polynucleotide

<400> SEQUENCE: 67

```
tttgctagcc acatacgcgt ttcctaggaa accagagaag gatcaaagcc cctctcacac    60
accggggagc ggggaagaga actgttttgc tttcattgta gaccagtgaa attgggaggg   120
gttttccgac cgaagtcaga aaacctgctc caaaaattct actcctactc ctgcatggcc   180
ctcaggtttg cggaagtgcg tctgtagcga gccagggaag gacatcaact ccactttcga   240
tgagggtgag atcaaggtgc catttccaca ccctccact gatatgtgaa tcacaaagca    300
cagttcctta ttcggttcga taaacaatat tctaaaagac tattaaaacc gctcgtttct   360
tgagtttgtg accgcttgta aaggctatgc aaatgagtca gtgctgattg gctgaaaaca   420
gccaatcaca gctcctatgt tgttatctag accc                               454
```

<210> SEQ ID NO 68
<211> LENGTH: 464
<212> TYPE: DNA
<213> ORGANISM: Artificial Sequence
<220> FEATURE:
<223> OTHER INFORMATION: Synthetic polynucleotide

<400> SEQUENCE: 68

```
tttgctagcc acatacgcgt tcctaggaa accagagaag gatcaaagcc cctctcacac    60
accggggagc ggggaagaga actgttttgc tttcattgta gaccagtgaa attgggaggg   120
gttttccgac cgaagtcaga aaacctgctc caaaaattga cgactgctgc tcacatctgt   180
gtgtcttgcg caggagattg cggaagtgcg tctgtagcga gccagggaag gacatcaact   240
ccactttcga tgagggtgag atcaaggtgc catttccaca ccctccact gatatgtgaa   300
tcacaaagca cagttcctta ttcggttcga taaacaatat tctaaaagac tattaaaacc   360
gctcgtttct tgagtttgtg accgcttgta aaggctatgc aaatgagtca gtgctgattg   420
gctgaaaaca gccaatcaca gctcctatgt tgttatctag accc                    464
```

<210> SEQ ID NO 69
<211> LENGTH: 470
<212> TYPE: DNA
<213> ORGANISM: Artificial Sequence
<220> FEATURE:
<223> OTHER INFORMATION: Synthetic polynucleotide

<400> SEQUENCE: 69

```
tttgctagcc acatacgcgt tcctaggaa accagagaag gatcaaagcc cctctcacac    60
accggggagc ggggaagaga actgttttgc tttcattgta gaccagtgaa attgggaggg   120
gttttccgac cgaagtcaga aaacctgctc caaaaattct gctgctgctg ctgctgctgc   180
tgctgctgct gctgctgctg ctgttgcgga agtgcgtctg tagcgagcca gggaaggaca   240
tcaactccac tttcgatgag ggtgagatca aggtgccatt tccacacccc tccactgata   300
tgtgaatcac aaagcacagt tccttattcg gttcgataaa caatattcta aaagactatt   360
aaaaccgctc gtttcttgag tttgtgaccg cttgtaaagg ctatgcaaat gagtcagtgc   420
tgattggctg aaaacagcca atcacagctc ctatgttgtt atctagaccc              470
```

<210> SEQ ID NO 70
<211> LENGTH: 485
<212> TYPE: DNA
<213> ORGANISM: Artificial Sequence
<220> FEATURE:
<223> OTHER INFORMATION: Synthetic polynucleotide

<400> SEQUENCE: 70

```
tttgctagcc acatacgcgt tcctaggaa accagagaag gatcaaagcc cctctcacac    60
accggggagc ggggaagaga actgttttgc tttcattgta gaccagtgaa attgggaggg   120
gttttccgac cgaagtcaga aaacctgctc caaaaattct gctgctgctg ctgctgctgc   180
tgctgctgct gctgctgctg ctgctgctgc tgctgctgtt gcggaagtgc gtctgtagcg   240
agccagggaa ggacatcaac tccactttcg atgagggtga gatcaaggtg ccatttccac   300
accctccac tgatatgtga atcacaaagc acagttcctt attcggttcg ataaacaata   360
ttctaaaaga ctattaaaac cgctcgtttc ttgagtttgt gaccgcttgt aaaggctatg   420
caaatgagtc agtgctgatt ggctgaaaac agccaatcac agctcctatg ttgttatcta   480
gaccc                                                               485
```

<210> SEQ ID NO 71
<211> LENGTH: 466
<212> TYPE: DNA
<213> ORGANISM: Artificial Sequence
<220> FEATURE:
<223> OTHER INFORMATION: Synthetic polynucleotide -continued

```
<400> SEQUENCE: 71
tttgctagcc acatacgcgt ttcctaggaa accagagaag gatcaaagcc cctctcacac      60
accggggagc ggggaagaga actgttttgc tttcattgta gaccagtgaa attgggaggg     120
gttttccgac cgaagtcaga aaacctgctc caaaaattgg tccttgtagc cgggaatgct     180
gctgctgctg ctgctgctgt tgcggaagtg cgtctgtagc gagccaggga aggacatcaa     240
ctccactttc gatgagggtg agatcaaggt gccatttcca cacccctcca ctgatatgtg     300
aatcacaaag cacagttcct tattcggttc gataaacaat attctaaaag actattaaaa     360
ccgctcgttt cttgagtttg tgaccgcttg taaaggctat gcaaatgagt cagtgctgat     420
tggctgaaaa cagccaatca cagctcctat gttgttatct agaccc                    466

<210> SEQ ID NO 72
<211> LENGTH: 466
<212> TYPE: DNA
<213> ORGANISM: Artificial Sequence
<220> FEATURE:
<223> OTHER INFORMATION: Synthetic polynucleotide

<400> SEQUENCE: 72
tttgctagcc acatacgcgt ttcctaggaa accagagaag gatcaaagcc cctctcacac      60
accggggagc ggggaagaga actgttttgc tttcattgta gaccagtgaa attgggaggg     120
gttttccgac cgaagtcaga aaacctgctc caaaaattct gctgctgctg ctgctgctgg     180
ggggatcaca gaccatttct tgcggaagtg cgtctgtagc gagccaggga aggacatcaa     240
ctccactttc gatgagggtg agatcaaggt gccatttcca cacccctcca ctgatatgtg     300
aatcacaaag cacagttcct tattcggttc gataaacaat attctaaaag actattaaaa     360
ccgctcgttt cttgagtttg tgaccgcttg taaaggctat gcaaatgagt cagtgctgat     420
tggctgaaaa cagccaatca cagctcctat gttgttatct agaccc                    466
```